US010795048B2

(12) United States Patent
St-Aubin et al.

(10) Patent No.: US 10,795,048 B2
(45) Date of Patent: Oct. 6, 2020

(54) METHODS FOR EXTENDING A RANGE FOR ASSIGNING ATTRIBUTES TO AN OBJECT IN AN IMAGE

(71) Applicant: VOTI INC., St-Laurent, Quebec (CA)

(72) Inventors: Emmanuel St-Aubin, St-Laurent (CA);
Philippe Desjeans-Gauthier, St-Laurent (CA); Ola El Bakry, St-Laurent (CA); Simon Archambault, St-Laurent (CA); William Awad, St-Laurent (CA)

(73) Assignee: VOTI INC., Quebec (CA)

( * ) Notice: Subject to any disclaimer, the term of this patent is extended or adjusted under 35 U.S.C. 154(b) by 117 days.

(21) Appl. No.: 16/229,970

(22) Filed: Dec. 21, 2018

(65) Prior Publication Data
US 2019/0212278 A1    Jul. 11, 2019

Related U.S. Application Data

(60) Provisional application No. 62/615,120, filed on Jan. 9, 2018.

(51) Int. Cl.
*G01V 5/00*    (2006.01)
*G01N 23/087*    (2018.01)
(Continued)

(52) U.S. Cl.
CPC .......... *G01V 5/0041* (2013.01); *G01N 23/04* (2013.01); *G01N 23/083* (2013.01);
(Continued)

(58) Field of Classification Search
CPC .................................................. G01V 5/0041
(Continued)

(56) References Cited

U.S. PATENT DOCUMENTS 5,600,700 A    2/1997 Krug et al.
5,974,111 A    10/1999 Krug et al.
(Continued)

FOREIGN PATENT DOCUMENTS

FR    3037401    12/2016

OTHER PUBLICATIONS

Lehmann et al., Generalized image combinations in dual KVP digital radiography, Medical Physics, Sep. 1981, 659-667, 8-5, American Association of Physicists in Medicine.
(Continued)

*Primary Examiner* — Edwin C Gunberg
(74) *Attorney, Agent, or Firm* — Hartman Global IP Law; Gary M. Hartman; Domenica N. S. Hartman

(57) ABSTRACT

There is provided a method for assigning an attribute to x-ray attenuation including the steps of acquiring first and second reference material equivalent path length information associated with a first range of dual-energy x-ray attenuation information, acquiring second and third reference material equivalent path length information associated with a second range of dual-energy x-ray attenuation information, and, joining the first the first dual-energy x-ray attenuation information range with the second dual-energy x-ray attenuation information range using coefficients representing dual-energy x-ray attenuation information of the second reference material to define a third dual-energy x-ray attenuation information range upon which may be imposed dual-energy x-ray attenuation values within the third dual-energy x-ray attenuation information range to determine corresponding first reference material equivalent path lengths and third reference material equivalent path lengths.

42 Claims, 27 Drawing Sheets

(51) Int. Cl.
*G01N 23/04* (2018.01)
*G01N 23/083* (2018.01)
*G01N 23/10* (2018.01)
*G06T 11/00* (2006.01)
*H04N 5/32* (2006.01)
*G06T 7/194* (2017.01)
*G06T 7/70* (2017.01)
*G01N 23/20* (2018.01)
*G06T 7/00* (2017.01)
*G06T 7/60* (2017.01)
*G06T 7/50* (2017.01)
*G06T 7/11* (2017.01)

(52) U.S. Cl.
CPC ........... *G01N 23/087* (2013.01); *G01N 23/10* (2013.01); *G01N 23/20* (2013.01); *G01V 5/005* (2013.01); *G01V 5/0083* (2013.01); *G06T 7/0004* (2013.01); *G06T 7/11* (2017.01); *G06T 7/194* (2017.01); *G06T 7/50* (2017.01); *G06T 7/60* (2013.01); *G06T 7/70* (2017.01); *G06T 11/005* (2013.01); *H04N 5/3205* (2013.01); *G01N 2223/206* (2013.01); *G01N 2223/305* (2013.01); *G01N 2223/423* (2013.01); *G01N 2223/424* (2013.01); *G01N 2223/601* (2013.01); *G01N 2223/639* (2013.01); *G06T 2207/10116* (2013.01); *G06T 2207/30232* (2013.01); *G06T 2211/408* (2013.01); *G06T 2211/424* (2013.01)

(58) Field of Classification Search
USPC .......................................................... 378/53
See application file for complete search history.

(56) References Cited

U.S. PATENT DOCUMENTS

| | | | |
|---|---|---|---|
| 7,873,201 | B2 | 1/2011 | Eilbert et al. |
| 7,945,017 | B2 | 5/2011 | Chen et al. |
| 8,116,428 | B2 | 2/2012 | Gudmundson et al. |
| 8,311,309 | B2 | 11/2012 | Siedenburg |
| 8,781,066 | B2 | 7/2014 | Gudmundson et al. |
| 8,831,331 | B2 | 9/2014 | Gudmundson et al. |
| 8,867,816 | B2 | 10/2014 | Bouchard et al. |
| 9,170,212 | B2 | 10/2015 | Bouchard et al. |
| 9,194,975 | B2 | 11/2015 | Drouin et al. |
| 9,311,277 | B2 | 4/2016 | Rinkel et al. |
| 2010/0002834 | A1 | 1/2010 | Gudmundson et al. |
| 2010/0207741 | A1 | 8/2010 | Gudmundson et al. |
| 2010/0208972 | A1 | 8/2010 | Bouchard et al. |
| 2011/0172972 | A1 | 7/2011 | Gudmundson et al. |
| 2012/0140879 | A1 | 6/2012 | Gudmundson et al. |
| 2012/0275646 | A1* | 11/2012 | Drouin ................. G01N 23/046 382/103 |
| 2014/0211980 | A1 | 7/2014 | Bouchard et al. |
| 2014/0222385 | A1 | 8/2014 | Muenster et al. |
| 2014/0241495 | A1 | 8/2014 | Gudmundson et al. |

OTHER PUBLICATIONS

Bond et al., ZeCalc Algorithm Details, Lawrence Livermore National Laboratory, Jan. 7, 2013, Livermore U.S.A.
International Search Report and Written Opinion for International Application No. PCT/CA2018/051675, dated Mar. 21, 2019, (11 pages).

* cited by examiner

METHODS FOR EXTENDING A RANGE FOR ASSIGNING ATTRIBUTES TO AN OBJECT IN AN IMAGE

CROSS-REFERENCE TO RELATED APPLICATIONS

This patent application is a non-provisional of and claims priority to and the benefit of U.S. Provisional Patent Application No. 62/615,120, filed on Jan. 9, 2018, entitled "METHODS AND APPARATUS FOR DETERMINING AND ANALYZING THE PROPERTIES OF AN OBJECT SCANNED WITH IONIZING ELECTROMAGNETIC RADIATION", which is incorporated by reference in its entirety.

BACKGROUND

The present invention relates to x-ray scanning of objects. More particularly, the present invention relates to x-ray scanning of objects for determining the properties of the materials of which the objects are composed.

There are presently many methods and apparatus for scanning objects and materials using electromagnetic radiation, such as x-rays, for the purpose of identifying the material of which the object being scanned is made. Although certain techniques are useful in basic medical imaging applications, such techniques usually do not provide a continuous discrimination of materials over a wide range of atomic composition required for identifying materials for security screening, which involves identifying materials which may pose a threat. Moreover, security screening of objects is often used at locations with high throughput, such as airports, where people and baggage must be scanned at a relatively high rate so as to avoid congestion at security checkpoints.

Liquid, aerosol or gel (LAG) materials are of particular concern because they can be stored in small containers that are often carried by passengers, such as drinking bottles, and may potentially be composed of an explosive material. Moreover, non-explosive LAG materials, particularly liquids, may be stored in separate containers and may potentially be later combined to make a material which is explosive. The volume of potentially explosive LAG material stored in small containers may be sufficient to damage an aircraft or pose a serious safety risk to passengers nearby in an aircraft or in an airport. Proper identification of LAG materials and their properties during screening operations is therefore important.

In some systems, an object is scanned and an image of the scanned object is generated for review by human operator such as security personnel at an airport. In other systems, software may be used for the purpose of processing a generated or refined image to identify potentially threatening, smuggled or illicit objects or materials. The software determines whether the pixels of the image represent an object or material of interest and the image may then be forwarded to a human operator for second-level screening. In such cases, there is introduced a "human intervention" step and therefore a step whereby human error may be introduced. For example, a human operator reviewing the image may fail to identify potentially threatening materials or objects contained in the image. There is also introduced a problem of limited throughput at security stations due to the time required for security personnel to review the image flagged by the software, as well as the decision-making process for possible rerouting of personnel, baggage and/or passengers. Such human intervention may cause undue delay at the security screening checkpoint or may come at prohibitive cost. Moreover, while security personnel review the information provided in the refined image, their attention is diverted away from their surroundings and therefore away from potentially threatening situations.

Some systems have been put in place to manage passenger throughput at airport security screening checkpoints. However, the reliance on refined image data and processing by human operators does not efficiently address the complications associated with steady throughput at security screening checkpoints.

In view of the above, advantage would be found with an apparatus and method which facilitates automatic analysis of x-ray screening information to limit or eliminate potential for human error and to process this information in real time or near real time and preferably automatically so as to maintain efficient throughput at locations where scanning may be performed.

SUMMARY

The present invention relates to x-ray scanning of objects. More particularly, the present invention relates to x-ray scanning of objects for determining the properties of the materials of which the objects are composed.

In one aspect, there is provided a method for assigning an attribute to x-ray attenuation including the steps of acquiring first and second reference material equivalent path length information associated with a first range of dual-energy x-ray attenuation information, acquiring second and third reference material equivalent path length information associated with a second range of dual-energy x-ray attenuation information, and, joining the first the first dual-energy x-ray attenuation information range with the second dual-energy x-ray attenuation information range using coefficients representing dual-energy x-ray attenuation information of the second reference material to define a third dual-energy x-ray attenuation information range upon which may be imposed dual-energy x-ray attenuation values within the third dual-energy x-ray attenuation information range to determine corresponding first reference material equivalent path lengths and third reference material equivalent path lengths.

In one aspect, the step of acquiring first and second reference material equivalent path length information associated with a first range of dual-energy x-ray attenuation information further includes the steps of retrieving from lookup tables saved first and second reference material equivalent path lengths associated with the dual-energy x-ray attenuation information corresponding with the first dual-energy attenuation information range.

In another aspect, the step of acquiring first and second reference material equivalent path length information associated with a first range of dual-energy x-ray attenuation information further includes the steps of scanning in an x-ray scanning device first and second reference materials each having known atomic composition, known dimensions and known orientation in the x-ray scanning device. The x-ray scanning device emits x-rays which pass through the first reference material with first reference material path lengths and through the second reference material with second reference material path lengths. The x-rays are detected by an array of detectors to provide first dual-energy x-ray attenuation information for each of the first and second reference materials. The method further includes the steps of associating the first dual-energy x-ray attenuation information with each of the first reference material path lengths and the second reference material path lengths, and, expressing collectively each of the first reference material path lengths and the second reference material path lengths as a function of the associated first dual-energy x-ray attenuation information to define first dual-energy attenuation surfaces.

In one aspect, the step of expressing collectively each of the first reference material path lengths and the second reference material path lengths further includes the step of determining numerically pointwise inverted first dual-energy attenuation surfaces using an optimization algorithm inverting the first dual-energy attenuation surfaces.

In another aspect, the step of expressing collectively each of the first reference material path lengths and the second reference material path lengths further includes the step of selecting a model for expressing collectively each of the first reference material path lengths and the second reference material path lengths as a function of the associated first dual-energy x-ray attenuation information to define the dual-energy attenuation surfaces.

The step of selecting the model may further include the steps of selecting a set of coefficients to be applied to the model for fitting the first dual-energy x-ray attenuation information with the model, and, fitting the first dual-energy x-ray attenuation information with the model optimizing the coefficients.

The step of selecting the model may further include the steps of selecting the set of fitting constraints to be applied to the model for selecting the coefficients, and, selecting the set of coefficients by applying the set of fitting constraints to the model.

The dual-energy x-ray attenuation information may include high-energy x-ray attenuation information and low-energy x-ray attenuation information and the step of associating each of the first low-energy x-ray attenuation information and the first high-energy x-ray attenuation information with each of the first reference material path lengths and the second reference material path lengths may further include the steps of defining a first space wherein the first low-energy x-ray attenuation information of the first reference material and the second reference material defines a first plane and first reference material path lengths and second reference material path lengths each define a first height over the first plane, defining a second space wherein the first high-energy x-ray attenuation information of the first reference material and the second reference material defines a second plane and first reference material path lengths and second reference material path lengths each define a second height over second the plane, and, representing collectively the first reference material path lengths and the second reference material path lengths using the model to define the first high-energy direct attenuation surface and first low energy direct attenuation surface.

In another aspect, the model is a second model, the first dual-energy attenuation surfaces are first dual-energy inverse attenuation surfaces, respectively, and prior to the associating step, the method further includes the steps of associating each of the first dual-energy x-ray attenuation information with corresponding ones of each of the first material path lengths and the second material path lengths, and, selecting a first model for expressing collectively the first dual-energy x-ray attenuation information as a function of the first reference material path lengths and the second reference material path lengths to define first direct attenuation surfaces.

The step of selecting the first model may further include the steps of selecting a first set of coefficients to be applied to the first model for fitting the first dual-energy x-ray attenuation information with the first model, and, fitting the first dual-energy x-ray attenuation information with the first model optimizing the first coefficients. The step of selecting the second model further includes the steps of selecting a second set of coefficients to be applied to the second model for fitting the first dual-energy x-ray attenuation information with the second model, and, fitting the first dual-energy x-ray attenuation information with the second model optimizing the second set of coefficients.

The step of selecting the first model may further include the steps of selecting a first set of fitting constraints to be applied to the first model for selecting the first set of coefficients, and, selecting the set of first coefficients by applying the first set of fitting constraints to the first model. The step of selecting second model may further include the steps of selecting a second set of fitting constraints to be applied to the second model for selecting the second set of coefficients, and, selecting the second set of coefficients by applying the second set of fitting constraints to the second model.

The dual-energy x-ray attenuation information may include high-energy x-ray attenuation information and low-energy x-ray attenuation information and the associating step may further include the steps of defining a space wherein the first reference material path lengths and the second reference material path lengths define a first plane and the first high-energy x-ray attenuation information and the first low-energy x-ray attenuation information each define a respective first and second height over the first plane and representing collectively the first high-energy x-ray attenuation information and the first low-energy x-ray attenuation information using the first model to define the first high-energy direct attenuation surface and first low energy direct attenuation surface, defining an inverse space wherein the first low-energy x-ray attenuation information and the first high-energy x-ray attenuation information define a second plane and first reference material path lengths and second reference material path lengths each define a respective third and fourth height over the second plane, and, representing collectively the first reference material path lengths and the second reference material path lengths using the second model to define first high-energy and first low-energy inverse attenuation surfaces.

In one aspect, the step of acquiring second and third reference material equivalent path length information associated with a second range of dual-energy x-ray attenuation information further includes the step of retrieving from lookup tables saved second and third reference material equivalent path lengths associated with the dual-energy x-ray attenuation information corresponding with the second dual-energy attenuation information range.

In one aspect, the step of expressing collectively each of the second reference material path lengths and the third reference material path lengths further includes the step of determining numerically pointwise inverted second dual-energy attenuation surfaces using an optimization algorithm inverting the second dual-energy attenuation surfaces.

In another aspect, the step of acquiring second and third reference material equivalent path length information associated with a first range of dual-energy x-ray attenuation information further includes the steps of scanning in the x-ray scanning device the second reference material and a reference third material having known atomic composition, known dimensions and known orientation in the x-ray scanning device to provide second low-energy x-ray attenuation information and high-energy x-ray attenuation information for each of the second and third reference materials, associating each of the second low-energy x-ray attenuation information and the second high-energy x-ray attenuation information with each of the second reference material path lengths and third reference material path lengths, and, expressing collectively each of the second reference material path lengths and the third reference material path lengths as a function of the associated low-energy x-ray attenuation information and high-energy x-ray attenuation information to define second high-energy attenuation surfaces and second low-energy attenuation surfaces.

In another aspect, the step of expressing collectively each of the second reference material path lengths and the third reference material path lengths further includes the step of selecting a model for expressing collectively each of the second reference material path lengths and the third reference material path lengths as a function of the associated second dual-energy x-ray attenuation information to define the second dual-energy attenuation surfaces.

The step of selecting the model may further include the steps of selecting a set of coefficients to be applied to the model for fitting the second dual-energy x-ray attenuation information with the model, and, fitting the second dual-energy x-ray attenuation information with the model optimizing the coefficients.

The step of selecting the model may further include the steps of selecting the set of fitting constraints to be applied to the model for selecting the coefficients, and, selecting the set of coefficients by applying the set of fitting constraints to the model.

The dual-energy x-ray attenuation information may include high-energy x-ray attenuation information and low-energy x-ray attenuation information and the step of associating each of the second low-energy x-ray attenuation information and the second high-energy x-ray attenuation information with each of the second reference material path lengths and third reference material path lengths may further include the steps of defining a first space wherein the second low-energy x-ray attenuation information of the second reference material and the third reference material defines a first plane and second reference material path lengths and third reference material path lengths each define a first height over the first plane, defining a second space wherein the second high-energy x-ray attenuation information of the second reference material and the third reference material defines a second plane and second reference material path lengths and third reference material path lengths each define a second height over second the plane, and, representing collectively the second reference material path lengths and the third reference material path lengths using the model to define the second high-energy direct attenuation surface and second low energy direct attenuation surface.

In another aspect, the model is a second model, the second dual-energy attenuation surfaces are second dual-energy inverse attenuation surfaces, respectively, and prior to the associating step, the method further includes the steps of associating each of the second dual-energy x-ray attenuation information with corresponding ones of each of the second material path lengths and the third material path lengths, and, selecting a first model for expressing collectively the second dual-energy x-ray attenuation information as a function of the second reference material path lengths and the third reference material path lengths to define second direct attenuation surfaces.

The step of selecting the first model may further include the steps of selecting a first set of coefficients to be applied to the first model for fitting the second dual-energy x-ray attenuation information with the first model, and, fitting the second dual-energy x-ray attenuation information with the first model optimizing the first coefficients. The step of selecting the second model may further include the steps of selecting a second set of coefficients to be applied to the second model for fitting the second dual-energy x-ray attenuation information with the second model, and, fitting the second dual-energy x-ray attenuation information with the second model optimizing the second set of coefficients.

The step of selecting the first model may further include the steps of selecting a first set of fitting constraints to be applied to the first model for selecting the first set of coefficients, and, selecting the set of first coefficients by applying the first set of fitting constraints to the first model. The step of selecting second the model may further include the steps of selecting a second set of fitting constraints to be applied to the second model for selecting the second set of coefficients, and, selecting the second set of coefficients by applying the second set of fitting constraints to the second model.

The associating step may further include defining a space wherein the second reference material path lengths and the third reference material path lengths define a first plane and the second high-energy x-ray attenuation information and the second low-energy x-ray attenuation information each define a respective first and second height over the first plane and representing collectively the second high-energy x-ray attenuation information and the second low-energy x-ray attenuation information using the first model to define the second high-energy direct attenuation surface and second low energy direct attenuation surface, defining an inverse space wherein the second low-energy x-ray attenuation information and the second high-energy x-ray attenuation information define a second plane and second reference material path lengths and third reference material path lengths each define a respective third and fourth height over the second plane, and, representing collectively the second reference material path lengths and the third reference material path lengths using the second model to define second high-energy and second low-energy inverse attenuation surfaces.

The step of joining the first the first dual-energy x-ray attenuation information range with the second dual-energy x-ray attenuation information range may further include the steps of selecting a first model for expressing collectively each of the first reference material path lengths and the second reference material path lengths as a function of the associated first dual-energy x-ray attenuation information range, selecting a first set of coefficients to be applied to the first model for fitting the first dual-energy x-ray attenuation information range with the first model, selecting a second model for expressing collectively each of the second reference material path lengths and the third reference material path lengths as a function of the associated second dual-energy x-ray attenuation information range, selecting a second set of coefficients to be applied to the second model for fitting the second dual-energy x-ray attenuation information range with the second model, weighting to a zero value the coefficients for fitting the dual-energy x-ray attenuation information of the first reference material to the first model to obtain a subset of coefficients for fitting respective dual-energy x-ray attenuation information of only the second reference material to either of the first model and the second model, and, fitting the first set of coefficients with the second set of coefficients using the subset of coefficients to join the first model and the second model to provide the third dual-energy x-ray attenuation information range.

In another aspect, there is provided a method for assigning an attribute to x-ray attenuation including the steps of acquiring first and second reference material equivalent path length information associated with a first range of dual-energy x-ray attenuation information by a first model for expressing collectively each of the first reference material path lengths and the second reference material path lengths as a function of the associated first range of dual-energy x-ray attenuation information, the first range of dual-energy attenuation information being fitted with the first model by a first set of coefficients, acquiring third reference material equivalent path length information associated with a second range of dual-energy x-ray attenuation information by a second model for expressing collectively each of the third reference material equivalent path lengths as a function of the associated second range of dual-energy attenuation information, the second range of dual-energy being fitted with the second model by a second set of coefficients, the third reference material having an effective atomic number greater than that of the second reference material, combining the first set of coefficients and the second set of coefficients to provide a third set of coefficients for fitting the first and second range of dual-energy x-ray attenuation information with a third model for expressing collectively the first and third reference material path lengths as a function of the fitted first and second range of dual-energy x-ray attenuation information, and, for all points in the third model determine a volume fraction of one of the first and the third reference material which represents the second reference material path lengths to identify where in the third model path lengths representing the second reference material are represented.

In one aspect, the step of acquiring first and second reference material equivalent path length information associated with a first range of dual-energy x-ray attenuation information further includes the steps of retrieving from lookup tables saved first and second reference material equivalent path lengths associated with the dual-energy x-ray attenuation information corresponding with the first dual-energy attenuation information range.

In another aspect, the step of acquiring first and second reference material equivalent path length information associated with a first range of dual-energy x-ray attenuation information further includes the steps of scanning in an x-ray scanning device first and second reference materials each having known atomic composition, known dimensions and known orientation in the x-ray scanning device. The x-ray scanning device emits x-rays which pass through the first reference material with first reference material path lengths and through the second reference material with second reference material path lengths. The x-rays are detected by an array of detectors to provide first dual-energy x-ray attenuation information for each of the first and second reference materials. The method further includes the steps of associating the first dual-energy x-ray attenuation information with each of the first reference material path lengths and the second reference material path lengths, and, expressing collectively each of the first reference material path lengths and the second reference material path lengths as a function of the associated first dual-energy x-ray attenuation information to define first dual-energy attenuation surfaces.

In one aspect, the step of expressing collectively each of the first reference material path lengths and the second reference material path lengths further includes the step of determining numerically pointwise inverted first dual-energy attenuation surfaces using an optimization algorithm inverting the first dual-energy attenuation surfaces.

In another aspect, the step of expressing collectively each of the first reference material path lengths and the second reference material path lengths further includes the step of selecting a model for expressing collectively each of the first reference material path lengths and the second reference material path lengths as a function of the associated first dual-energy x-ray attenuation information to define the dual-energy attenuation surfaces.

The step of selecting the model may further include the steps of selecting a set of coefficients to be applied to the model for fitting the first dual-energy x-ray attenuation information with the model, and, fitting the first dual-energy x-ray attenuation information with the model optimizing the coefficients.

The step of selecting the model may further include the steps of selecting the set of fitting constraints to be applied to the model for selecting the coefficients, and, selecting the set of coefficients by applying the set of fitting constraints to the model.

The dual-energy x-ray attenuation information may include high-energy x-ray attenuation information and low-energy x-ray attenuation information and the step of associating each of the first low-energy x-ray attenuation information and the first high-energy x-ray attenuation information with each of the first reference material path lengths and the second reference material path lengths may further include the steps of defining a first space wherein the first low-energy x-ray attenuation information of the first reference material and the second reference material defines a first plane and first reference material path lengths and second reference material path lengths each define a first height over the first plane, defining a second space wherein the first high-energy x-ray attenuation information of the first reference material and the second reference material defines a second plane and first reference material path lengths and second reference material path lengths each define a second height over second the plane, and, representing collectively the first reference material path lengths and the second reference material path lengths using the model to define the first high-energy direct attenuation surface and first low energy direct attenuation surface.

In another aspect, the model is a second model, the first dual-energy attenuation surfaces are first dual-energy inverse attenuation surfaces, respectively, and prior to the associating step, the method further includes the steps of associating each of the first dual-energy x-ray attenuation information with corresponding ones of each of the first material path lengths and the second material path lengths, and, selecting a first model for expressing collectively the first dual-energy x-ray attenuation information as a function of the first reference material path lengths and the second reference material path lengths to define first direct attenuation surfaces.

The step of selecting the first model may further include the steps of selecting a first set of coefficients to be applied to the first model for fitting the first dual-energy x-ray attenuation information with the first model, and, fitting the first dual-energy x-ray attenuation information with the first model optimizing the first coefficients. The step of selecting the second model further includes the steps of selecting a second set of coefficients to be applied to the second model for fitting the first dual-energy x-ray attenuation information with the second model, and, fitting the first dual-energy x-ray attenuation information with the second model optimizing the second set of coefficients.

The step of selecting the first model may further include the steps of selecting a first set of fitting constraints to be applied to the first model for selecting the first set of coefficients, and, selecting the set of first coefficients by applying the first set of fitting constraints to the first model. The step of selecting second model may further include the steps of selecting a second set of fitting constraints to be applied to the second model for selecting the second set of coefficients, and, selecting the second set of coefficients by applying the second set of fitting constraints to the second model.

The dual-energy x-ray attenuation information may include high-energy x-ray attenuation information and low-energy x-ray attenuation information and the associating step may further include the steps of defining a space wherein the first reference material path lengths and the second reference material path lengths define a first plane and the first high-energy x-ray attenuation information and the first low-energy x-ray attenuation information each define a respective first and second height over the first plane and representing collectively the first high-energy x-ray attenuation information and the first low-energy x-ray attenuation information using the first model to define the first high-energy direct attenuation surface and first low energy direct attenuation surface, defining an inverse space wherein the first low-energy x-ray attenuation information and the first high-energy x-ray attenuation information define a second plane and first reference material path lengths and second reference material path lengths each define a respective third and fourth height over the second plane, and, representing collectively the first reference material path lengths and the second reference material path lengths using the second model to define first high-energy and first low-energy inverse attenuation surfaces.

The step of acquiring third reference material equivalent path length information associated with a second range of dual-energy x-ray attenuation information may further include the steps of retrieving from lookup tables saved third reference material equivalent path lengths associated with the dual-energy x-ray attenuation information corresponding with the second dual-energy attenuation information range.

The step of acquiring third reference material equivalent path length information associated with a second range of dual-energy x-ray attenuation information may further include the steps of, scanning in the x-ray scanning device the third reference material having known atomic composition, known dimensions and known orientation in the x-ray scanning device to provide second dual-energy x-ray attenuation information for the third reference material, associating each of the second dual-energy x-ray attenuation information with the third reference material path lengths, and, expressing collectively the third reference material path lengths as a function of the associated dual-energy x-ray attenuation information to define second dual-energy attenuation surfaces.

The step of fitting the second range of dual-energy attenuation information with the second model by a second set of coefficients may further include the step of fitting the second range of dual-energy x-ray attenuation information with the second model to optimize the second set of coefficients.

The step of fitting the second range of dual-energy attenuation information with the second model by a second set of coefficients may further includes the steps of selecting a set of fitting constraints to be applied to the second model for selecting the second set of coefficients, and, selecting the second set of coefficients by applying the set of fitting constraints to the second model.

The dual-energy x-ray attenuation information may includes high-energy x-ray attenuation information and low-energy x-ray attenuation information and the step of associating the second range of dual-energy x-ray attenuation information with the third reference material path lengths may further include the steps of defining a first space wherein the second low-energy x-ray attenuation information of the third reference material defines a first plane and the third reference material path lengths define a first height over the first plane, defining a second space wherein the second high-energy x-ray attenuation information of the third reference material defines a second plane and the third reference material path lengths define a second height over second the plane, and, representing collectively the third reference material path lengths using the second model to define second dual-energy direct attenuation surfaces.

The dual-energy x-ray attenuation information may include high-energy x-ray attenuation information and low-energy x-ray attenuation information and may further include the steps of defining a space wherein the first reference material path lengths and the third reference material path lengths define a first plane and the first and second high-energy x-ray attenuation information and the first and second low-energy x-ray attenuation information each define a respective first and second height over the first plane and the third model expresses collectively the first and third reference material path lengths as a function of the first and second low-energy x-ray attenuation and the first and second high-energy x-ray attenuation to define a third dual-energy direct attenuation surface, defining an inverse space wherein the first and second low-energy x-ray attenuation information and the first and second high-energy x-ray attenuation information define a second plane and first reference material path lengths and third reference material path lengths each define a respective third and fourth height over the second plane, and, representing collectively the first reference material path lengths and the third reference material path lengths using the third model to define dual-energy inverse attenuation surfaces.

In another aspect, there is provided a method for assigning an attribute to x-ray attenuation including the steps of acquiring first and second reference material equivalent path length information associated with a first range of dual-energy x-ray attenuation information by a model for expressing collectively each of the first reference material path lengths and the second reference material path lengths as a function of the associated first range of dual-energy x-ray attenuation information, selecting an extrapolation range of dual-energy x-ray attenuation information over which first and second reference material path lengths are to be associated with dual-energy x-ray attenuation information of a first imposed material having a predetermined minimum effective atomic number less than an effective atomic number of the first reference material and a second imposed material having a predetermined maximum effective atomic number greater than an effective atomic number of the second reference material, wherein the first range is within the extrapolation range, selecting a set of fitting constraints for associating each of the first reference material path lengths and the second reference material path lengths over the extrapolation range of dual-energy attenuation information to define extrapolated first and second reference material equivalent path lengths over the extrapolation range, and, applying the set of fitting constraints to the model.

In one aspect, the step of acquiring first and second reference material equivalent path length information associated with a first range of dual-energy x-ray attenuation information may further include the steps of retrieving from lookup tables saved first and second reference material equivalent path lengths associated with the dual-energy x-ray attenuation information corresponding with the first range of dual-energy x-ray attenuation information.

The step of acquiring first and second reference material equivalent path length information associated with a first range of dual-energy x-ray attenuation information may further include the steps of scanning in an x-ray scanning device first and second reference materials each having known atomic composition, known dimensions and known orientation in the x-ray scanning device, the x-ray scanning device emitting x-rays which pass through the first reference material with first reference material path lengths and through the second reference material with second reference material path lengths, the x-rays being detected by an array of detectors to provide first dual-energy x-ray attenuation information for each of the first and second reference materials, associating the first dual-energy x-ray attenuation information with each of the first reference material path lengths and the second reference material path lengths, and, using the model to express collectively each of the first reference material path lengths and the second reference material path lengths as a function of the associated first dual-energy x-ray attenuation information to define first dual-energy attenuation surfaces.

The step of applying the set of fitting constraints to the model may further include the step of selecting a set of coefficients to be applied to the model for fitting the dual-energy x-ray attenuation information of the first range with the model, and, fitting, using the set of fitting constraints, the dual-energy x-ray attenuation information of the extrapolation range with the model.

The dual-energy x-ray attenuation information may include high-energy x-ray attenuation information and low-energy x-ray attenuation information and associating each of the first and second reference material path lengths with the first range of dual-energy x-ray attenuation information may further include the steps of defining a first space wherein the low-energy x-ray attenuation information of the first reference material and the second reference material defines a first plane and first reference material path lengths and second reference material path lengths each define a first height over the first plane, defining a second space wherein the high-energy x-ray attenuation information of the first reference material and the second reference material defines a second plane and first reference material path lengths and second reference material path lengths each define a second height over second the plane, and, representing collectively the first reference material path lengths and the second reference material path lengths using the first model to define the dual-energy direct attenuation surfaces.

The dual-energy x-ray attenuation information may include high-energy x-ray attenuation information and low-energy x-ray attenuation information and the step of selecting a second model may further include the steps of defining a first space wherein the low-energy x-ray attenuation information of the first imposed material and the second imposed material defines a first plane and first imposed material path lengths and second imposed material path lengths each define a first height over the first plane, defining a second space wherein the high-energy x-ray attenuation information of the first imposed material and the second imposed material defines a second plane and first imposed material path lengths and second imposed material path lengths each define a second height over second the plane, and, representing collectively the first imposed material path lengths and the second imposed material path lengths using the second model to define the extrapolated dual-energy direct attenuation surfaces.

A system of one or more computers can be configured to perform the particular operations or actions as described herein by virtue of having software, firmware, hardware, or a combination of them installed on the system that in operation causes or cause the system to perform the actions automatically and in real time or near real time. One or more computer programs can be configured to perform particular operations or actions described herein by virtue of including instructions that, when executed by data processing apparatus, cause the apparatus to perform the actions. Such actions may be performed automatically and in real time or near real time.

DESCRIPTION

The present invention relates to x-ray scanning of objects. More particularly, the present invention relates to x-ray scanning of objects for determining the properties of the materials of which the objects are composed.

The present invention provides methods and apparatuses which are suitable for detection of potentially harmful objects scanned in an x-ray scanning device which provides for automatic and real time or near real time analysis of the information provided.

Figure 1:
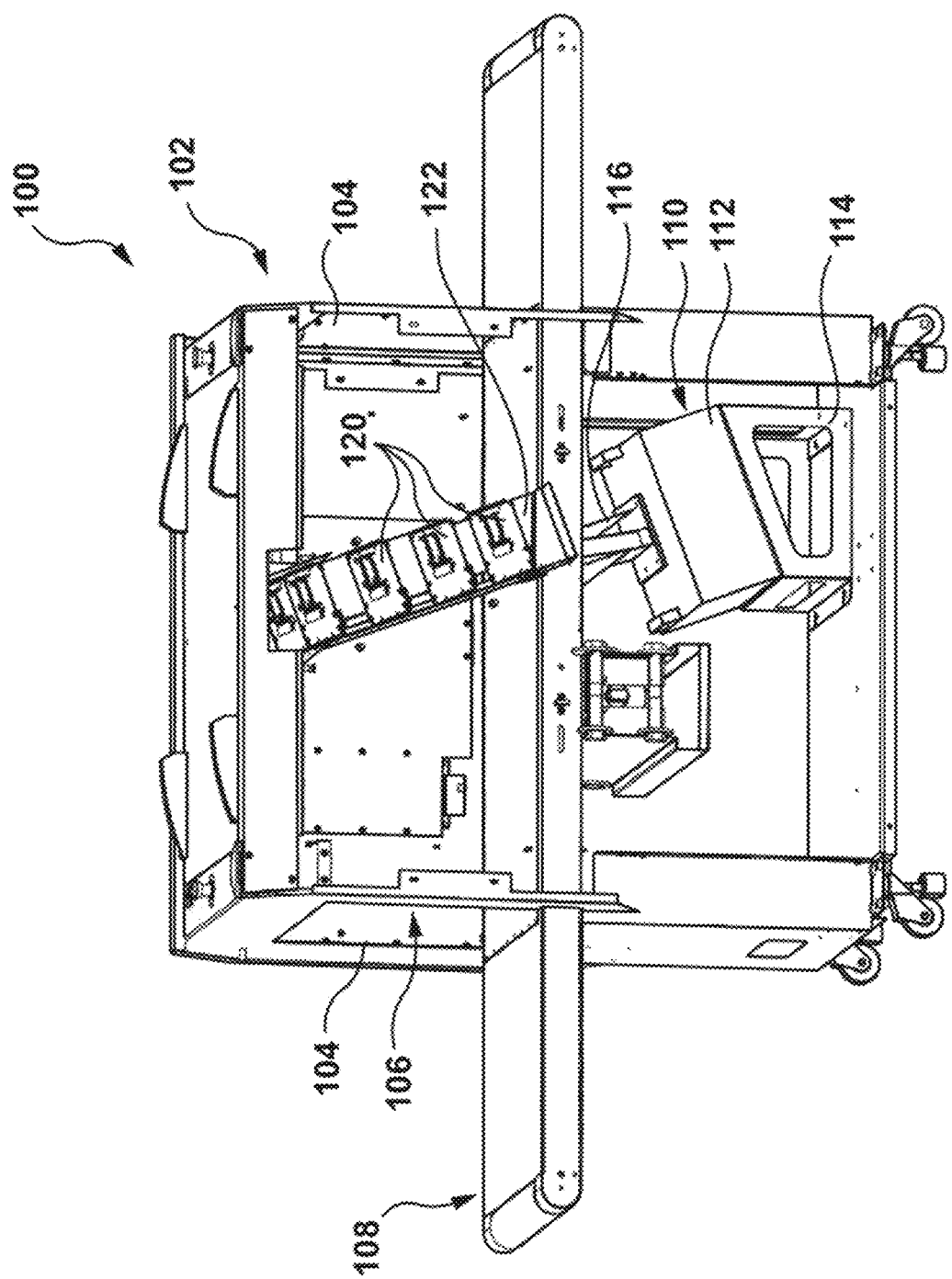
FIG. 1 is an illustration of an exemplary x-ray scanning device which may be used in association with the present invention.

According to the aspect shown in FIG. 1, there is provided an x-ray scanning device 100. The x-ray scanning device 100 includes a housing 102 having openings 104 at either end thereof. The openings 104 provide access to a scanning chamber 106 passing through the housing 102. The system 100 may further include a displacement assembly 108, such as a conveyor, which extends through the scanning chamber 106 and which may be used to displace at least one object of interest to be scanned using the x-ray scanning device 100.

The term "object" as used herein refers to any object of interest, known or unknown, for scanning purposes and is not necessarily limited to a specific shape, size, composition or configuration. The object of interest may be a singular object composed of one or more materials, such as for example, a liquid material contained within a container, or may include a plurality of objects targeted for scanning, such as for example, the contents of a bag of luggage.

The x-ray scanning device 100 further includes a source assembly 110. The source assembly 110 includes a source (not shown) for emitting electromagnetic radiation such as x-rays, a source assembly housing 112 at least partially enclosing the source, a pedestal 114 to which the source assembly housing 112 is mounted and a collimator 116 mounted to the source assembly housing 112 for directing x-rays emitted from the source. Collimator 116 may be of any suitable shape but is preferably a fan-shaped collimator for directing the x-rays in a fan-shaped beam. Moreover, the pedestal 114 is not required and may not necessarily be present in some x-ray scanning devices suitable for the purposes of the present invention.

The x-ray scanning device 100 may further include a group of detectors including at least one detector card 120 and preferably a plurality of detector cards 120 each mounted to the bracket 122. It should be understood to a person skilled in the art that the detector may be in a form other than a detector card that would be suitable for the purposes of the present invention. In one aspect, the bracket is an L-shaped bracket which is positioned outside the scanning chamber 106 such that the plurality of detector cards 120 mounted thereto extend into the scanning chamber 106. In some aspects, the bracket 122 may be located within the scanning chamber. In the aspect shown in FIG. 1 there is shown mounted within the scanning chamber a single bracket 122. It should be understood that in other aspects, the scanning chamber may include more than one bracket positioned within the scanning chamber and that the brackets do not have to have the same orientation or angular position. It should be further understood that the bracket 122 does not have to be L-shaped. Rather, the bracket 122 may be linear or arc shaped or any other suitable shape.

Figure 2:
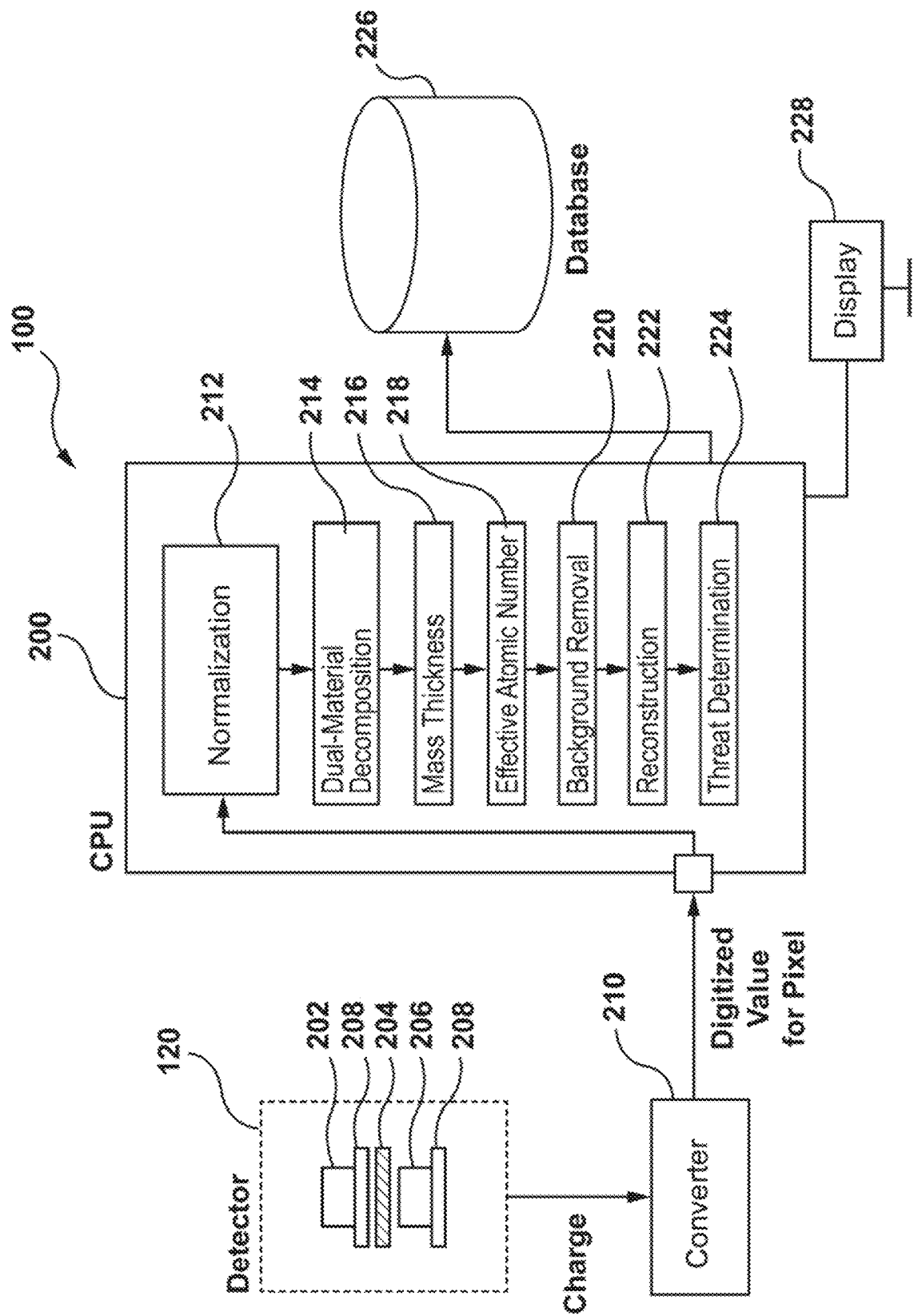
FIG. 2 is an illustration of a system which may be used in association with the present invention.

In some embodiments, each detector card 120 includes at least one individual detector. As shown in FIG. 2, detector cards 120 and the x-ray scanning device 100 may be linked to a central processing unit (CPU) 200 or other processing device so that x-ray signals detected by the detector cards 120 may be analyzed, processed, and used to output information, is further disclosed herein. The processor 200 and its associated architecture may be used to implement any of the processes or methods described herein as well as one or more of their associated steps either automatically or in real-time or both.

According to the aspect shown in FIG. 2, each detector card 120 may comprise a first scintillator material 202, a filter 204 and a second scintillator material 206. All of these may be sandwiched together or otherwise suitably arranged as shown in FIG. 2. In a scanning operation, broad x-ray spectral intensity is emitted by the source and is directed by the collimator 116 toward the plurality of detector cards 120 within the scanning chamber 106. In the case of each detector card 120, a plurality of the emitted x-rays encounter the first scintillator material 202 which may be configured to detect preferentially the lower portion of the emitted x-ray spectral intensity. The spectral intensity of x-rays may then be stopped by the filter 204 and remaining x-rays' spectral intensity reach the second scintillator material 206. Due to the transmission through the first scintillator material 202 and the filter 204, the x-rays spectral intensity reaching the second scintillator material 206 contains a higher portion of high-energy x-rays than the x-rays spectral intensity reaching the first scintillator material 202.

In the context of the present description, the term "processor" refers to at least one computerized component for executing computer-executable instructions. This may include, for example, a central processing unit (CPU), a microprocessor, a controller, and/or the like. A plurality of such processors may be provided, according to different aspects of the present invention, as can be understood by a person skilled in the art. The processor may be provided within one or more general-purpose computers, for/or any other suitable computing device.

The term "storage" may refer to any computer data storage device or assembly of such devices including, for example, a temporary storage unit such as random-access memory (RAM) or dynamic RAM, permanent storage medium such as a hard disk, and optical storage device, such as a CD or DVD (rewritable or write once/read only), a flash memory, a database, and/or the like. A plurality of such storage devices may be provided, as can be understood by a person skilled in the art.

With further reference to FIG. 2, in one aspect, each of these scintillator materials 202, 206 converts the absorbed x-ray energy to infrared, visible and ultraviolet light. Each of these scintillator materials 202, 206 is coupled with a photodiode 208 which captures the light from the respective scintillator 202, 206 and generates a corresponding analog electric signal. The analog electric signal is further digitized by a converter 210. The digitized signal value is associated with a pixel of an image for providing a visual representation of an object being scanned.

In the conversion of the infrared, visible and ultraviolet light into an analog electric signal by the photodiodes 208, some uncertainties may be introduced, in that a given x-ray spectral intensity may result in a different infrared, visible and ultraviolet light source which may also result in different analog electric signals due to the fact that every detector in every detector card may react slightly differently to the presence of electromagnetic radiation. Slight variations in the x-ray and/or light sources may be taken into account in all methods described herein. In order to correct these variations and for the final image to appear more homogeneously, each pixel of the image may be normalized by correcting an offset and gain in the light conversion. The normalization procedure may be executed for example using a normalization module 212 as shown in FIG. 2 in order to compensate for slight variations in offset and gain for each detector, as well as for estimating the expected uncertainties in low-energy and high-energy signals and/or attenuations for each detector.

The apparatus may further include a dual-material decomposition module 214 for decomposing low-energy and high-energy signals and/or attenuations of known or unknown scanned materials into corresponding reference material attribute information, a mass thickness determination module 216 for determining the mass thickness of one or more objects of interest, an effective atomic number module 218 for determining the effective atomic number of one or more objects or materials of interest, a background removal module 220 for distinguishing one object or material from another in a dual-energy image and removing high and low-energy x-ray signal information associated with specific objects which may not necessarily be of interest, a reconstruction module 222 for reconstructing an object of interest once high and low-energy x-ray signal information associated with the specific not-of-interest objects have been removed and a threat determination module 224 for determining whether one or more objects or materials of interest pose a threat and correspondingly raising an alarm condition based on the determination. Information acquired by any of the aforementioned modules may be saved to a suitable storage medium such as a database 226. Moreover, images may be output to a display 228.

Calibration Method

This calibration method described herein is directed to acquiring reference data and deriving values representative of the real-world used for the purpose of computing images representing physical properties of scanned objects from dual-energy transmission images.

In one aspect, the source emits x-rays across an energy spectrum, from 0 keV to the energy corresponding to the peak voltage of the source. The peak voltage may be, for example, 160 kVp. The spectrum S(E) is a function taking, in general, non-zero positive values all over the energy range 0 keV to 160 keV. This spectrum will be detected by two arrays of detectors stacked on top of each other. The array closest to the source is the low-energy (LE) detector and preferentially absorbs x-rays with low-energies among all the energies available in the spectrum. The x-rays that are not absorbed by the LE detectors, pass through the LE detectors and those which are not filtered out by the filters reach the high-energy (HE) detectors, which absorbs x-rays with higher energies due the hardening of the spectral intensity of the x-rays. The materials composing the detectors may also induce a difference in the energies they absorb. The low-energy x-ray signals and the high-energy x-ray signals may be collectively referred to as "dual-energy signals". Likewise, properties of or derived independently from both high-energy x-ray signals and low-energy x-ray signals, such as attenuation or images, for example, may likewise be referred to as "dual-energy". Moreover, since a detector includes both high-energy and low-energy detectors, the detectors themselves may sometimes be referred to as "dual-energy detectors". A person skilled in the art will appreciate that dual-energy signals can also be generated by other means, such as switching the peak voltage of the source or by using two sources, but different fixed peak voltages. In these embodiments, only one scintillator material for each of the detector arrays associated with each of the source would be required to acquire the dual-energy signals.

Figure 7:
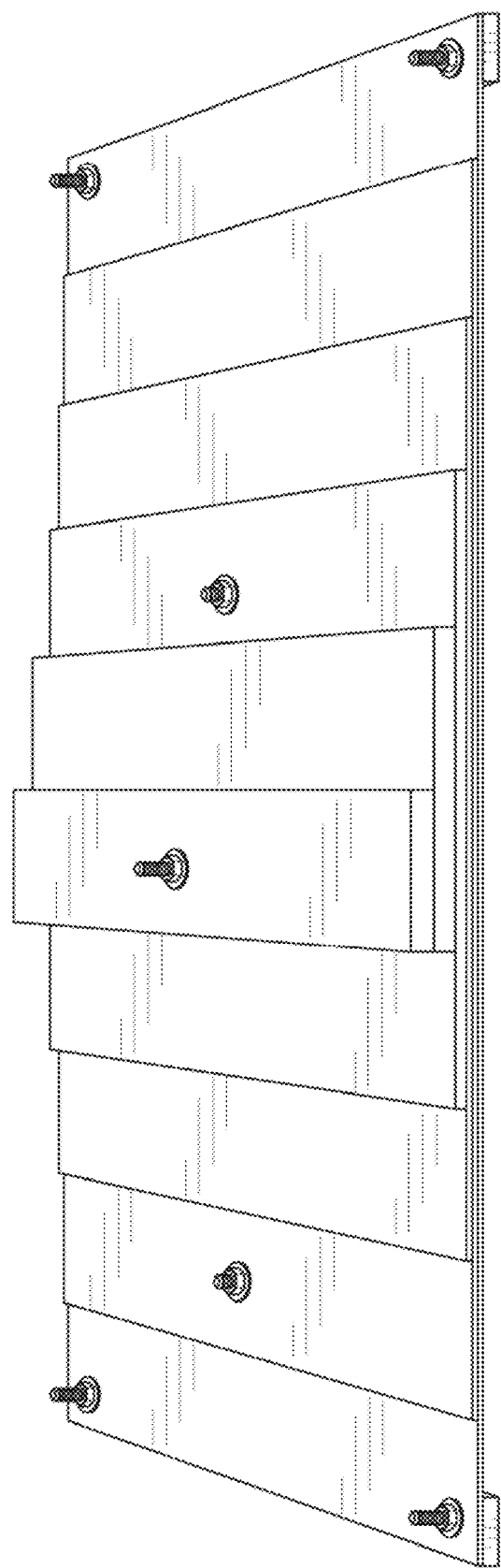
FIG. 7 shows an example step wedge as may be used in association with the present invention.

The method described herein includes decomposing dual-energy x-ray attenuation images into reference material path length images. Preferably, two reference materials are used to provide the basis for the reference material path length images. Accordingly, the set of images provided by the two reference materials may be collectively referred to as the "dual-material" or the "reference material" path length images. The reference material path length images allow the further computation of both the mass thickness and effective atomic number of an object of interest. The mass density of the object of interest may then be deduced from the mass thickness and the path lengths of the object of interest. The dual-material path length decomposition approach includes the acquisition of reference data from reference objects, such as step wedges, composed of two different materials scanned in several different configurations and orientations within the scanning device, as is discussed in further detail hereinafter. FIG. 7 shows an example step wedge composed of 2 plates of ABS stacked on top of 8 plates of Aluminum. The materials composing the step wedges may include any homogeneous material such as, for example, plexiglass, aluminum and/or steel. The step wedge materials are preferably in the form of plates which may have different lengths and thicknesses but each plate is preferably of uniform thickness. An example step wedge may include 10 steps built by stacking plates made of two basis materials on top of each other or otherwise suitably arranged. The steps in the step wedge may be varied in their composition by changing the stacking order of the plates of material and the number of plates of each basis material used in the assembly. For the purposes of providing a basis for decomposition of x-ray attenuation images into reference material path length images, the dual-material step wedges are of known configuration and thickness and are composed of known materials having known atomic composition and mass density. The thickness of each step in the step wedge may be measured directly on the step wedge using a measurement tool such as a caliper. Also known are the relative positions of the detectors with respect to their associated source. This information is available from the mechanical design of the x-ray scanner or may be determined by other suitable means.

Assignment of Path Lengths to Reference Materials

Figure 3:
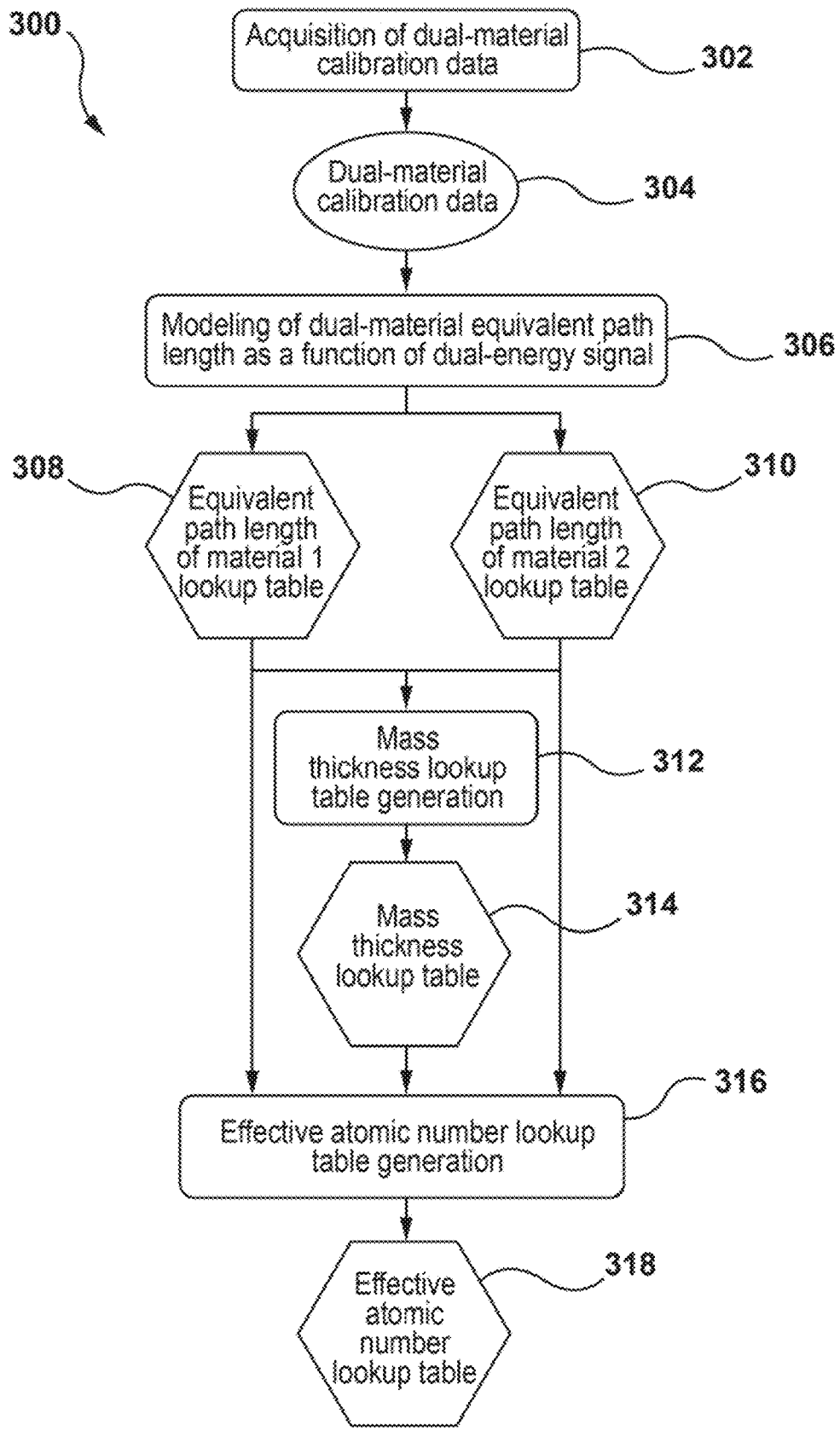
FIG. 3 is a flow chart representing the calibration method of the present invention.

In a first aspect as shown in FIG. 3, there is provided a method 300 for assigning an attribute, such as reference material path lengths, to x-ray attenuation information. In a first step 302, dual-reference materials are scanned, such as a dual-material step wedge having composed of first and second reference materials, preferably in more than one orientation, such as flat on the conveyor belt or on one of its sides and in more than one position within the x-ray scanner such that all active detectors detect the profile of the step wedge in at least one position. Thereby, there is provided dual-material calibration data as in step 304. During each scan of the dual-material step wedge, x-rays pass through the dual-material step wedge to be detected by detectors. The detected x-rays produce dual-energy x-ray signals, which may include low-energy x-ray signals and high-energy x-ray signals. These signals may be used to generate a high-energy (HE) domain image and a low-energy (LE) domain image. Together, the high-energy domain image and the low-energy domain image may be referred to as a "dual-energy image" or a "set of dual-energy images". Each of the high-energy domain image and the low-energy domain image is composed of a plurality of pixels distributed in columns and rows. Each high-energy domain image and low-energy domain image of the scanned dual-material step wedges may be saved in a suitable storage medium such as an information database.

In each LE domain image and/or HE domain image, there will be determined a region-of-interest (ROI). The ROI represents the pixels of the LE or HE domain image representing the scanned step wedge The ROI may exclude among other things the transitions between the steps of the step wedge and other parts of the step wedge used to ensure its mechanical integrity such as, for example, bolts, nuts and sustaining rack. In view of this, it should be understood that the entire image or parts of it may be considered as a whole in order to determine information more complex than that provided by a single pixel.

A path length is the length of the path of an x-ray directed from the source focal point passing through the material to a given detector. Since the thickness of each material of the dual-material step wedge is known, the orientation of the dual-material step wedge within the x-ray scanner is known and the position of the source and all active detectors is known, the path length of the x-rays through material may be calculated for all active detectors. In one aspect, these calculated values may further be placed in a database for storing step wedge material path length values for later retrieval.

The reference material path lengths are mathematical variables derived from the low-energy x-ray attenuation and high-energy x-ray attenuation which corresponds with the path length of the x-rays through a corresponding location in the reference material. The reference material path lengths through a scanned material may be represented using notation $t_m$, m=1, 2. For scanned reference materials, the first and second reference material path lengths are measured and take specific known values denoted as $\hat{t}_m$, m=1, 2. Therefore, the first reference material path length $t_1$ may take corresponding measured first reference material path length values $\hat{t}_1$. The second reference material path length $t_2$ may take corresponding measured second reference material path length value $\hat{t}_2$. Further use of the expressions "first material path lengths" and "second material path lengths" may refer to either the mathematical variables $t_m$, m=1, 2 derived from the low-energy x-ray attenuation and high-energy x-ray attenuation or the corresponding known (measured) values $\hat{t}_m$, m=1, 2, as a person skilled in the art would recognize.

The dual reference material path length values $t_1$ and $t_2$ may then be associated or modeled in step 306 as a function of the measured high and low-energy x-ray attenuation values. In general, the high and low-energy attenuation A associated with the high and low-energy normalized signal I is given by $$A = -\ln\left(\frac{I}{R}\right)$$

where R is an arbitrary strictly positive constant called the normalization range and is equal to the normalized signal when no object is scanned. In view of this, it should be understood to a person skilled in the art that the low-energy or high-energy signal I and low-energy or high-energy attenuation A may be used interchangeably by a person skilled in the art, and may be used interchangeably herein, without departing from the scope of the invention.

Once the dual reference material path length values are modeled as a function of the dual-energy signal, as in step 306, the values may be saved in corresponding lookup tables for more efficient determination of the equivalent path lengths of the first reference material associated with a particular x-ray attenuation as in step 308 and for the path lengths of the second reference material as in step 310. It should be understood that "equivalent" does not necessarily mean perfect physical or geometric equivalence. The term "equivalent" as used herein may refer to close approximation or modeling of the actual physical characteristic of a physical material or object, such as, for example, x-ray path lengths, effective atomic number and mass thickness. As with any modeled physical characteristic, there may be a slight difference between the measured physical characteristic and the modeled physical characteristic. The method may then proceed to step 312 wherein the path length information may be used as a basis for assigning mass thickness values to the dual-energy x-ray attenuation for each of the reference materials. Such mass thickness values may likewise be saved in mass thickness lookup tables as in step 314 for more efficient determination of the mass thickness values associated with dual-energy x-ray attenuation associated with each of the first and second reference materials. Step 312 is discussed in further detail hereinafter. Once the first and second reference material path lengths are associated with specific x-ray energy attenuation information provided by scanning the first and second reference materials, the first and second reference material path lengths may be used to subsequently determine an appropriate effective atomic number, or $Z_{eff}$, to be assigned to the corresponding x-ray attenuation information as in step 316. This step is discussed in further detail hereinafter. Moreover, it should be understood that this step 316 may be performed in advance of, in conjunction with or independently of step 312. The associated effective atomic number values may be saved in lookup tables for more efficient reference in future operations as shown in step 318.

Figure 4:
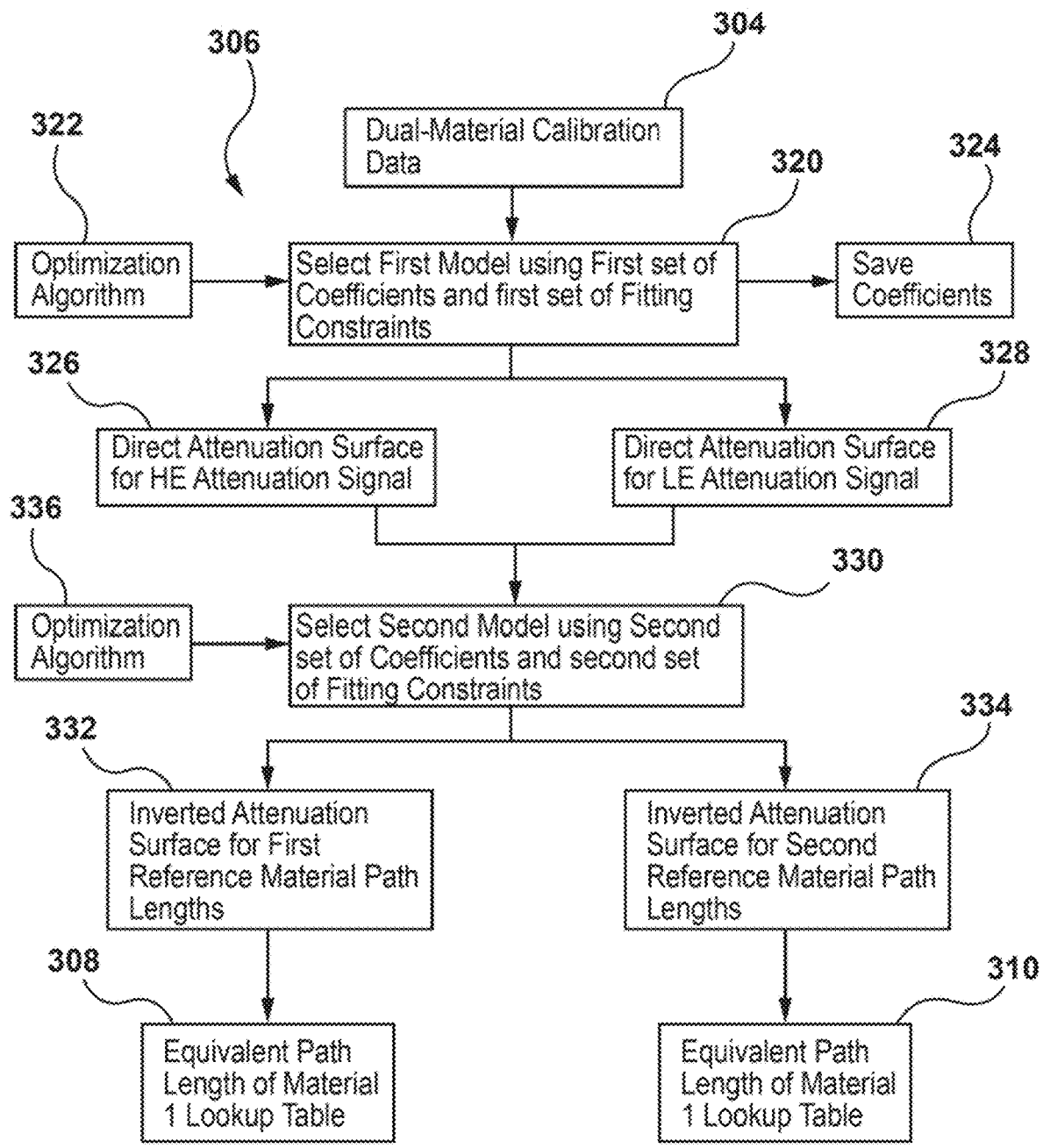
FIG. 4 is a flow chart representing the method for modeling of dual-material equivalent path lengths as a function of the dual-energy signal as shown in FIG. 3.
Figure 5:
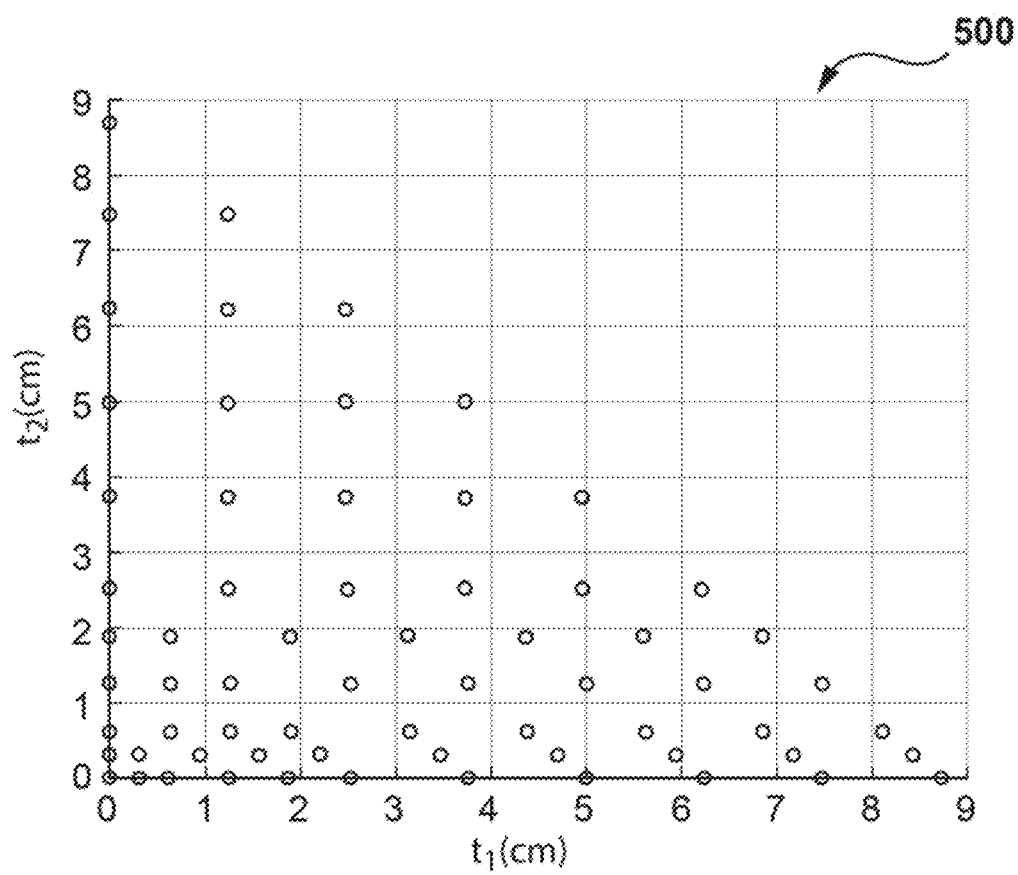
FIG. 5 is an example plane wherein the dual-energy x-ray attenuations measured by a detector are represented on the z axis, the first material path length values $t_1$ are represented on the x axis and the second material path length values $t_2$ are represented on the y axis.
Figure 6:
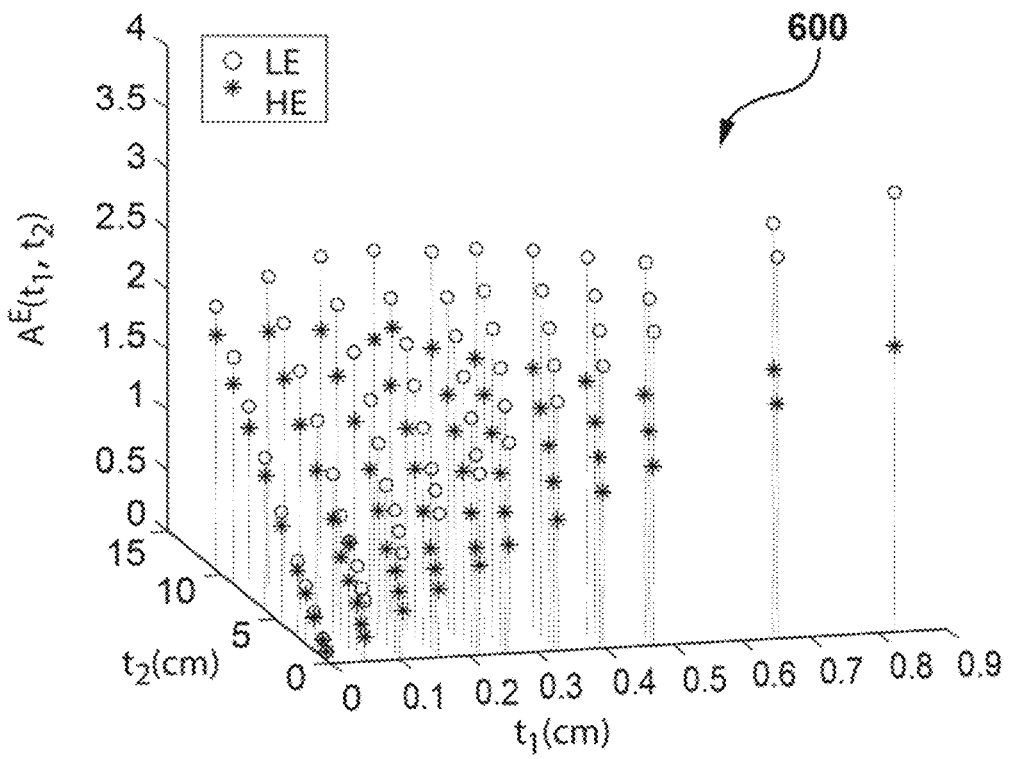
FIG. 6 is an example three-dimensional space wherein the reference material path length values for each pixel representing the reference materials define a plane and wherein a z-axis also represents the corresponding measured HE and LE x-ray attenuation as a height off of the plane.

The step 306 for modeling of the dual-material equivalent path lengths as a function of the dual-energy attenuation signal is further define with reference to FIG. 4 wherein a three-dimensional space may then be defined for each of the measured high and low-energy x-ray signals wherein material path length values $t_1$ through the first material and material path length values $t_2$ through the second material define points ($t_1$, $t_2$) forming a plane and each of the corresponding measured high and low-energy x-ray attenuations each define a height over the plane. There is thereby provided a first three-dimensional space for high-energy x-ray attenuation and second three-dimensional space low-energy x-ray attenuation. An example plane is shown in FIG. 5 wherein the high-energy and low-energy x-ray attenuations measured by a detector are represented on the z-axis, the path length values $t_1$ through the first material are represented on the x-axis and the path length values $t_2$ through the second material are represented on the y-axis. An example three-dimensional space is shown in FIG. 6 wherein the reference material path length values for each pixel representing the reference materials define a plane as in FIG. 5, but wherein a z-axis also represents the corresponding measured HE and LE x-ray attenuation for that detector as a height off of the plane.

At step 320, a first mathematical model is selected which is a function to collectively represent the measured high-energy x-ray attenuations of at least one of the detectors and collectively represent the low-energy x-ray attenuations of the at least one of the detectors in terms of the material path length values $t_m$ for each of the basis materials m=1, 2. A suitable mathematical model can be selected to represent both high-energy x-ray attenuations and low-energy x-ray attenuations, the only difference being the value of the coefficients that best fit high-energy x-ray attenuations and low-energy x-ray attenuations. An initial set of coefficients including at least one coefficient may then be selected for initializing the model for fitting the low-energy x-ray attenuations and the high-energy x-ray attenuations with the model. The sets of coefficients may be identified using vector notation $\vec{c}^E$ where E=LE, HE represents the energy level of the measured low and high-energy x-ray signals. The initial set of coefficients includes at least one coefficient which could potentially be applied to the model depending on the conditions of the scanning operation.

A mathematical model such as, for example, a Pade's approximant would be suitable.

A set of fitting constraints may also be applied to the mathematical model for selecting the coefficients reflecting the actual physical behavior of the direct attenuation surfaces. These constraints force all the fitting coefficients to respect certain mathematical expressions representing real-world physics in order to assure that the inverse attenuation surfaces could be obtained and will be physically meaningful.

Figure 8:
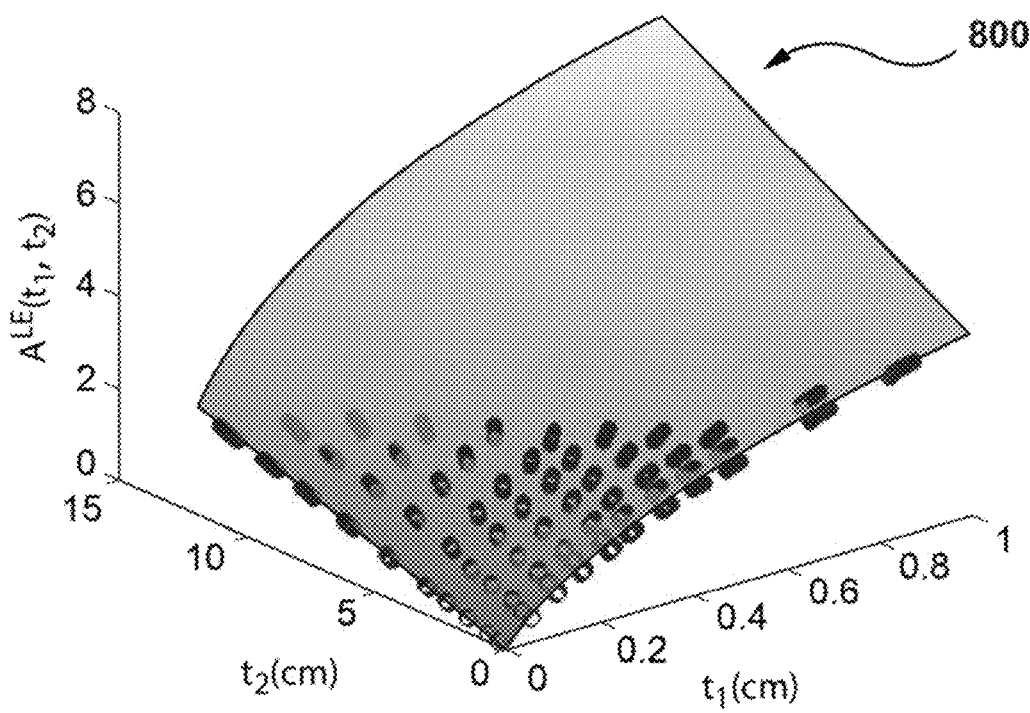
FIG. 8 shows a fitted direct attenuation surface with data points used for the fitting for the low-energy domain.
Figure 9:
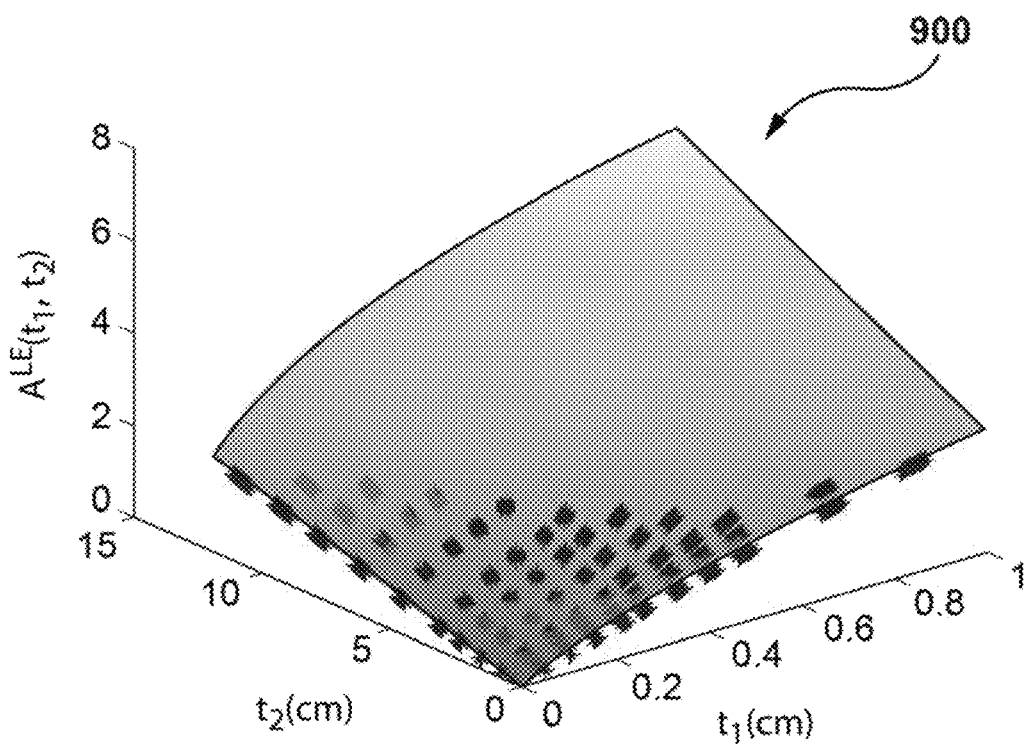
FIG. 9 shows a fitted direct attenuation surface with data points used for the fitting for the high-energy domain.

The data set representing the high and low-energy x-ray attenuations $\hat{A}^E(t_1, t_2)$ may be fitted with the model $A^E(t_1, t_2; \vec{c}^E)$ using an optimization algorithm as in step 322 and the fitting constraints to define the direct attenuation surfaces within their respective three-dimensional space as shown in steps 326 and 328, respectively. Fitted direct attenuation surfaces 800, 900 with data points used for the fitting for the LE and HE domains are shown, respectively, in FIGS. 8 and 9. The optimization algorithm determines the coefficients which provide the strongest correlation between the model and the collective measured high and low-energy x-ray attenuations iteratively starting with the selected initial set of coefficients. This may involve changes to the coefficients as the optimization algorithm is applied until an optimum is reached and/or the coefficients stops changing significantly. Such a determination of the coefficients may be made on the basis of, for example, a least-squares analysis or any other suitable method. Such a determination of the coefficients may also take advantage of known measurement uncertainties in dual-energy attenuations and/or dual-material path length to weight the fitting points in a suitable way. In other words, the coefficients applied to the model are those which provide the closest representation of all of the measured high and low-energy x-ray attenuations collectively by the model in the respective three-dimensional space. The direct attenuation surface is therefore the representation or expression of the collective measured high and low-energy x-ray attenuations provided by the model for the respective energy domain image. Such a representation may, for example, be a high-energy and a low-energy three-dimensional surface 600 related closely to the measured high and low-energy x-ray attenuations as shown in FIG. 6.

The coefficients optimized for the model may be saved in a database as shown in step 324 to be used in further operations. This provides an advantage whereby the potentially computationally intensive step of determining the coefficients can be avoided.

Figure 10A:
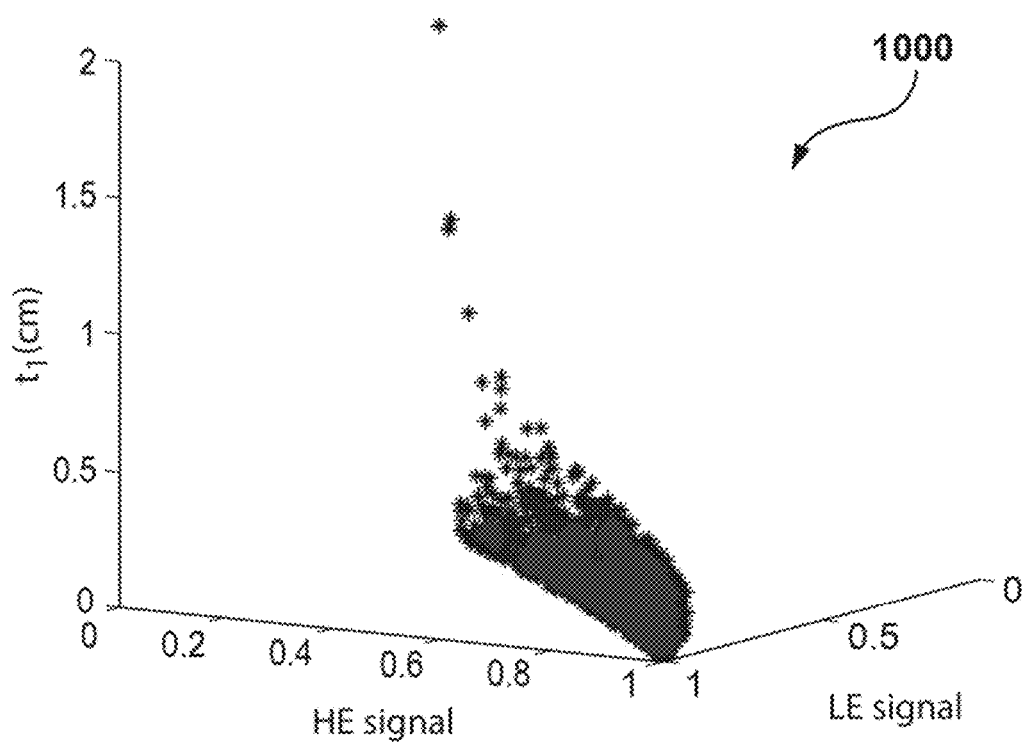
FIG. 10A shows an inverted attenuation surface for the first reference material path lengths $t_1$.
Figure 10B:
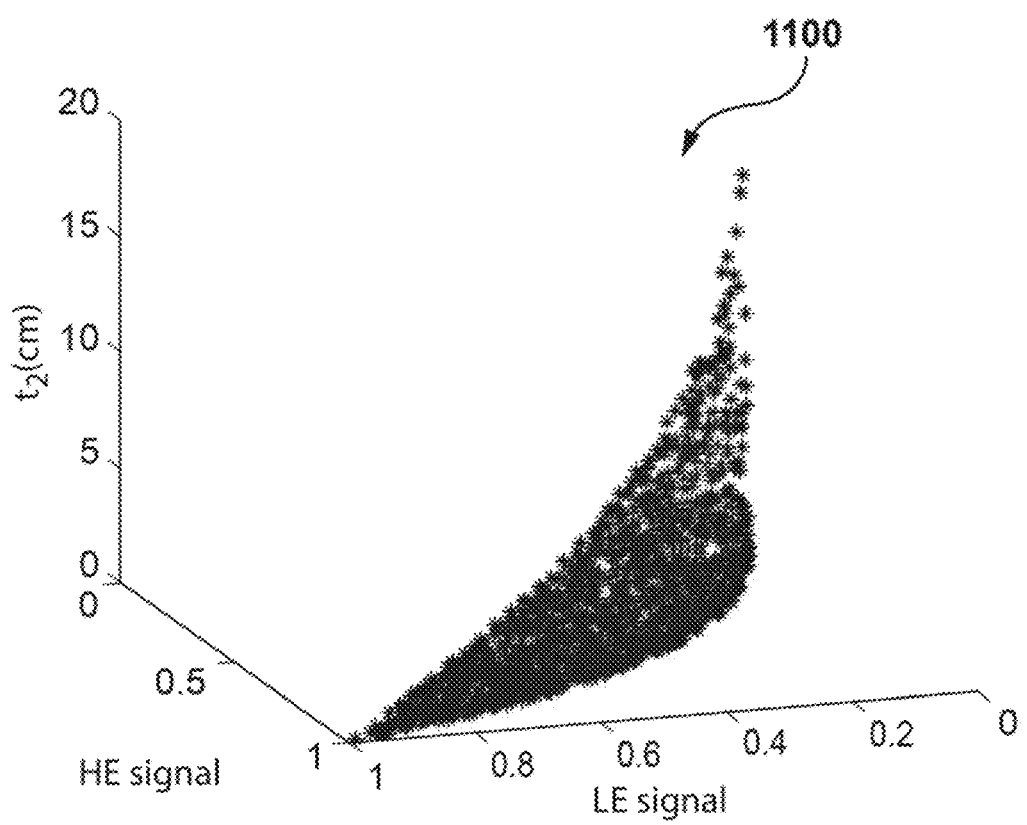
FIG. 10B shows an inverted attenuation surface for the second reference material path lengths $t_2$.
Figure 11:
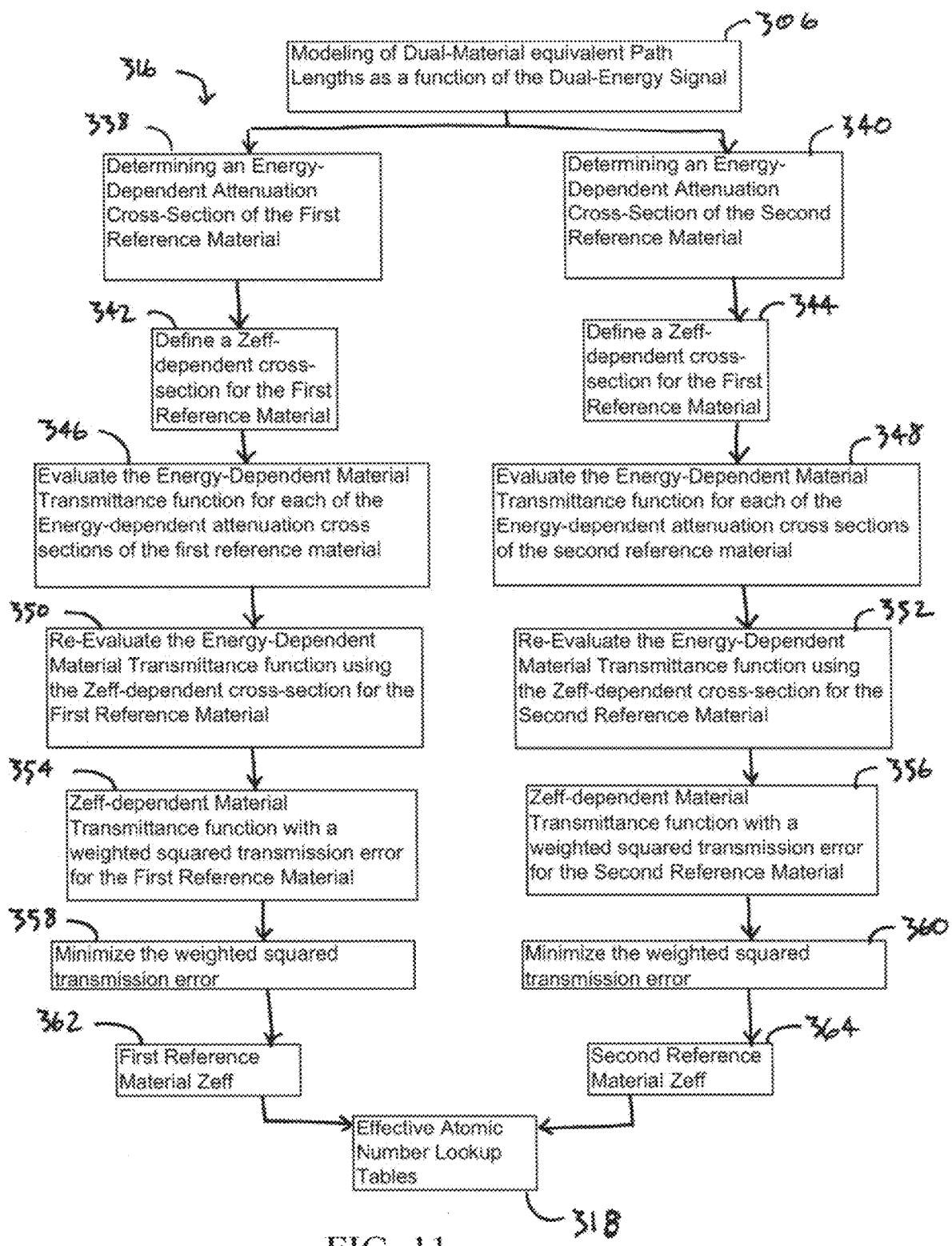
FIG. 11 is a flow chart representing the method for assigning effective atomic number values to the first and second reference material attenuation as shown in FIG. 3.

An inverted three-dimensional space may then be defined for path lengths of the first and the second material wherein the measured high and low-energy x-ray attenuations define a second plane and the associated path lengths for the x-rays passing through the respective material each define a height off of the second plane. At step 330, a second model is selected which is a function to collectively represent the first reference material path lengths and second reference material path lengths as a function of the associated low-energy x-ray attenuations and high-energy x-ray attenuations to each define an inverted attenuation surface as shown in steps 332 and 334. Inverted attenuation surfaces 1000, 1100 for each of $t_1$ and $t_2$ are shown, respectively, in FIGS. 10 and 11. As with the first mathematical model, a second set of coefficients including at least one second coefficient may be applied to the second model for fitting the low-energy x-ray attenuations and high-energy x-ray attenuations with the second model. A second set of fitting constraints including at least one second fitting constraint may also be applied to the second model for selecting the second coefficients. Once again, an optimization algorithm may be used, as shown in step 336, to determine the "best fit" second set of coefficients for fitting the low-energy x-ray attenuations and high-energy x-ray attenuations with the second model. From the inverted attenuation surfaces, the path lengths through each of the two reference materials may be determined when an imposed low-energy x-ray attenuation value and high-energy x-ray attenuation value is imposed to the inverse attenuation surface. First and second reference material path length values associated with high and low-energy x-ray attenuation values may be saved in lookup tables as shown in steps 308 and 310, respectively, for later reference, although the steps 308 and 310 are not necessarily required for the purposes of the method described herein. The method may also totally avoid the use of the second model and determine numerically pointwise inverted surfaces using an optimization algorithm inverting the attenuation surfaces, as shown in FIGS. 10 and 11. Alternatively, a second model may be selected for expressing the pointwise inverted surfaces as a function low-energy x-ray attenuation and the high-energy x-ray attenuation to define inverted attenuation surfaces.

It is preferable to first fit the first model with the first coefficients to define the direct attenuation surfaces and then provide the respective inverse attenuation surfaces within the inverted three-dimensional space using the second mathematical model as described above since this is the more numerically accurate and physically interpretable method of determining the "best fit" coefficients. However, it should be understood that in a second aspect, once the measured low-energy and high-energy x-ray attenuations are associated with each of the first material path lengths and second material path lengths as in the aforementioned method, the method may then proceed directly to the step of selecting the second model to collectively represent all of the first and second material path lengths as respective heights off of the second plane to define the inverse attenuation surface. The second coefficients and the second set of fitting constraints may be used with an optimization algorithm to determine the coefficients directly for the inverted attenuation surfaces without having to first define the direct attenuation surfaces.

There is thereby provided an association between the high-energy and low-energy x-ray attenuation values provided by scanning first and second reference materials and corresponding first and second reference material path lengths. Using the aforementioned method, the material path lengths through each of the first and second reference materials may be determined when at least one low-energy and high-energy x-ray attenuation value is imposed to the inverted attenuation surface. Any pair of high-energy and low-energy x-ray attenuation values imposed on the inverted attenuation surface corresponds to a single path length value through each of the first material and the second material. The path length information provided by the inverted attenuation surface may be saved in an information database such as in a dual-material path length look-up table for use in future operations relating to calibration or other operations whereby it would be useful to determine the path length of basis materials directly from measured x-ray attenuation values in the high and/or low-energy image domains.

A system of one or more computers can be configured to perform the particular operations or actions as described herein by virtue of having software, firmware, hardware, or a combination of them installed on the system that in operation causes or cause the system to perform the actions automatically and in real time or near real time. One or more computer programs can be configured to perform particular operations or actions described herein by virtue of including instructions that, when executed by data processing apparatus, cause the apparatus to perform the actions. Such actions may be performed automatically and in real time or near real time.

Assignment of $Z_{eff}$ to Reference Material Attenuation Information

The step 316 of effective atomic number lookup table generation is discussed in further detail with reference to FIG. 11. Once the first and second reference material equivalent path lengths are associated with specific x-ray energy attenuation information provided by scanning the reference materials, as in step 306, reference material equivalent path lengths may be used to subsequently determine an appropriate effective atomic number, or $Z_{eff}$ to be assigned to the corresponding x-ray attenuation information.

If the contribution of scattered X-rays to the raw signals reaching a dual-energy detector after having passed through a certain length of an homogeneous material M (also called a path length) are neglected, and if it is assumed that the density and atomic composition are constant throughout the material, the dual-energy signal, preferably a normalized dual-energy signal, may be evaluated by integrating a weighted transmittance function of the material over the incident X-ray energy:

$$I_M^E(t_M) = R\int_0^\infty W^E(E')T_M(\rho_M, t_M, E')dE'$$

$I_M^E$ represents the X-ray signal intensity, R is a normalization constant, $W^E$ is a weighting function, $T_M$ us the transmittance function of the material M, E' is the X-ray energy, $t_M$ is the path length trough the material and $\rho_m$ is the material mass density.

The weighting function used is energy dependent, and will therefore vary depending on the X-ray source and detectors used:

$$W^E(E') = \frac{E'D^E(E')S(E')}{\int_0^\infty E'D^E(E')S(E')dE'}$$

Here, E' represents the X-ray energy; S(E') is the X-ray intensity spectrum emitted by the source that comes out of the belt in the scanner; $D^E$ (E') are the sensitivities of the dual-energy detectors to X-rays of energy E'. One representation of the material transmittance function is:

$$T_M(\rho_M, t_M, E') = \exp\left[-\rho_M t_M \frac{\mu}{\rho_M}(E')\right]$$

The transmittance function of the material is an inverse exponential function of the product of the mass density $\rho_m$, the path length $t_M$ and the mass attenuation $$\frac{\mu}{\rho_m}$$

of the material. The material transmittance is represented by $T_M$ in the above equation and the mass density of the material is represented by $\rho_m$ in the above equation. The mass attenuation coefficient of a material is, according to the mixture rule, the weighted average of the mass attenuation coefficients of the chemical elements composing that material. Therefore, one representation of the mixture rule may be:

$$\frac{\mu}{\rho_M}(E') = \Sigma_{i\in M} w_i \frac{\mu}{\rho}(Z_i, E'),$$

where E' represents the x-ray energy. The elements i in the material, represented by their atomic number $Z_i$, are weighted by their weight fractions $w_i$, or in other words, the product of the number of atoms with the atomic mass of each element divided by the total mass of the molecule of the material. Both the mass attenuation coefficient, which may be represented by $\mu/\rho$ ($Z_i$, E'), and atomic masses, which may be represented by $A_i$, of various elements are available in atomic databases.

From an X-ray point of view, a material is totally described by its energy-dependent attenuation cross section per mol of electron and electron density because these two properties completely encapsulate the x-ray absorption properties of a material. Therefore, to have physical meaning, the effective atomic number, $Z_{eff}$ must be defined by specifying the attenuation cross section of a material with a given $Z_{eff}$. For an element i, with an atomic number $Z_i$, this may be represented as:

$$\sigma_e(Z_i, E') = \frac{\mu}{\rho}(Z_i, E')\frac{A_i}{Z_i},$$

where $\sigma_e$ is the energy-dependent attenuation cross section of an element i with atomic number $Z_i$. The energy-dependent attenuation cross section per mol of electron of an element is given by the product of the mass attenuation coefficient with the molar mass over the number of electrons per (unionized) atom of that element, which also happens to be the atomic number of that element.

Therefore, a first step to determining a $Z_{eff}$-dependent attenuation cross-section is to first determine an energy-dependent attenuation cross-section for a material M as shown in steps 338 and 340 for the first and second reference materials, respectively. In the context of assigning effective atomic number values to the reference materials, the material M is one of the two reference materials. Accordingly, the method described herein for assigning $Z_{eff}$ values to x-ray signal energy attenuation must be performed for each of the two reference materials. The energy-dependent attenuation cross section for a material M is given by the average of the energy-dependent attenuation cross section per mol of electron of each element in that material, weighted by the total number of electrons of each element.

Then, the way to assign a $Z_{eff}$ to a material that reproduces its cross section is to define a $Z_{eff}$-dependent cross section and to set the $Z_{eff}$ to the value that best fits the previously defined energy-dependent attenuation cross section for a material M, as shown in steps 342 and 344 for each of the first and second reference materials, respectively. One suitable physics-based definition for the $Z_{eff}$-dependent cross section is a linear combination of the cross sections of the two elements $Z_i$ and $Z_{i+1}$ immediately adjacent to the $Z_{eff}$ value. This could be replaced by another model that fulfills the same purpose. However, if it is considered that the best $Z_{eff}$ value is such that the $Z_{eff}$-dependent cross section is equivalent to the energy-dependent attenuation cross section of a material, the effective atomic numbers for each energy domain are fixed. In order to define a single $Z_M$ for material M, it is necessary to weight the energy dependent curve of $Z_M$ properly.

The evaluation of $Z_{eff}$ is based on transmission measurements of a polychromatic X-ray spectrum emitted by the source through the material of interest and other structural materials composing the scanner housing. Thus, the weighting of the energy dependent $Z_{eff}$ curve must be based on the transmission measurements of the incoming X-ray spectrum. The fraction of incoming X-ray of energy transmitted through the material, or simply the material transmittance, is an inverse exponential function of the electron density and the attenuation cross section of material M. The electron density of material M is defined by its actual mass thickness and the weight fractions, atomic number and mass of each element that composes it. The mass thickness is defined as the product of the mass density and the path length. An equivalent $Z_{eff}$-dependant material transmittance can be defined by using the $Z_{eff}$-dependent cross section instead of the energy-dependent attenuation cross-section, which closely resembles the actual energy-dependent transmittance function of the material. This value is determined by minimizing the weighted squared transmission error, which is given by integrating the weighted difference between the material transmission curve and the equivalent $Z_{eff}$-dependant material transmittance over the X-ray energy spectrum. Since the $Z_{eff}$ is ultimately determined using the total radiative energy transmitted through the material M and absorbed in the dual-energy detectors, the weighting is preferably a compromise between the dual-energy signal weighting, which complicates the error minimization procedure, but avoids ending up with two different $Z_{eff}$ (one per energy level), and the intensity spectrum weighting described in the publication K. Bond, J. Smith, J. Treuer, J. Azevedo, J. Kallman et H. Martz, «ZeCalc algorithm details,» LLNL, Livermore, C A, 2013, which is herein incorporated by reference in its entirety, that neglects the dependency of $Z_{eff}$ on the detection system.

Accordingly, the steps following the definition of the $Z_{eff}$-dependent cross-section for each energy level for each of the reference materials include evaluating the energy-dependent material transmittance function using the previously defined energy-dependent attenuation cross-section for each energy level, as shown in steps 346 and 348 for the first and second reference materials, respectively, and re-evaluating the energy-dependent material transmittance function using the $Z_{eff}$-dependent cross-section as shown in steps 350 and 352 for each of the first and second reference materials, respectively, to provide a $Z_{eff}$-dependent material transmittance function and a weighted squared transmission error as shown in steps 354 and 356. The weighted squared transmission error of the low-energy x-ray energy signal is then minimized in steps 358 and 360 to assign a single $Z_{eff}$ value to each of the reference materials as shown in steps 362 and 364. It should be understood that the step of evaluating the energy-dependent material transmittance function using the previously defined energy-dependent attenuation cross-section for each energy level may be performed once the energy-dependent attenuation cross-section of each of the low-energy x-ray signal domain and the high-energy x-ray signal domain is determined.

It should be understood that the high-energy energy-spectrum-detector weighting function or a combination of the low-energy and high-energy energy-spectrum-detector weighting functions, could be used instead of the low-energy energy-spectrum-detector weighting function in order to provide a single $Z_{eff}$ value to be attributed to the high and low-energy x-ray signal information provided by each of the two reference materials.

The effective atomic number information may be stored in lookup tables or in archive for use in other operations as in step 318 though this is not necessarily required for the purposes of the method described herein. This may avoid the need to execute this potentially computationally intensive step in later operations wherein effective atomic number information may be used. Collectively, the effective atomic number values corresponding to a particular set of dual-energy attenuation images for the pair of reference materials may be referred to as the "effective atomic number images" or simply the "$Z_{eff}$ images".

A system of one or more computers can be configured to perform the particular operations or actions as described herein by virtue of having software, firmware, hardware, or a combination of them installed on the system that in operation causes or cause the system to perform the actions automatically and in real time or near real time. One or more computer programs can be configured to perform particular operations or actions described herein by virtue of including instructions that, when executed by data processing apparatus, cause the apparatus to perform the actions. Such actions may be performed automatically and in real time or near real time.

Assignment of Mass Thickness to Reference Material Attenuation Information

Figure 12:
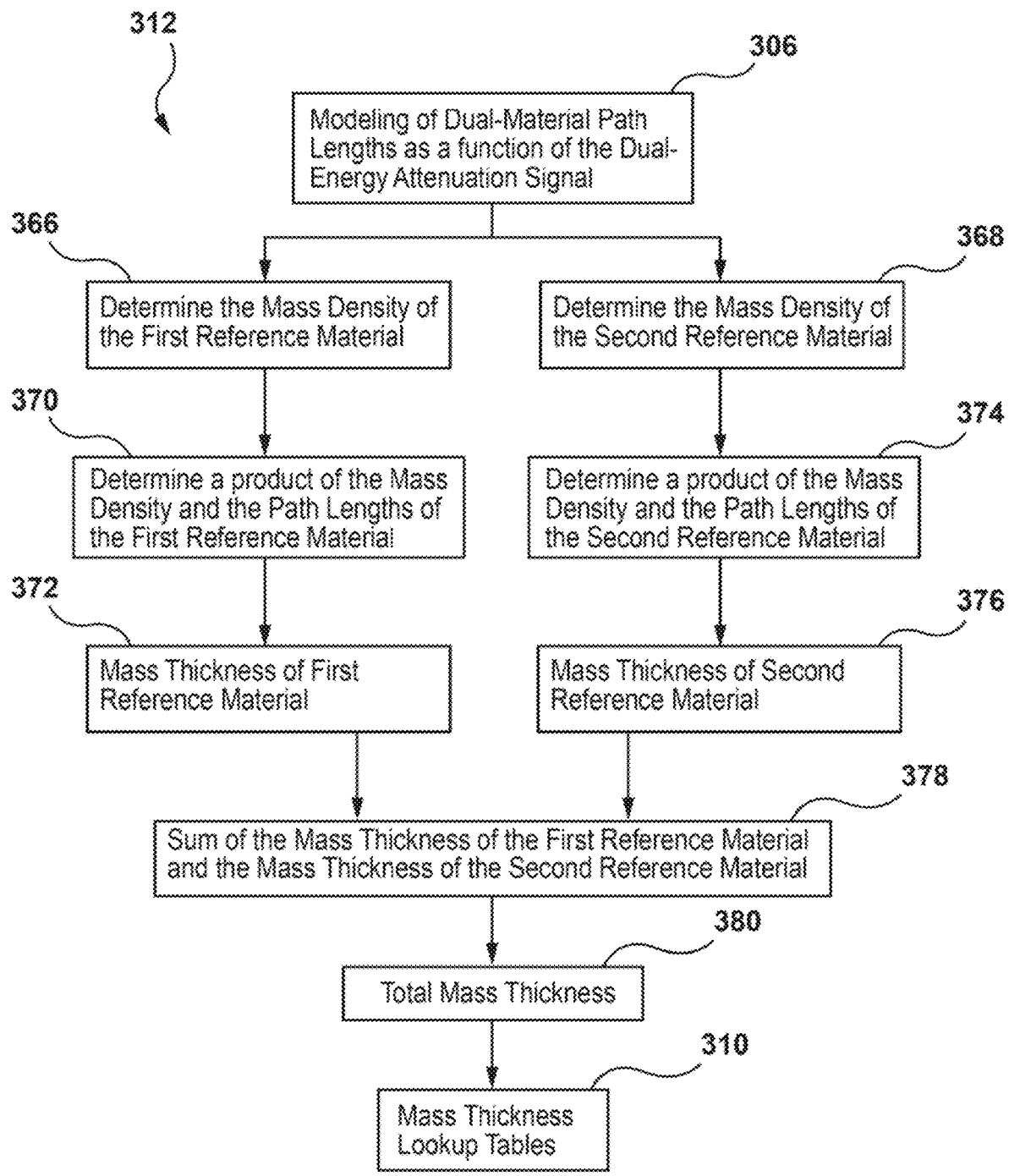
FIG. 12 is a flow chart representing the method for assigning mass thickness to the first and second reference material attenuation as shown in FIG. 3.

The step 312 of mass thickness lookup table generation is discussed in further detail with reference to FIG. 12. Once the path length information for the reference materials has been assigned to the dual-energy x-ray attenuation as in step 306, the path length information may be used as a basis for assigning mass thickness values to the dual-energy x-ray attenuation for each of the reference materials as indicated in step 312. It should be noted that the determination of mass thickness for the reference materials is not dependent on the determination of the $Z_{eff}$ value for the reference materials in step 312. Accordingly, the determination of mass thickness may be performed independently of or in addition to the determination of $Z_{eff}$ for the reference materials.

The dual-material decomposition approach includes rewriting the factor inside the aforementioned exponential function representing the material transmittance as a sum of two similar terms over the pair of reference materials. So, the product of the mass thickness and the mass attenuation of a material M is equivalent to the sum of the products of the mass density and mass attenuation coefficient of the first and second. The mass thickness of a material corresponds to the mass of that material by unit area seen by the detector. Since the source emits X-rays radially, the area seen by the detector increases as the object moves toward the detector. This effect may be disregarded in the present method. From a dual-material decomposition point-of-view, the dual-material mass thickness of a material M is defined as the sum of the mass thicknesses of the first and second reference materials.

In taking the above into consideration, the first step for assigning mass thickness values to the dual-energy x-ray attenuation information includes determining the mass density of each of the first and second reference materials as shown in steps 366 and 368, respectively. Since the physical properties of each reference material are known, this step may, for example, be completed by retrieving the appropriate information from a suitable source. The next step includes determining the first and second reference material equivalent path lengths. This may, for example, be done prior to, subsequently to or in conjunction with steps 366 and 368, using the method described above with reference to FIG. 3 for assigning path length information to dual-energy attenuation values obtained by scanning each of the two reference materials as in step 306. The attenuation information may be imposed on an inverse attenuation surface to identify the corresponding path lengths for each of the first and second reference materials. Subsequently, a product of the first material equivalent path lengths and the mass density of the first reference material is taken at step 370 to provide a first reference material mass thickness at step 372. Similarly, a product of the second material equivalent path lengths and the mass density of the second reference material is taken at step 374 to provide a second reference material mass thickness at step 376. The first reference material mass thickness and the second material mass thickness may then be summed at step 378 to provide a total mass thickness of the first and second reference materials at step 380.

As with the effective atomic number, the mass thickness values associated with the dual-energy x-ray attenuation for each of the reference materials may be stored in lookup tables as in step 318 or in archive for use in other operations, though this step is not required for the purposes of the method as described herein. This may avoid the need to execute this potentially computationally intensive step in later operations wherein mass thickness information may be used. Collectively, the mass thickness values corresponding to a particular set of dual-energy attenuation images for the pair of reference materials may be referred to as the "mass thickness images".

A system of one or more computers can be configured to perform the particular operations or actions as described herein by virtue of having software, firmware, hardware, or a combination of them installed on the system that in operation causes or cause the system to perform the actions automatically and in real time or near real time. One or more computer programs can be configured to perform particular operations or actions described herein by virtue of including instructions that, when executed by data processing apparatus, cause the apparatus to perform the actions. Such actions may be performed automatically and in real time or near real time.

Assignment of $Z_{eff}$ to Attenuation Information of Unknown Material

Figure 13:
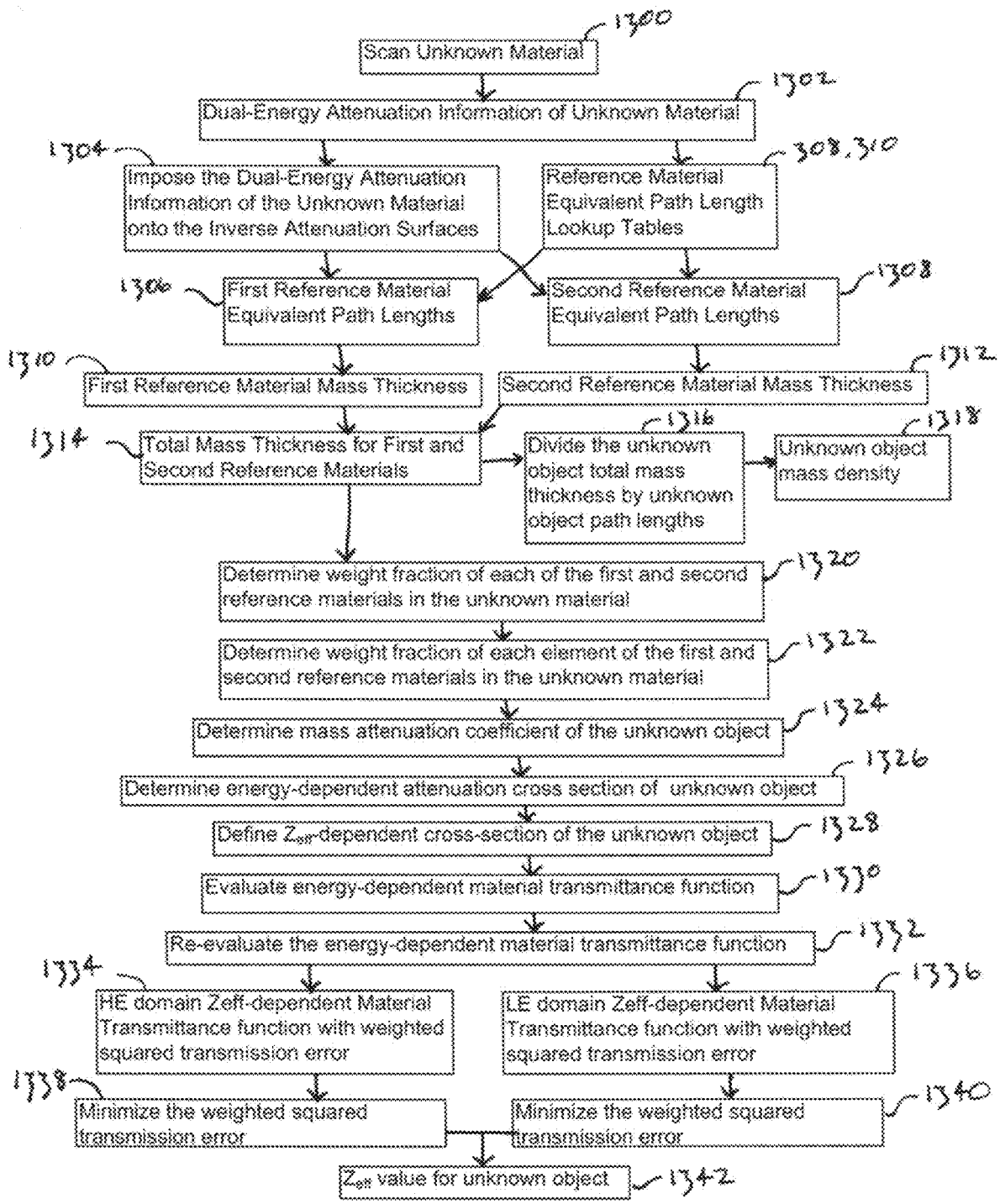
FIG. 13 is a flow chart representing the method for assigning an effective atomic number value to an unknown object.

Once the effective atomic number $Z_m$ of the two reference materials with known atomic composition are known from step 316 and that the mass thickness $\rho t_m$ has been defined as in step 314, these values and the dual-material equivalent path lengths $t_m$ as determined in step 306 may be used to determine the effective atomic number of a material M with an unknown composition. The reference material equivalent path lengths, effective atomic numbers and mass thicknesses may be determined directly by way of new scans and determination according to the methods described above or may be retrieved from suitable lookup tables. This is further discussed with reference to FIG. 13.

If the mass thickness of a reference material that represents the dual material composition of a material M is divided by the mass thickness of that material M, it is shown by involving the surface S of the detector that this is equivalent to the weight fraction of that basis material in the dual material decomposition of the unknown material $$\frac{\rho_m t_m^M}{\rho t_M} = \frac{S\rho_m t_m^M}{S\Sigma_m \rho_m t_m^M} = \frac{\rho_m(t_m^M S)}{\Sigma_m \rho_m(t_m^M S)} = \frac{\rho_m V_m^M}{\Sigma_m \rho_m V_m^M} = \frac{m_m^M}{\Sigma_m m_m^M} = \omega_m^M$$

where $V_m^M$ and $m_m^M$ are effective volume and mass of basis material m in material M, respectively. Substituting the mass thicknesses by weight fractions in the mass attenuation coefficient equation of the dual material decomposition, it becomes clear that this is analogous to the mixture rule presented earlier, but this time in the context of the dual material decomposition. In other words, $$\frac{\mu}{\rho_M}(E') \approx \left[\frac{\rho_1 t_1^M}{\rho t_M}\right]\frac{\mu}{\rho_1}(E') + \left[\frac{\rho_2 t_2^M}{\rho t_M}\right]\frac{\mu}{\rho_2}(E')$$

becomes $$\frac{\mu}{\rho_M}(E') \approx \omega_1^M \frac{\mu}{\rho_1}(E') + \omega_2^M \frac{\mu}{\rho_M}(E')$$

Taking the mixture rule into consideration, this is equivalent to say that the material M is made of a combination of the basis materials, just as it was previously defined in the mixture rule as being composed of a combination of different chemical elements.

The $Z_{eff}$ of various materials are not necessarily positive integer values, like the atomic number of chemical elements. Instead, they make take any positive real values. When the $Z_{eff}$ of a material is equal to an integer value, the mass attenuation coefficient must be equal to the mass attenuation coefficient of the element that has an atomic number equal to that integer value. The behaviour of the mass attenuation coefficient for non-integer $Z_{eff}$ is provided by the aforementioned model. Of note, when the $Z_{eff}$ is equal to one of the two reference materials, it can be expected that the mass attenuation coefficient is the same as the mass attenuation coefficient of that reference material. When a material M is decomposed into reference materials (from the dual material decomposition), it can be further assumed that the reference materials could be further decomposed into their chemical elements (since their chemical composition should be well known). This concept is used to determine the weight fraction of each basis element j of the first and second reference materials:

$$\varpi_j^M = \begin{cases} \sum_m \omega_m^M w_{j \in m}, & \text{if } j \text{ is present in } m = 1 \text{ or } m = 2 \\ 0, & \text{otherwise} \end{cases}$$

This effective basis element weight fraction can be used to determine the mass attenuation coefficient for the unknown material, just like it was used for the reference materials.

Accordingly, the method for assigning an effective atomic number to an unknown material begins at step 1300 with the scanning of an unknown material in an x-ray scanning device to obtain dual-energy x-ray attenuation information for the unknown material at step 1302. The dual-energy x-ray attenuation information of the unknown material may then be imposed to the inverted attenuation surface at step 1304, or referenced using a suitable lookup table, to determine equivalent first and second reference material path lengths through the unknown material as shown in steps 1306 and 1308. It should be understood that corresponding first and second reference material equivalent path lengths may be retrieved from suitable lookup tables as provided by steps 308 and 310 of FIG. 3, if stored in archive subsequent to a prior calibration method scanning operation. The first and second reference material mass thickness in the unknown material may then be determined at steps 1310 and 1312, respectively, using the equivalent first and second reference material path lengths and known mass density of the first and second reference materials. A total mass thickness of the unknown object may be determined as in step 1314 based on a sum of the mass thickness of each of the first and second reference materials in the unknown material. As shown in step 1316, the unknown object total mass thickness may be divided by the unknown object path lengths through the unknown object to provide the mass density of the unknown object at step 1318.

In the next step 1320, a first weight fraction of each of the first and second reference materials in the unknown material may be determined. A second weight fraction of each basis element of each of the first and second reference materials in the unknown material is also determined at step 1322. A mass attenuation coefficient for the unknown material is determined at step 1324, with a product of the effective weight fraction of each basis element of each of the first and second material in the unknown third material and the mass attenuation coefficient of the corresponding element in the first and second materials. The method further includes at step 1326 determining an attenuation cross section of the unknown object. This may be accomplished, for example, by using the respective known basic atomic properties such as the respective effective atomic masses and atomic numbers and mass attenuation coefficient for each of the first and second material.

Then a procedure similar to the one used to assign an effective atomic number to the reference materials is used for the unknown material. Following the determination of the mass attenuation coefficient for the unknown material at step 1326, this includes the steps of defining a Zeff-dependent attenuation cross-section as shown in step 1328, evaluating the energy-dependent material transmittance function at step 1330 using the previously defined energy-dependent attenuation cross-section for each energy level and re-evaluating the energy-dependent material transmittance function at step 1332 using the $Z_{eff}$-dependent cross-section to provide at steps 1334 and 1336, respectively, a $Z_{eff}$-dependent material transmittance function and a weighted squared transmission error for each energy level. The weighted squared transmission error of each energy level and preferably the low-energy x-ray energy signal is then minimized at steps 1338 and 1340, respectively, to assign a single $Z_{eff}$ value to the unknown material at step 1342. It should be understood that, as with the aforementioned method as described within the context of assignment of effective atomic number values to the first and second reference materials, the step 1332 of evaluating the energy-dependent material transmittance function using the previously defined energy-dependent attenuation cross-section for each energy level may be performed once the energy-dependent attenuation cross-section of each of the low-energy x-ray signal domain and the high-energy x-ray signal domain is determined. Accordingly, steps 1332 and 1328, wherein the $Z_{eff}$-dependent attenuation cross-section is defined, are interchangeable.

Note that this procedure does not actually depend on $Z_m$ for m=1, 2, but rather on the decomposition of the fictitious material on a dual-material element basis. Thus, the $Z_{eff}$ is calculated with only one additional approximation than $Z_m$, i.e.: the generalized mass attenuation coefficient of fictitious material M can be represented by a linear combination of the basis elements j of which the first and second reference material are actually made of. This method is a "multi-element dual-material decomposition" for the effective atomic number calculation.

Alternatively, instead of repeating the above process every time a new material is scanned, this procedure can also be done in advance for all points ($I^{LE}/I^{HE}$) in the dual-energy signal mesh. This generates, point by point, the effective atomic number surface $Z_{eff}(I^{LE}, I^{HE})$ and associated uncertainties. Also, if a reverse model associating attenuations to path lengths was used, a new set of coefficients $\vec{f}$, associated with the effective atomic number, has to be derived from the model selected and the definition of the effective atomic number adopted. Then the $Z_{eff}(I^{LE}, I^{HE})$ of the set of coefficients $\vec{f}$ is saved in an effective atomic number database.

A system of one or more computers can be configured to perform the particular operations or actions as described herein by virtue of having software, firmware, hardware, or a combination of them installed on the system that in operation causes or cause the system to perform the actions automatically and in real time or near real time. One or more computer programs can be configured to perform particular operations or actions described herein by virtue of including instructions that, when executed by data processing apparatus, cause the apparatus to perform the actions. Such actions may be performed automatically and in real time or near real time.

Background Removal Method

Reference material path length decomposition also allows for a set of dual energy images or image archives to be transformed into a new set of dual energy images or image archives with layers of materials removed. Depending on the shape and nature of the materials removed, this can lead to images where contrast between objects is enhanced, or where objects are completely removed from the image. This is done by appropriately subtracting the mass thickness of the material or object to be removed from the mass thickness of the combined objects in the archive. Usually, the object to be removed is in the background of the object that is of main interest. Different methods are used to properly evaluate the mass thickness of the background material or object, depending on its shape and whether prior knowledge of it is available.

In some instances, the background to be removed is already known to the X-ray scanner operators. In such cases, the background will have been scanned previously and preferably, the dual-energy images are available in archive. One example of a background object which may be known to an X-ray scanner operator and may have been previously scanned would be a standard x-ray screening tray. Preferably, the tray will have been scanned in the x-ray scanning device in various positions and orientations to provide a plurality of dual-energy images of the screening tray which would be available for subsequent operations from archive. In these cases, a particular method can be used to remove the background object from a newly scanned dual-energy image representing x-ray signal information of the background object and an object of interest at least partially overlapping with one another.

Figure 14:
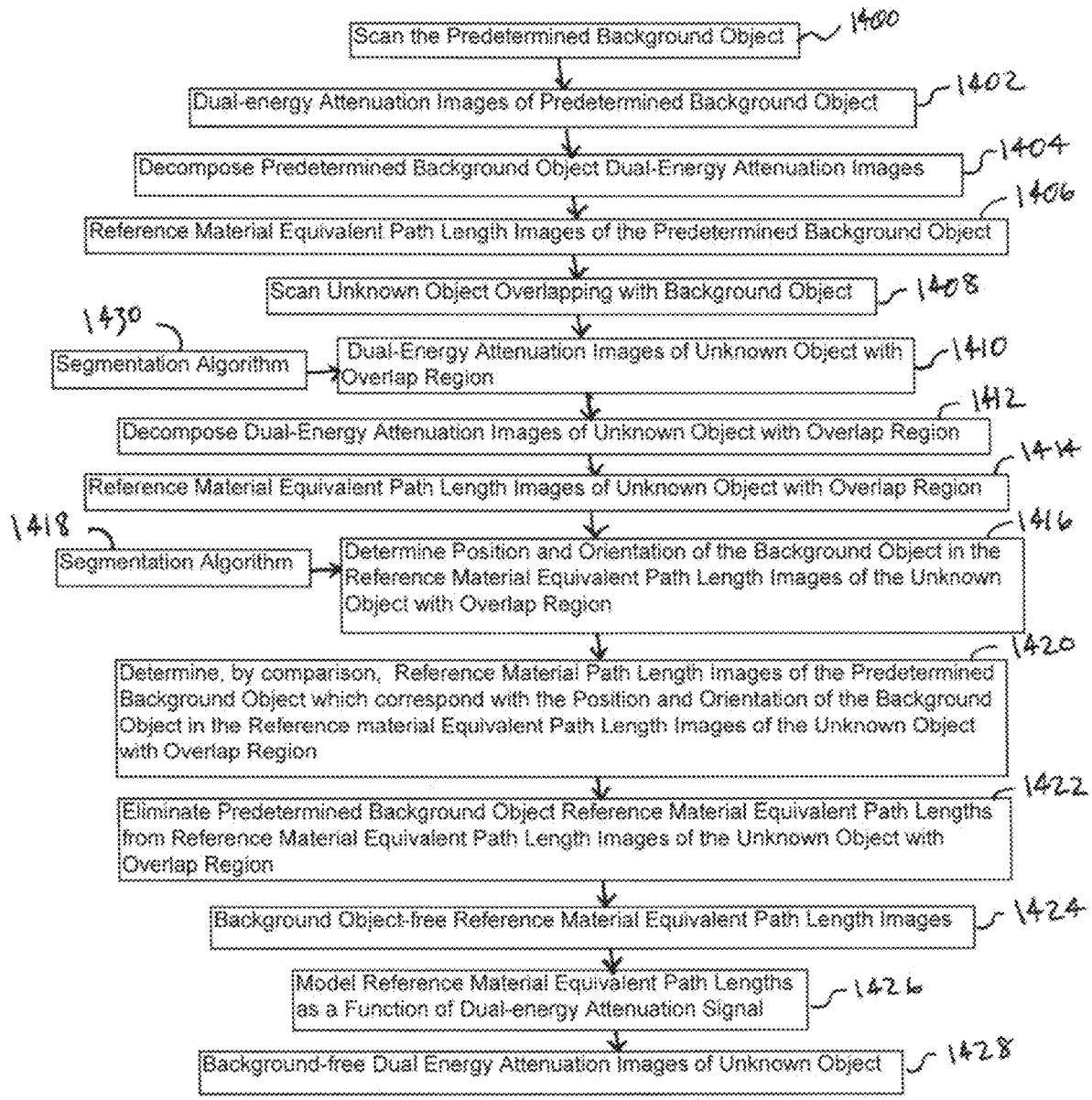
FIG. 14 is a flow chart representing one aspect of a method for removing a predetermined background object from an image.

In accordance with one aspect, there is provided a method for assigning an attribute to an object of interest overlapping with a predetermined background object as shown in FIG. 14. The method includes first scanning the predetermined background object in a plurality of positions and orientations within an x-ray scanning device at step 1400 to obtain a plurality of first dual-energy attenuation images at step 1402 each having dual-energy attenuation information representing the scanned background object. This scanning step 1400 can be performed offline, prior to performing a scan including an object of interest. Then, the background object dual-energy attenuation images may then be decomposed into background object dual-reference material equivalent path length images having first and second reference material equivalent path lengths passing through the background object at step 1404. Such decomposition may be performed, for example, using suitable lookup tables or by way of the method described above with reference to FIG. 3. Thereby, there is provided a reference material equivalent path length images of the predetermined background object at step 1406.

Figure 15:
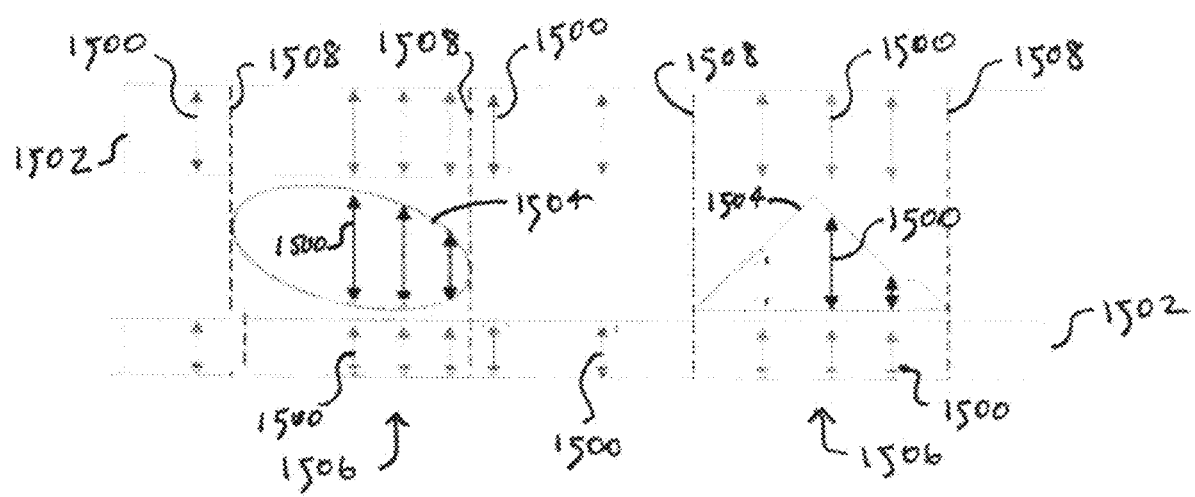
FIG. 15 is an example representation of the object and background path lengths showing an overlap region.

In the next step 1408, the unknown object at least partially overlapping with the background object may be scanned within the x-ray scanning device to obtain a second set of dual-energy attenuation images at step 1410 each having dual-energy attenuation information representing an overlap region wherein the background object and the unknown object overlap. Such an image is illustrated in FIG. 15, for example, wherein x-ray path lengths 1500 are shown passing through both the background object 1502 and the unknown object of interest 1504. Some of the x-ray path lengths pass through both of the background object 1502 and the unknown object of interest 1504 thereby creating an "overlap region" 1506 within the image which overlap region is delineated by imaginary dashed lines 1508.

The second set of dual-energy attenuation images may then be decomposed at step 1412 into reference material equivalent path length images provided at steps 1414, wherein the overlap region has first and second reference material equivalent path lengths passing through both the background object and the unknown object. The position and orientation of the background object in the reference material equivalent path length images containing the overlap region is then determined at step 1416, preferably by using a segmentation algorithm to localize the background object as shown in step 1418. It should be understood that the segmentation algorithm may be applied to either one of the dual-energy attenuation images or the reference material path length images to localize the background object. Accordingly, the segmentation algorithm may instead be applied to the images provided at step 1410, as shown in step 1430. Then, at step 1420, the position and orientation of the background object as identified by the segmentation algorithm is compared with the reference material path length images of the predetermined background object to determine corresponding ones of the reference material equivalent path length images of the predetermined background object which most closely corresponds with the position and orientation of the background object in the reference material equivalent path length images of the scanned unknown object with the overlap region. Once this determination is made, the predetermined background object reference material equivalent path lengths of the corresponding ones of the plurality of the predetermined background object reference material equivalent path length images may be eliminated or subtracted from the overlap region in the reference material equivalent path length images of the unknown object at step 1422 to provide reference material equivalent path lengths having first and second reference material equivalent path lengths passing through only the unknown object, as shown in step 1424. There is thereby provided background-free first reference material equivalent path length images.

Decomposition of the dual-energy attenuation images of the predetermined background object at step 1404 or the dual-energy attenuation images representing the scanned unknown object at step 1412 into reference material equivalent path lengths may be performed in any manner previously described, such as for example, by imposing the dual-energy attenuation information of each pixel onto the inverse attenuation surface to obtain the first and second equivalent reference material path lengths or by using suitable lookup tables. This is previously discussed with reference to FIGS. 3 and 11 and in particular step 306 shown in FIG. 11.

Once the background object-free reference material equivalent path length images are provided at step 1424, the corresponding background object-free dual-energy attenuation images may be reconstructed. This is done, for example, by imposing, at step 1426, the reference material path length values onto a suitable direct attenuation surfaces, as described above, to obtain the corresponding high-energy and low-energy attenuation information images at steps 1428. Once the background object-free dual-energy attenuation images are provided, the images may be normalized. This is previously discussed with reference to FIGS. 3 and 11 and in particular step 306 shown in FIG. 11. These images can further be used to determine the physical characteristics (such as mass thickness and effective atomic number) of the objects remaining, such as, for example, by way of the assignment of the effective atomic number and mass thickness to an unknown material discussed above.

In another aspect, the background object to be removed is not known by the operators but has or is determined to have a path length distribution that is uniform. Preferably, the uniform path length distribution is in the direction of the belt since in the image, this corresponds to the horizontal direction. Under such circumstances, a second method may be used to effectively remove the background object from the image. This method uses a region in the image where only the background object to be removed is present and there are no other objects or materials overlapping with the background object. Since the background is not known but has a uniform path length distribution, preferably in the horizontal direction, the background object must be the same thickness in background only areas and in areas overlapping with other objects. These conditions are understood to be true for each row of pixels in the image in which the background object must be removed, since each row in the image corresponds to a different ray from the X-ray fan beam. To simplify, the background object path length is evaluated in a pixel in a background only region, and since, based on the above conditions, it can be safely assumed to be the same in all other pixels of the same row of pixels, then the background object path lengths can be removed, even if the background object itself is unknown.

Figure 16:
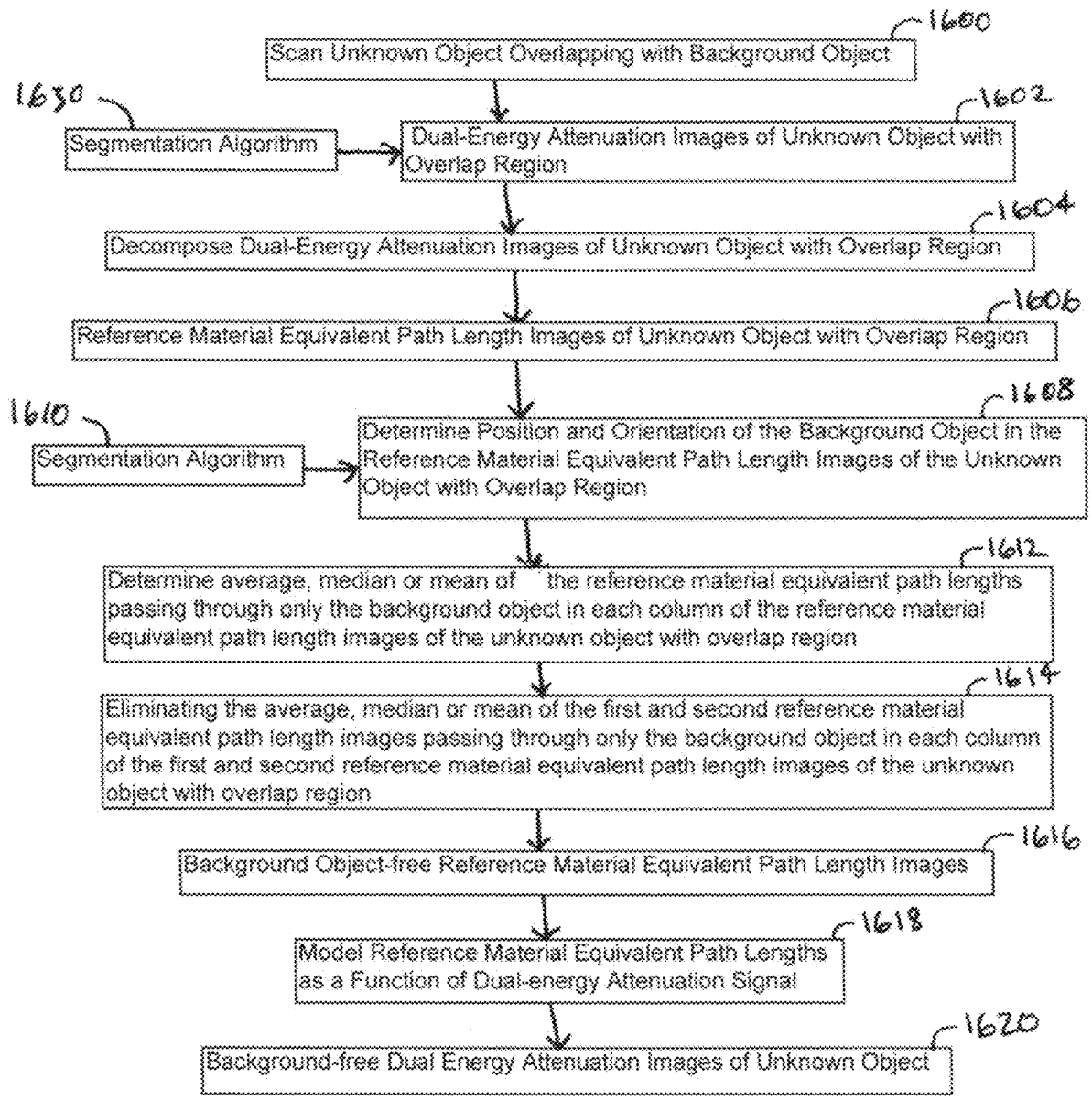
FIG. 16 is a flow chart representing another aspect of method for removing a background object from an image.

There is provided a method as shown in FIG. 16 for assigning an attribute to an unknown object overlapping with an unknown background object having homogenous composition and thickness. In the first step 1600, the unknown object at least partially overlapping with the background object is scanned within the x-ray scanning device to obtain a dual-energy attenuation images at step 1602 having pixels distributed in rows and columns and each having dual-energy attenuation information. The dual-energy attenuation images are then decomposed at step 1604 into dual-reference material equivalent path length images provided at step 1606, each dual-reference material equivalent path length image having a background region with first and reference material equivalent path lengths passing through only the background object and an overlap region with first and second reference material equivalent path lengths passing through the unknown object of interest overlapping with the background object. The background region and the overlap region are then determined at step 1608 by using a segmentation algorithm at step 1610 to localize the background region within the dual-reference material path length images of the unknown object. It should be understood that the segmentation algorithm may be applied to either one of the dual-energy attenuation images or the reference material path length images to localize the background object. Accordingly, the segmentation algorithm may instead be applied to the images provided at step 1602, as shown in step 1630. Then, at step 1612, one of an average, a median and a mean, preferably the average, of the first and second reference material equivalent path lengths passing through only the background object in each column is determined. At step 1614, the one of the average, the median and the mean of the first and second reference material equivalent path lengths passing through only the background object in each column is eliminated or subtracted from the first second reference material equivalent path lengths of each column of the overlap region to determine reference material equivalent path lengths representing only the unknown object of interest as shown at step 1616.

Once the background object-free reference material equivalent path length images are provided at step 1616, the corresponding background object-free dual-energy attenuation images may be reconstructed. This is done, for example, by imposing, at step 1618, the reference material path length values onto a suitable direct attenuation surfaces, as described above, to obtain the corresponding high-energy and low-energy attenuation information images at steps 1620. Once the background object-free dual-energy attenuation images are provided, the images may be normalized. This is previously discussed with reference to FIGS. 3 and 11 and in particular step 306 shown in FIG. 11. These images can further be used to determine the physical characteristics (such as mass thickness and effective atomic number) of the objects remaining, such as, for example, by way of the assignment of the effective atomic number and mass thickness to an unknown material discussed above.

Even when no prior information about the background object is known and the background object is not horizontally uniform, there is provided a third method to perform background object removal. Once again, the method uses, in addition to regions of overlap of the background and another object in the image, a region where there is only background object. The background object path lengths are known and may be determined using measurements or determined by way of a reconstruction algorithm or any other suitable method. The mass density and average atomic effective atomic number of the background object must be constant throughout the background object, both in the background-only region and overlap region of the image. Likewise, both the mass density and effective atomic number of the reference materials from the dual-material decomposition must be known. Finally, the effective atomic model referred to earlier must be mathematically invertible.

In another aspect, there is therefor provided a method for assigning an attribute to an object of interest overlapping with a background object having homogenous composition and non-uniform known thickness. In a first step 1700, the unknown object at least partially overlapping with the background object is scanned within the x-ray scanning device to obtain a dual-energy attenuation images at step 1702 each having pixels distributed in rows and columns and having dual-energy attenuation information. The dual-energy attenuation images are decomposed at step 1704 into reference material equivalent path length images, provided at step 1706, having a background region with first and second reference material equivalent path lengths passing through only the background object and an overlap region with first and second reference material equivalent path lengths passing through the unknown object of interest overlapping with the background object. The effective atomic number of each pixel of the dual-reference material equivalent path length images is determined at step 1708 and the mass thickness of each pixel of the background region and the overlap region in the dual-reference material equivalent path length images is also determined at step 1710. In the next step 1712, the background region and the overlap region are localized, preferably by using a segmentation algorithm as shown at step 1714. It should be understood that the segmentation algorithm may be applied to either one of the dual-energy attenuation images or the reference material path length images to localize the background object. Accordingly, the segmentation algorithm may instead be applied to the images provided at step 1702, as shown in step 1740. Then, the path lengths passing through the background object are obtained or determined using suitable methods at step 1716. The mass thickness of each pixel of the background region may be divided, as at step 1718 by the known background object path lengths to determine the mass density of each pixel of the background region as shown at step 1720. At step 1722, one of an average, a median and a mean of the effective atomic number and the mass density across all pixels of the background region is determined. At step 1724, for every pixel in the overlap region, the mass density of the background region is multiplied with the path lengths of the background region. Next, at step 1726, for every pixel in the overlap region, the mass thickness of the background region is eliminated or subtracted from the total mass thickness of the background region and the overlap region to provide an unknown object mass thickness at step 1728. Next, the density of the unknown object is determined. For every pixel in the overlap region, the unknown object mass thickness is divided by the path length through the unknown object to provide the density of the unknown object at step 1730. Once the mass density is provided at step 1730, the effective atomic number of the object is also calculated as shown at step 1732.

The effective atomic number of the object of interest is calculated by isolating the object effective atomic number in an equation that links the total mass thickness and effective atomic number values of every pixel with those of the object of interest and background object in the overlap region:

$$g[Z_{eff}(i,j)]\rho t(i,j) = g[Z_o]\rho_o t_o(i,j) + g[Z_b]\rho_b t_b(i,j)$$

where; Z is the effective atomic number of every pixel in the object and background in the overlap region, where g[Z] is an invertible function of Z, where o and b represent the object and background respectively, where ρt is the mass thickness, and where i and j represent the pixel of the $i^{th}$ row and $j^{th}$ column. Isolating the effective atomic number of the object $Z_o$ gives:

$$Z_o(i,j) = g^{-1}\left\{\frac{g[Z_{eff}(i,j)]\rho t(i,j) - g[\bar{Z}_b]\rho t_{b\in ob}(i,j)}{\rho t_{o\in ob}(i,j)}\right\}.$$

The background-free dual-material path lengths images of the object $t_1^o(i,j)$ and $t_2^o(i,j)$ are then determined at step 1734 by solving the following system of equation for every pixel (i, j) in the overlap region ob:

$$\begin{cases} \rho t_{o\in ob}(i,j) = \rho_1 t_1^o(i,j) + \rho_2 t_2^o(i,j) \\ g[Z_o(i,j)]\rho t_{o\in ob}(i,j) = g[Z_1]\rho_1 t_1^o(i,j) + g[Z_2]\rho_2 t_2^o(i,j) \end{cases}$$

wherein the solutions are:

$$t_1^o(i,j) = \frac{\rho t_{o\in ob}(i,j)}{\rho_1}\left\{\frac{g[Z_o(i,j)] - g[Z_2]}{g[Z_1] - g[Z_2]}\right\}$$

$$t_2^o(i,j) = \frac{\rho t_{o\in ob}(i,j)}{\rho_2}\left\{\frac{g[Z_1] - g[Z_o(i,j)]}{g[Z_1] - g[Z_2]}\right\}.$$

Decomposition of the dual-energy attenuation images of the background object at step 1704 may be performed in any manner previously described, such as for example, by imposing the dual-energy attenuation information of each pixel onto the inverse attenuation surface to obtain the first and second equivalent reference material path lengths or by using suitable lookup tables. This is previously discussed with reference to FIGS. 3 and 11 and in particular step 306 shown in FIG. 11.

Once the background object-free reference material equivalent path length images are provided at step 1734, the corresponding background object-free dual-energy attenuation images may be reconstructed. This is done, for example, by imposing, at step 1736, the reference material path length values onto a suitable direct attenuation surfaces, as described above, to obtain the corresponding high-energy and low-energy attenuation information images at steps 1738. Once the background object-free dual-energy attenuation images are provided, the images may be normalized. This is previously discussed with reference to FIGS. 3 and 11 and in particular step 306 shown in FIG. 11. These images can further be used to determine the physical characteristics (such as mass thickness and effective atomic number) of the objects remaining, such as, for example, by way of the assignment of the effective atomic number and mass thickness to an unknown material discussed above.

A system of one or more computers can be configured to perform the particular operations or actions as described herein by virtue of having software, firmware, hardware, or a combination of them installed on the system that in operation causes or cause the system to perform the actions automatically and in real time or near real time. One or more computer programs can be configured to perform particular operations or actions described herein by virtue of including instructions that, when executed by data processing apparatus, cause the apparatus to perform the actions. Such actions may be performed automatically and in real time or near real time.

Calibration Range Extension Method

The dual material decomposition described above in the calibration method is best suited for the range of effective atomic numbers situated between the effective atomic numbers of the reference materials used in the calibration step wedges. It may be desirable to extend the calibration range provided by a standard dual-material calibration method while keeping the physical significance of inverse attenuation surfaces generated using the calibration method. This would enable dual-material decomposition of a wider range of material compositions than would be possible for a given set of two reference materials with a standard dual-material calibration method.

In a first method, two or more of the ranges of the dual-material path length decomposition data may be combined to extend the total range of dual-material path length decomposition data. In this first method, dual-material path length decomposition is performed on a first reference material and a second reference material. Then, dual-material path length decomposition is performed on the second reference material with a third reference material. Therefore, the second reference material path attenuation information is common to both sets of data. A subset of coefficients is then identified which may be used to combine the dual-material decomposition information provided by the first and second reference material ($\vec{c}_{12}^E$) and the second and third reference material ($\vec{c}_{23}^E$) based on the common elements of the models used to represent the second reference material within the two data sets. Thereby, a broader range of attributes may be assigned to x-ray attenuation values.

Figure 18:
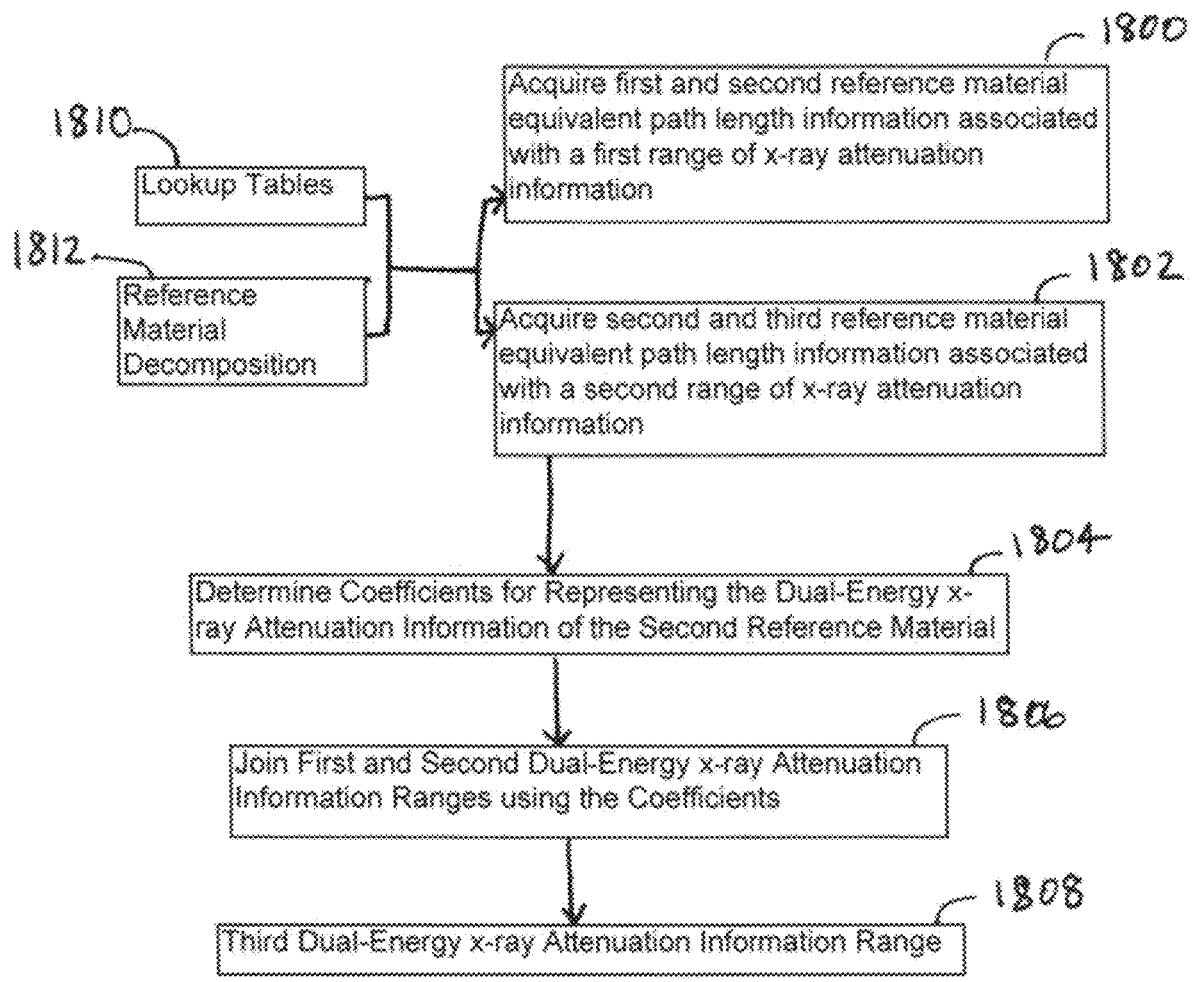
FIG. 18 is a flow chart representing one aspect of a method for extending a range of calibration information.

With reference to FIG. 18, in a first aspect, the method for assigning attributes to x-ray attenuation information includes as a first step 1800 acquiring first and second reference material equivalent path length information associated with a first range of dual-energy x-ray attenuation information. At step 1802, second and third reference material equivalent path length information associated with a second range of dual-energy x-ray attenuation information is acquired. At step 1804, suitable coefficients are determined for representing the dual-energy x-ray attenuation information of the second reference material. At step 1806, the coefficients are used to join the first and second dual-energy x-ray attenuation information ranges to define, at step 1808, a third dual-energy x-ray attenuation information range upon which upon which may be imposed dual-energy x-ray attenuation values within the third dual-energy x-ray attenuation information range to determine corresponding first reference material equivalent path lengths and third reference material equivalent path lengths.

The first and second reference material equivalent path length information and second and third reference material equivalent path length information may be determined by any suitable method previously described. Preferably, such information is retrieved from lookup tables, as shown at step 1810, having, respectively, saved first and second or second and third reference material equivalent path lengths associated with the dual-energy x-ray attenuation information corresponding with the dual-energy attenuation information range. Alternatively, as shown at step 1812, the first and second or second and third reference material path length information may be determined by repeating the dual-material decomposition method previously described for fresh scans of suitable reference materials.

In another method, the calibration range may be extended using a single additional material. When decomposed onto the dual-material basis of first and second reference materials, dual-energy attenuation curves of the second reference material may be represented by $A_{12}^E(0, t_2; \vec{c}_{12}^E)$.

Figure 19:
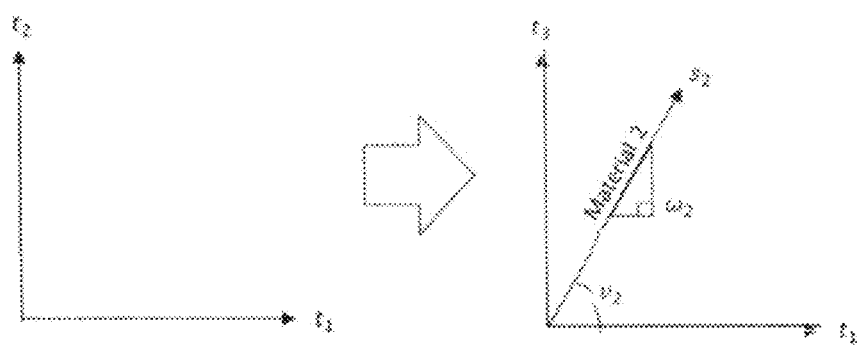
FIG. 19 is a representation of the method shown in FIG. 18.

If it is further considered that a decomposition onto the dual-material basis of the first reference material and a third reference material, with the effective atomic number of the third reference material being greater than the effective atomic number of the second reference material and the effective atomic number of the second reference material being greater than the effective atomic number of the first reference material, and the associated dual-energy direct attenuation surfaces of the first and third reference material and corresponding coefficients of the third reference material, then it is understood that the second reference material would be represented by a subset of data in the range of the first reference material and the third reference material. This concept is illustrated in FIG. 19 wherein the range provided by the first reference material and the third reference material is represented by the first quadrant in a graph. The second reference material is represented by a specific radial axis coming out of the origin in the first quadrant of the $t_1$-$t_3$ plane. If the inverse attenuation surfaces for the first and third reference materials are available, then all the pixels of the first and third reference material path length images of an object made of the second reference material would fall on this axis, no matter the path length through the second reference material.

Denoting the slope of the line supporting the axis representing the second reference material in the $t_1$-$t_3$ plane by $\omega_2$, the line equation may be represented by:

$$t_3 = \omega_2 t_1$$

The orientation of this line can also be defined by the volume fraction of the first reference material in the dual-material basis of the first and third reference materials representing the second reference material this may be represented by:

$$v_2 = \frac{1}{1+\omega_2} = \frac{t_1}{t_1+t_3}$$

The sum of the first and third reference materials path lengths on the axis representing the second reference material may be represented by:

$$s_2 = t_1 + t_3$$

Since $t_1, t_3 \geq 0$ in the first quadrant, $s_2 \geq 0$ and $s=0$ if and only if $t_1 = t_3 = 0$ (i.e. at origin) Then, the change of variables $(t_1, t_3) \rightarrow (s_2, v_2)$ can be defined using the set of equations:

$$\begin{cases} t_1(s_2, v_2) = v_2 s_2 \\ t_3(s_2, v_2) = (1-v_2)s_2 \end{cases}$$

The dual-energy attenuation curves over the axis representing the second reference material in the dual-material basis provided by the first and third reference materials may therefore be represented as $A_{13}^E(s_2, v_2; \vec{c}_{13}^E)$ for $s \neq 0$. For $s=0$, it is clear that attenuations vanish for both the high and low energy level. By the reunion of the domains ($s_2=0$ and $s_2 \neq 0$), then $A_{13}^E(s_2, v_2; \vec{c}_{13}^E)$ is defined over the domain $s_2 \geq 0$.

For fixed $v_2$ and dual-energy attenuations that could be both achieved for a given path length $t_2$ through the second reference material, it should be understood that in general: $t_2 \neq s_2$. However, there is a nonlinear path length-dependent scaling factor $S_2(t_2)$ mapping locally $A_{12}^E(0, t_0; \vec{c}_{12}^E)$ onto $A_{13}^E(S_0, v_2; \vec{c}_{12}^E)$ for some $s_0 = S_2(t_0)$. The union of all such mappings along the axis representing the second reference material in the dual-material decomposition of the first and third reference material plane leads to a continuous function $s_2 = S_2(t_2)$. Physically, we also know that $S_2(0)=0$.

Therefore, in order to extend the calibration range provided by the dual-material decomposition of the first and second reference material up to a calibration range provided by the dual-material decomposition of the first and third reference material without having to first determine the direct or inverse attenuation surfaces of the dual-material basis provided by the first and third reference materials, it is desired to determine the map $S_2$ between $t_2$ and $s_2$, the dual-material basis provided by the first and third reference materials and the orientation $v_2$ of the axis representing the second reference material in the first and third reference material dual-material basis.

It can be assumed that there is an orientation and a scaling factor such that:

$A_{12}^E(0, t_2; \vec{c}_{12}^E) = A_{13}^E(S_2(t_2), v_2; \vec{c}_{13}^E)$ all over the $s_2$ axis. Thus, using this equivalence principle and knowing that $A_{12}^E(0, t_2; \vec{c}_{12}^E)$ explicitly, the mapping $S_2(t_2)$ can be found implicitly for fixed $v_2$. $v_2$ can be determined because the above equation holds true when $t_2 = s_2 = 0$.

Figure 20:
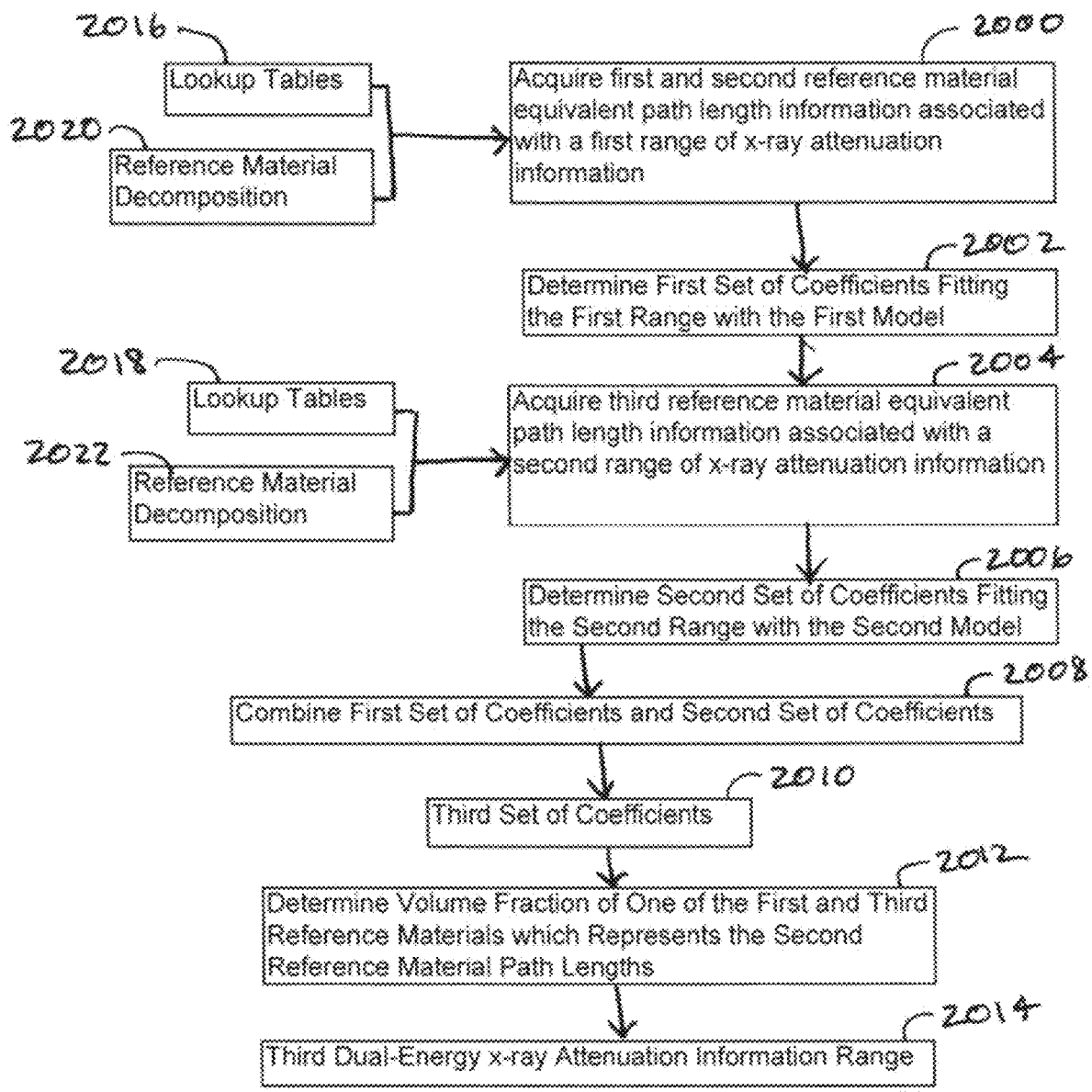
FIG. 20 is another aspect of the method for extending a range of calibration information.

In accordance with the above and with reference to FIG. 20, a second aspect of the method for assigning an attribute to x-ray attenuation includes acquiring at step 2000, first and second reference material equivalent path length information associated with a first range of dual-energy x-ray attenuation information by a first model for expressing collectively each of the first reference material path lengths and the second reference material path lengths as a function of the associated first range of dual-energy x-ray attenuation information. The first range of dual-energy attenuation information is fitted with the first model by a first set of coefficients. At step 2002, the first set of coefficients is determined. At step 2004, there is acquired third reference material equivalent path length information associated with a second range of dual-energy x-ray attenuation information by a second model for expressing collectively each of the third reference material equivalent path lengths as a function of the associated second range of dual-energy attenuation information. The second range of dual-energy attenuation information is fitted with the second model by a second set of coefficients. At step 2006, the second set of coefficients is determined. The third reference material has an effective atomic number greater than that of the second reference material. At step 2008, the first set of coefficients and the second set of coefficients are combined to provide a third set of coefficients at step 2010 for fitting the first and second range of dual-energy x-ray attenuation information with a third model for expressing collectively the first and third reference material path lengths as a function of the fitted first and second range of dual-energy x-ray attenuation information. For all points in the third model, there is determined at step 2012, a volume fraction of one of the first and the third reference material which represents the second reference material path lengths to identify where in the third model path lengths representing the second reference material are represented. There is thereby provided at step 2014 the third dual-energy x-ray attenuation range.

The first and second reference material equivalent path length information and third reference material equivalent path length information may be determined by any suitable method previously described. Preferably, such information is retrieved from lookup tables, as shown at steps 2016 and 2018, having, respectively, saved first and second or third reference material equivalent path lengths associated with the dual-energy x-ray attenuation information corresponding with the dual-energy attenuation information range. Alternatively, as shown at steps 2020 and 2022, the first and second or third reference material path length information may be determined by repeating the dual-material decomposition method previously described for fresh scans of suitable reference materials.

Figure 21:
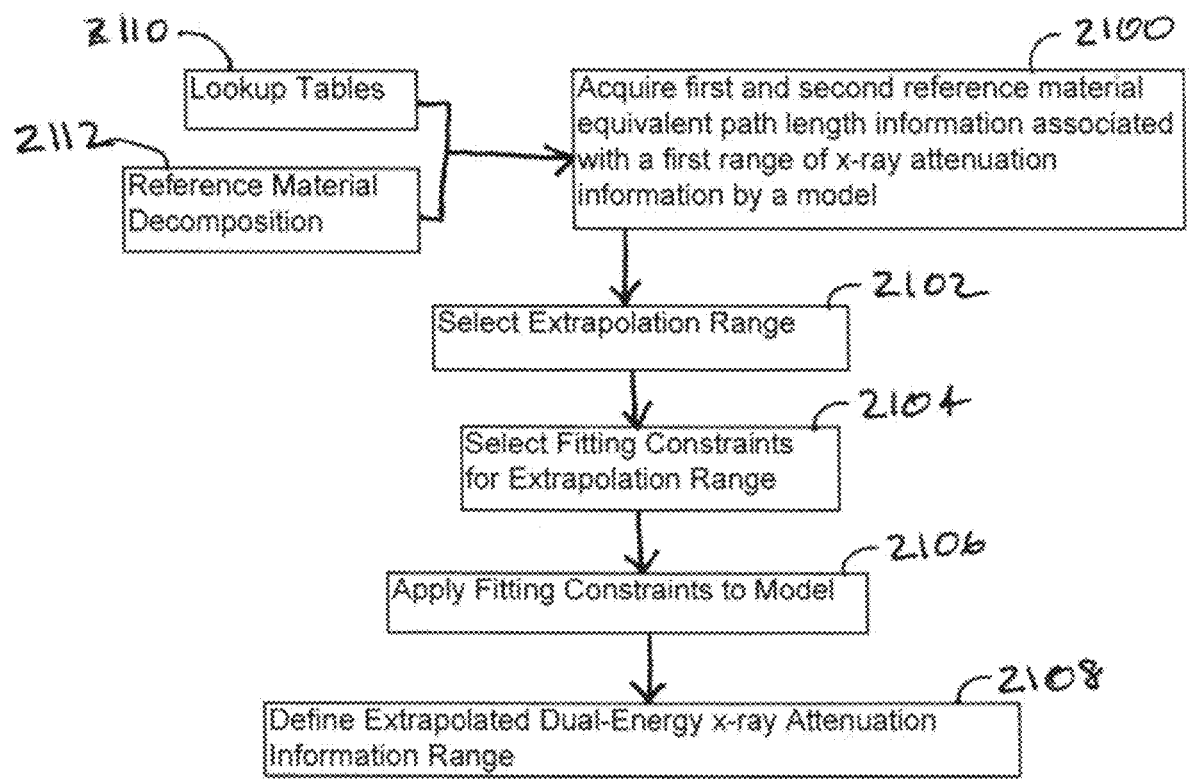
FIG. 21 is another aspect of the method for extending a range of calibration information.
Figure 22:
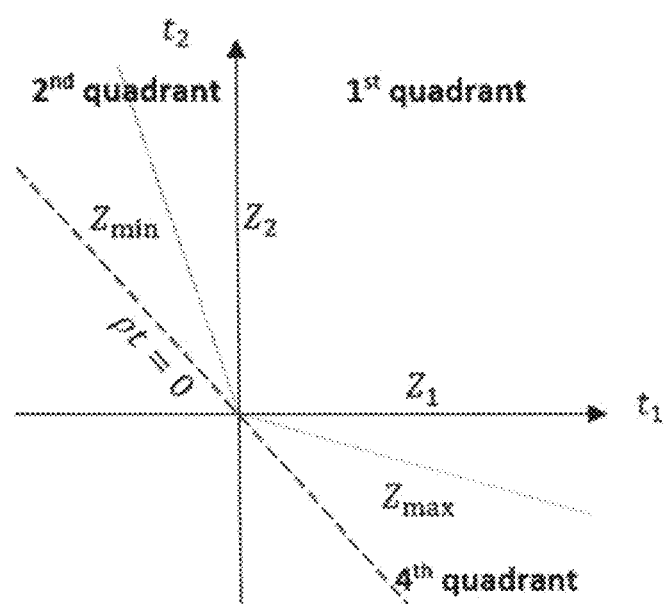
FIG. 22 is a representation of the method shown in FIG. 21.

With reference to FIGS. 21 and 22, there is provided, in a third aspect, a method for extending the calibration range provided by a first and second reference material beyond the effective atomic number range of the reference materials. Direct attenuation surfaces fitted on the calibration data for the first and second reference material dual-material decomposition basis, shown in the first quadrant of FIG. 22 are also valid in regions of the second and fourth quadrants near the axis representing the first reference material path lengths ($t_1$-axis) and the second reference material path lengths ($t_2$-axis), respectively, This is equivalent to extending the first reference material path lengths $t_1$ or the second reference material path lengths $t_2$ to slightly negative values while the other remains positive. Negative path lengths represent an imposed or fictitious amount of a reference material that would have to be added to the dual-material images of the scanned object for the effective atomic number of the composite object (original object plus the added negative layer) to provide a reference material path length that would result in finding an effective atomic number equal to that of the actual reference material.

However, in order to provide more accurate and useful data, this extrapolation must be constrained to predetermined minimum and maximum effective atomic numbers for the imposed materials making up the negative path lengths. Preferably, this minimum effective atomic number is approximately equal to or greater than 3 and the maximum effective atomic number is approximately equal to or less than 42.

In this third aspect, there is provided a method for assigning an attribute to x-ray attenuation. In a first step 2100, there is acquired first and second reference material equivalent path length information associated with a first range of dual-energy x-ray attenuation information by a model for expressing collectively each of the first reference material path lengths and the second reference material path lengths as a function of the associated first range of dual-energy x-ray attenuation information. At step 2102, an extrapolation range of dual-energy x-ray attenuation information is selected over which first and second reference material path lengths are to be associated with dual-energy x-ray attenuation information of a first imposed material having a predetermined minimum effective atomic number less than an effective atomic number of the first reference material and a second imposed material having a predetermined maximum effective atomic number greater than an effective atomic number of the second reference material. The first range is within the extrapolation range. At step 2104, a set of fitting constraints is selected for associating each of the first reference material path lengths and the second reference material path lengths over the extrapolation range of dual-energy attenuation information. At step 2106, the set of fitting constraints are applied to the model to define at step 2108 extrapolated first and second reference material equivalent path lengths over the extrapolation range.

The first and second reference material equivalent path length information may be determined by any suitable method previously described. Preferably, such information is retrieved from lookup tables, as shown at step 2110, having therein saved first and second reference material equivalent path lengths associated with the dual-energy x-ray attenuation information corresponding with the dual-energy attenuation information range. Alternatively, as shown at step 2112, the first and second reference material path length information may be determined by repeating the dual-material decomposition method previously described for fresh scans of suitable reference materials.

A system of one or more computers can be configured to perform the particular operations or actions as described herein by virtue of having software, firmware, hardware, or a combination of them installed on the system that in operation causes or cause the system to perform the actions automatically and in real time or near real time. One or more computer programs can be configured to perform particular operations or actions described herein by virtue of including instructions that, when executed by data processing apparatus, cause the apparatus to perform the actions. Such actions may be performed automatically and in real time or near real time.

Object Reconstruction Method

There is also provided a method to find the density and effective atomic number $Z_{eff}$ of objects present in scanned images. This is particularly useful in the context of identification of LAG (liquid-aerosol-gel) materials which may be contained within a container at the time of scanning.

Figure 23A:
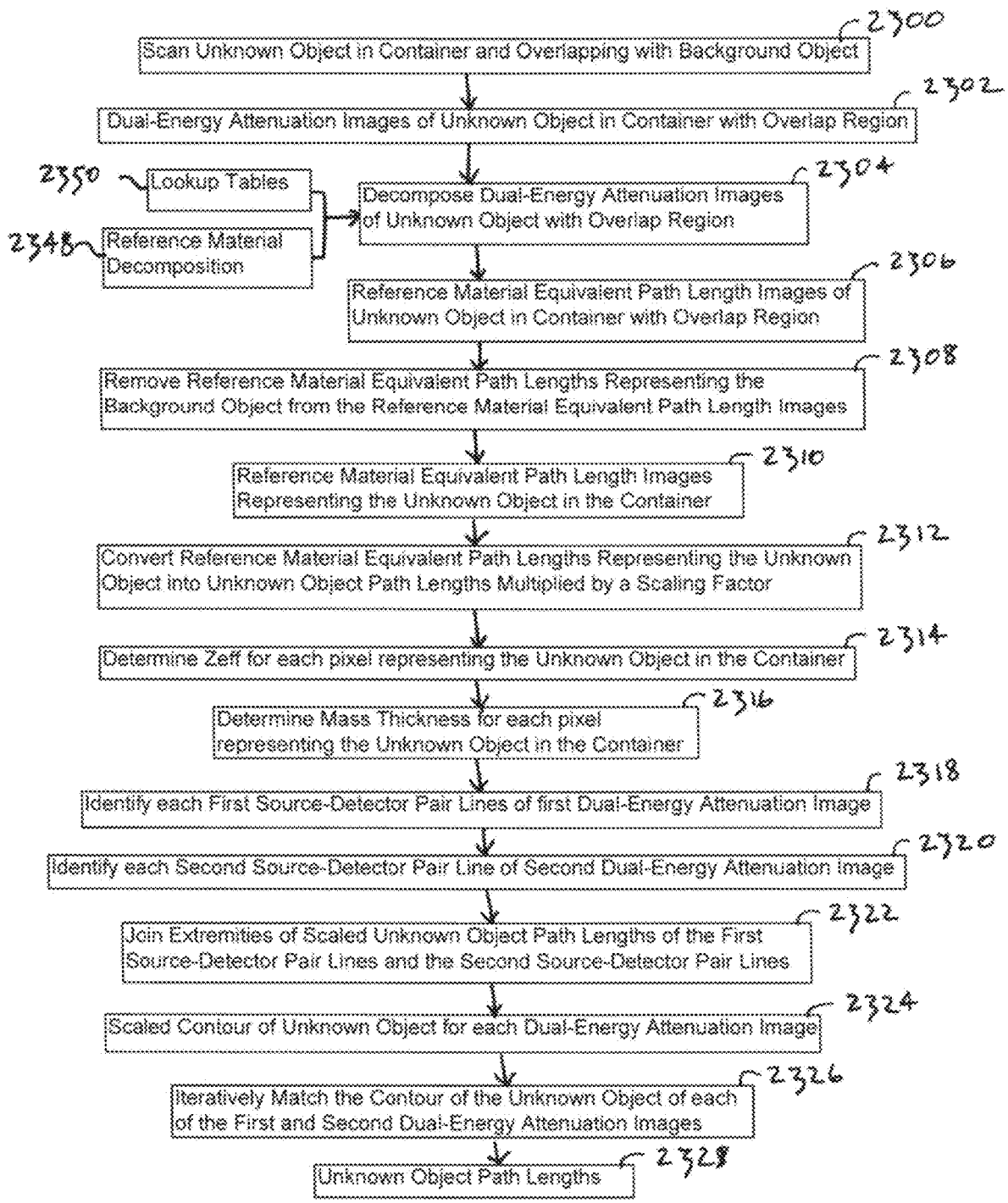
FIGS. 23A & B are a flow chart representing one aspect of a method for reconstructing an unknown object contained within a container.
Figure 23B:
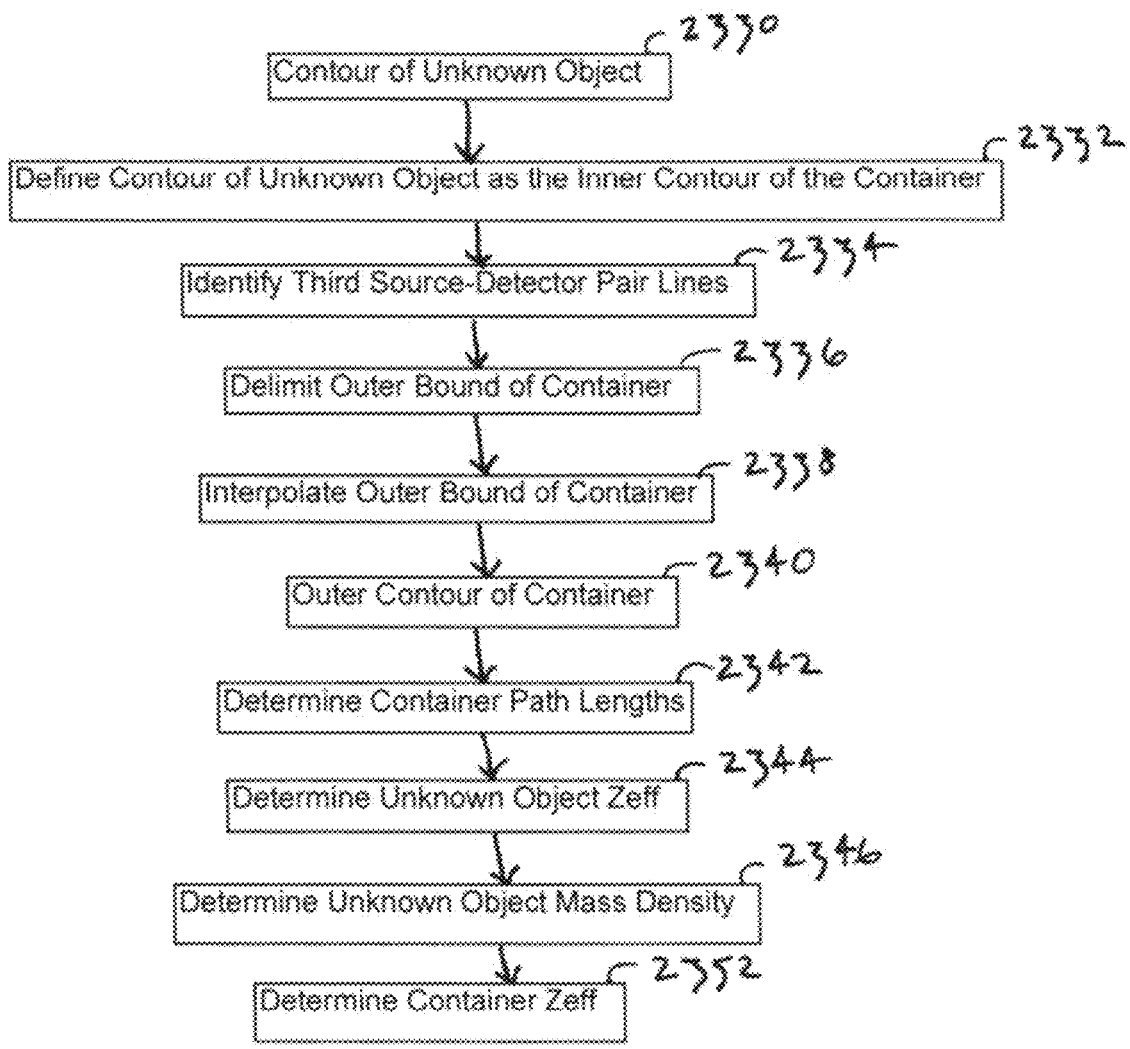

With reference to FIGS. 23A and 23B, in a first aspect, the method for assigning attributes to an object of interest may be described as follows. However, it should be understood that certain steps in the method may be performed by different means, depending on the conditions relating to the object of interest that is scanned without departing from the scope of the invention described herein. Certain steps may also be performed in a different order than that presented in the following description.

In a first step 2300, the unknown object of interest is scanned. Typically, the object of interest at least partially overlaps with a background object within an x-ray scanning device, such as, for example, a security screening tray. The unknown object may also be contained within a container that is placed within the tray for the scanning operation. The x-ray scanning device emits x-rays from at least two sources which pass through the unknown object and the background object to be detected by at least one array of detectors. The detectors provide at step 2302 a plurality of dual-energy attenuation images each having dual-energy x-ray attenuation information representing the container and an overlap region wherein the background object, the container and the unknown object of interest overlap.

Next, at step 2304, the dual-energy attenuation images are decomposed into reference material equivalent path length images, which are provided at step 2306. At step 2308, the reference material equivalent path lengths representing the background object are removed from the reference material equivalent path length images. This may be done, for example, using the methods described above with respect to background object removal. Thereby, there is provided at step 2310 reference material equivalent path lengths representing the unknown object and the container.

At step 2312, the reference material equivalent path lengths representing the unknown object are converted to unknown object path lengths multiplied by a predetermined scaling factor. Such a conversion may be accomplished, for example by applying the following function for each of the first and second reference material equivalent path lengths representing the unknown object:

$$t_o(i,j) = \frac{\rho t_{ob}(i,j)}{\rho_o} \left\{ \frac{g[Z_{ob}(i,j)] - g[Z_b]}{g[Z_o] - g[Z_b]} \right\}$$

$$t_o^*(i,j) = \rho t_{ob}(i,j)(g[Z_{ob}(i,j)] - g[Z_b]) \times \text{scaling factor}$$
$$= t_o(i,j) \times \text{scaling factor} = t_o(i,j) \times SF$$

$$\text{With } SF = \frac{1}{\rho_o(g[Z_o] - g[Z_b])} \text{ when } t_o^*(i,j) = t_o(i,j)$$

wherein $\rho_o$, $g[Z_o]$ and $g[Z_b]$ are all constants. Next, at step 2314, the effective atomic number for each pixel representing the unknown object and the container is determined.

At step 2316, the mass thickness for each pixel representing the unknown object and the container is determined. The mass thickness is equivalent to the unknown object path lengths representing the unknown object of interest multiplied by the scaling factor. At step 2318, there is identified each first source-detector pair line defined by a first x-ray extending between a first one of the at least two sources and one detector of the array of detectors in a first one of the plurality of dual-energy attenuation images on which lies one scaled unknown object path length. At step 2320, there is identified each second source-detector pair line defined by a second x-ray extending between a second one of the at least two sources and one detector of the array of detectors in a second one of the plurality of dual-energy attenuation images on which lies one other scaled unknown object path length, the second one of the plurality of dual-energy attenuation images having been generated contemporaneously with the first one of the plurality of dual-energy attenuation images.

At step 2322, the extremities of each of the scaled unknown object path lengths are joined to provide a scaled contour of the unknown object at step 2324. The contour of the unknown object of each of the first and the second one of the plurality of dual-energy attenuation images are then iteratively matched at step 2326 to reduce the scaling factor of the scaled unknown object path lengths representing the unknown object and provide unknown object path lengths at step 2328 and thereby a contour of the unknown object at step 2330.

The contour of the unknown object is then defined as an inner contour of the container at step 2332. At step 2334, there are identified third source-detector pair lines defined by third x-rays extending between each source and one detector of the array which intersect with the container at only one point of intersection in each of the first and second one of the plurality of dual-energy attenuation images. These third source-detector pair lines delimit at step 2336 an outer bound of the container as the pixels within the third source-detector pair lines. At step 2338, the outer bound of the container extending between the one point of intersection of each third source-detector pair line is interpolated to define an outer contour of the container at step 2340. At step 2342, path lengths are determined which represent the container as path lengths which extend between the inner contour of the container and the outer contour of the container. Next, at step 2344, an effective atomic number of the unknown object is determined and at step 2346, a mass density of the unknown object is determined.

Decomposition of the dual-energy attenuation images of the unknown object at step 2304 into reference material equivalent path length images may be performed in any manner previously described, such as for example, imposing the dual-energy attenuation information of each pixel onto suitable inverse attenuation surfaces to obtain the first and second equivalent reference material path lengths as in step 2348 or by using suitable lookup tables as in step 2350. This is previously discussed with reference to FIGS. 3 and 11 and in particular step 306 shown in FIG. 11.

The step 2306 for removal of reference material equivalent path lengths representing the background object, such as a security screening tray, from the images may be performed in a number of ways depending on the properties of the background object.

Figure 24:
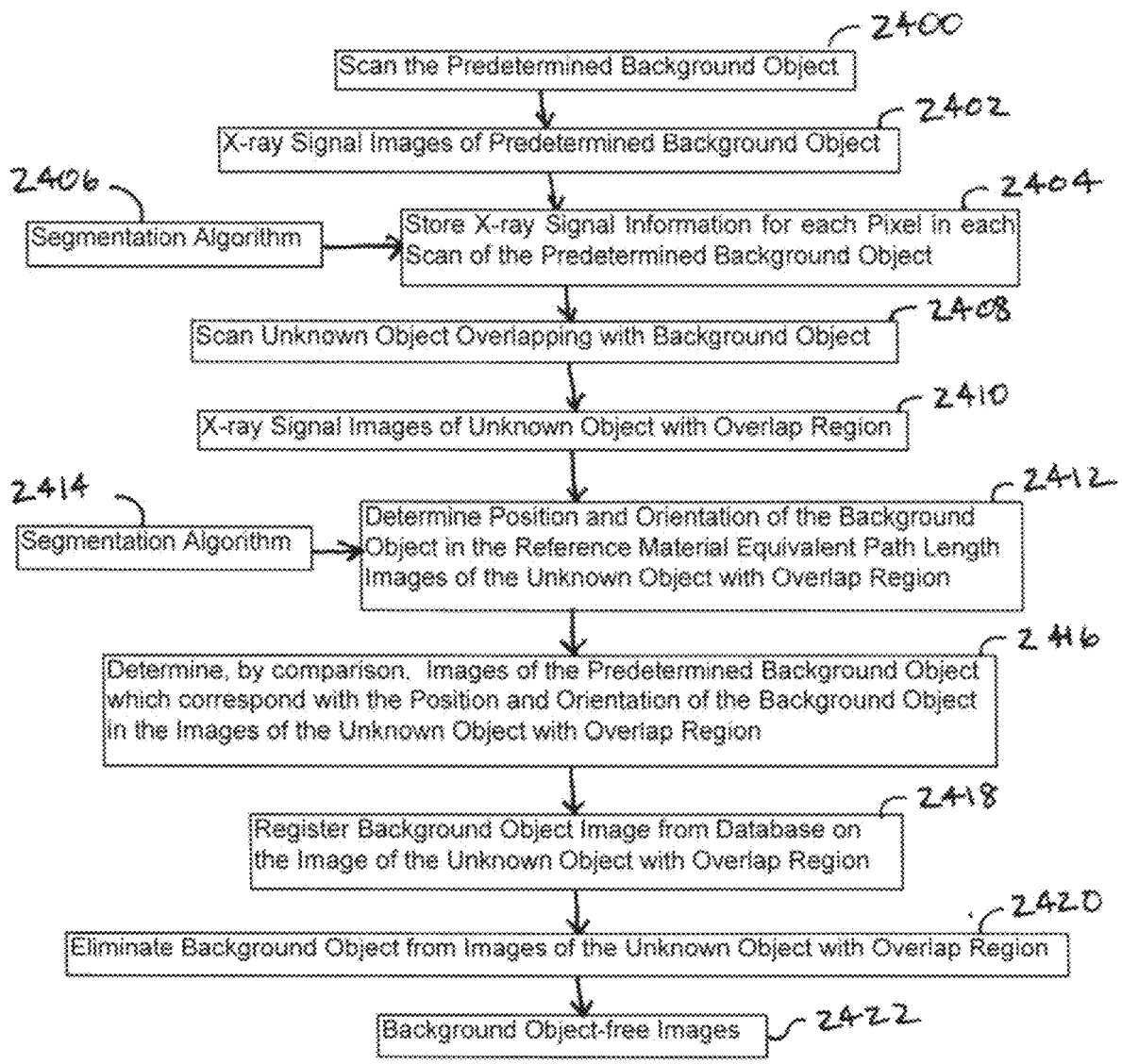
FIG. 24 is a flow chart representing one aspect of a method for removing a background object as part of the method for reconstructing an unknown object.

The first method for removal of background objects, shown in FIG. 24, is to first, at step 2400, scan predetermined background objects, such as, for example, empty trays at various locations on the scanner belt and in varying angles of rotation or orientation within the scanning chamber to provide low and high energy x-ray signal images at step 2402. The low and high energy x-ray signal information for each pixel in each of the scans of the tray, along with position and angle data of the tray, are stored in a database at step 2404. This is done, for example, by contouring the tray image and tracing a rectangle around it with a segmentation algorithm, as shown at step 2406, and saving the measured values of the image and the corresponding tray placement information in a database. Then, when an unknown object of interest is scanned at step 2408 in a tray using the x-ray scanner to provide low and high energy x-ray signal images of the unknown object overlapping with the tray at step 2410, the stored tray image that is closest in position and angle to that scanned with the unknown object of interest is found in the database at step 2412, once again, for example, by tracing a rectangle around the tray using a segmentation algorithm at step 2414 and then comparing at step 2416 that rectangle to the positions and angles of the tray in the stored database tray images. The database tray image is then registered at step 2418 on the scanned image of the unknown object of interest, simply by rotating and translating it so the angle and position are a closer match. Finally, the tray image low and high energy signals are subtracted from the scan image at step 2420 to provide background-free low and high energy signals representing only the unknown object at step 2422.

The second method for removal of background objects is very similar to the first method, except that in addition to saving the empty tray signal data, the reference material path lengths, from the calibration method, are also saved. Once again this is done by contouring the tray image and preferably tracing a rectangle around it with a segmentation algorithm and saving the measured values of the image as well as the calculated reference material path lengths and the corresponding tray placement and orientation information in a database. Then, when an unknown object of interest is scanned in a tray in the x-ray scanning device, the stored tray image that is closest in position and orientation is found in the database. This is preferably done as in the first method by tracing a rectangle around the tray of the scanned image and then comparing that rectangle to the stored database tray images' positions and angles. The database tray image is then registered on the object scanned image, preferably by rotating and translating it so the angle and position are a closer match. Then, during the next step, instead of subtracting the tray image signals from the scanned tray image as in the first method, the reference materials path lengths of the tray image are subtracted from the reference materials path lengths of the scanned image. This second method is therefore in accordance with the method for removal of background object path lengths discussed above with reference to FIG. 14.

The third method for removal of background objects from a scanned image is to directly apply the procedure explained previously relating to the removal of a background object with homogeneous composition and non-uniform path length distribution. With this method, the tray path lengths in the region of overlap of the background object or tray and object of interest must be known, as well as the density and effective atomic number of the material the tray is made of, in order to calculate the mass thickness of the tray to be removed from the mass thickness of the scan image. They can be calculated by first obtaining or creating a 3D model of the tray. Then the position and rotation angle of the tray in the scanner must be determined. This can be done once again using a segmentation algorithm and preferably by tracing a rectangle around the tray in the scan image. The 3D model of the tray is then simulated in the scanner geometry with the proper position and angle. A ray casting algorithm may be used to find the path lengths through the tray for every pixel. The ray casting algorithm can be executed by the graphics processing unit (GPU) to speed up the process. If they have not been determined beforehand, the tray density and effective atomic number can be obtained from the image by applying the dual-reference material path length decomposition method previously described. With both these material properties and the tray path lengths, it is possible to calculate the reference material path lengths for the whole tray. These reference material path lengths can then be subtracted from the reference material path lengths of the overlap region of the image, which results in the reference material path lengths of the image without the tray. These reference material path lengths can then be used to calculate the signal, attenuation, mass density and effective atomic number for the image without the tray.

Figure 25:
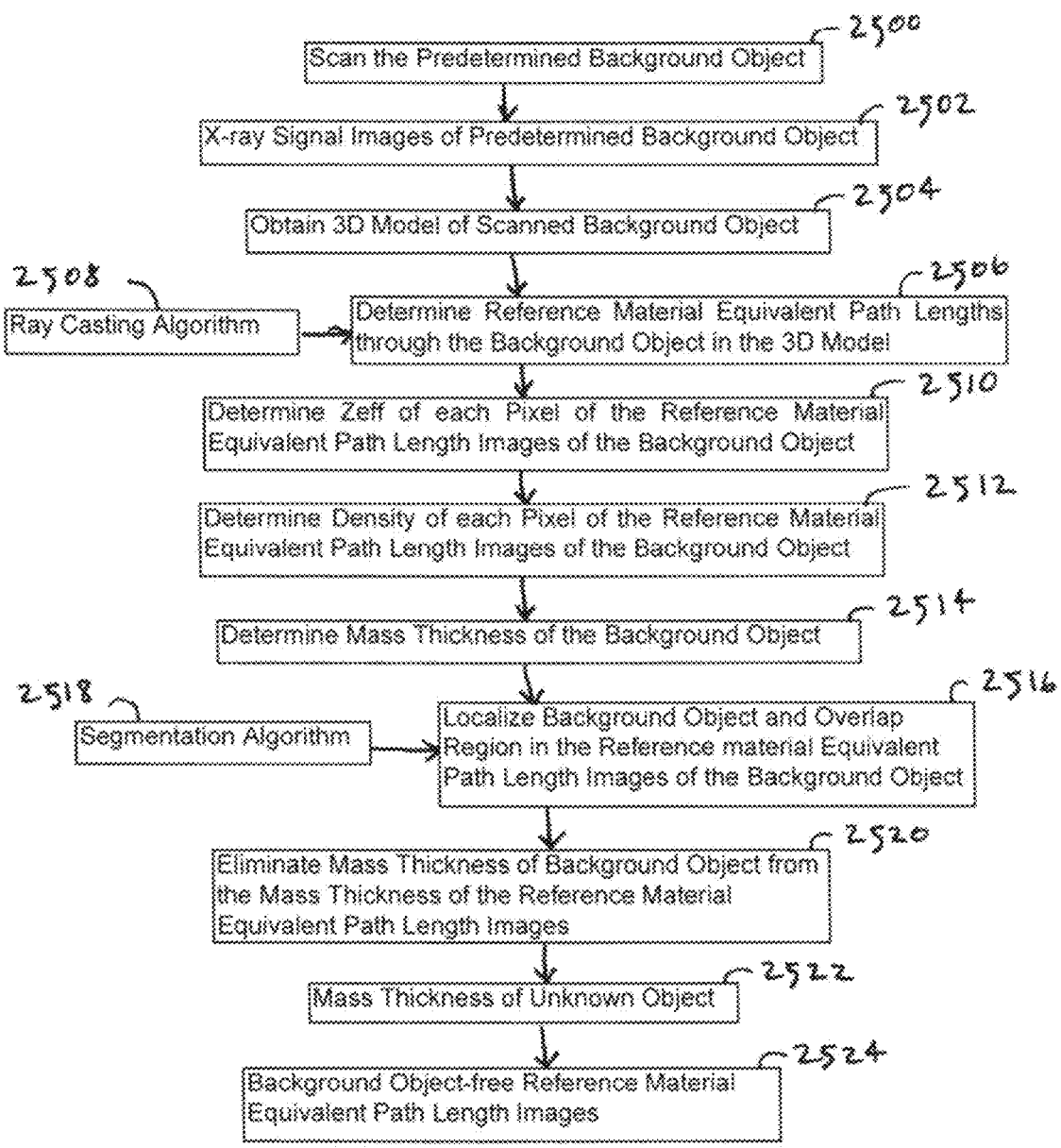
FIG. 25 is a flow chart representing another aspect of a method for removing a background object as part of the method for reconstructing an unknown object.

With reference to FIG. 25, the third method for removal of background objects begins with the step 2500 of scanning a predetermined background object to provide low and high energy x-ray signal images at step 2502. At step 2504 there is obtained a three-dimensional model of the background object according to the position and orientation of the background object as scanned in the x-ray scanning device. At step 2506, the reference material equivalent path lengths through the background object in the three-dimensional model are determined for each pixel using a ray casting algorithm as shown at step 2508 or any other suitable reference material decomposition means as previously described. The effective atomic number of each pixel the background object is determined at step 2510 and the mass density of each pixel of the background object is determined at step 2512. Next, at step 2514, the mass thickness of the background object is determined by multiplying the predetermined first and second reference material equivalent path lengths of the background object with the mass density of the background object. At step 2516, the background object and overlap region are localized in the dual-reference material equivalent path length images of the unknown object scanned with the background object, preferably using a segmentation algorithm as shown at step 2518. At step 2520, the mass thickness of the background object is eliminated from the mass thickness of the reference material path length images to obtain a mass thickness of the unknown object at step 2522. The first and second reference material equivalent path lengths through the unknown object are thereby provided at step 2524.

Figure 17A:
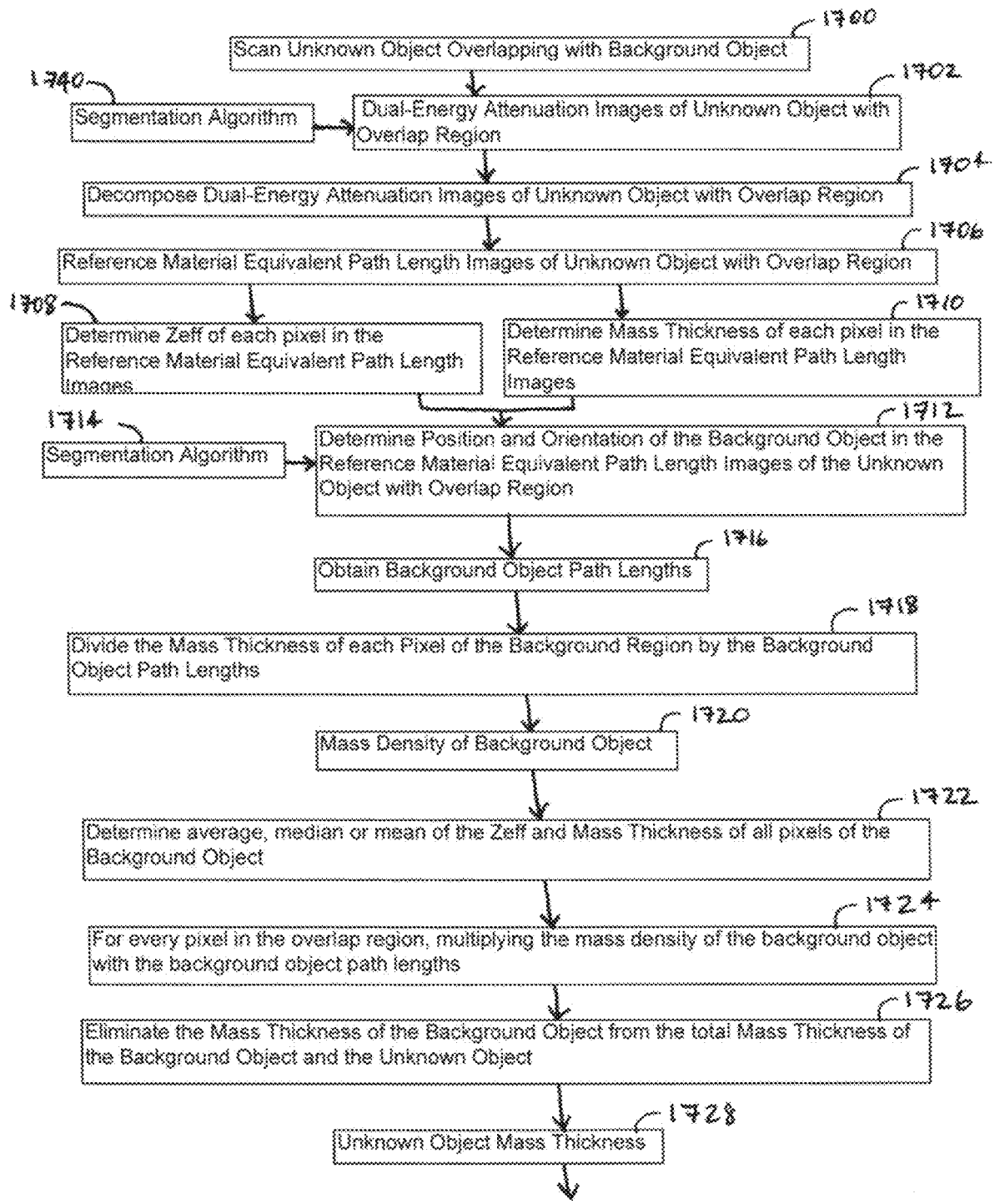
FIGS. 17A & B are a flow chart representing another aspect of method for removing a background object from an image.
Figure 17B:
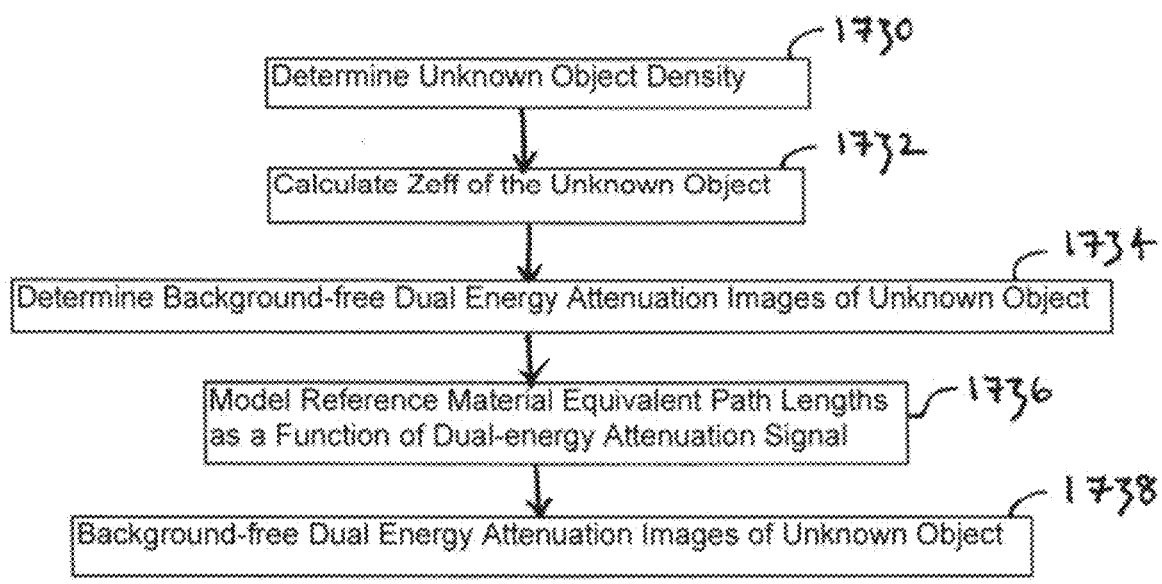

A preferred next step in the method described in FIGS. 23A and 23B is to determine the effective atomic number ($Z_{\textit{eff}}$) of the container as shown at step 2352, if the container is present. The calibration method described above transforms the signal obtained for each pixel of the scanned image into mass thickness and $Z_{\textit{eff}}$ values. If the X-ray corresponding to a pixel has traversed multiple different materials, the resulting mass thickness and $Z_{\textit{eff}}$ are combinations (sum and weighted average) of the properties of those materials. In order to find the effective atomic number of the container, a pixel of an X-ray that traverses the container but not the object of interest must be observed. This can happen two possible ways: observation of a pixel representing the "side" of the container in the scanned image, and, observation of a pixel representing the "top" (whichever side is up) of the container, where there is no object of interest at that portion of the container because of gravity. In these locations, the $Z_{\textit{eff}}$ of the container can be directly obtained from the calibration method. The $Z_{\textit{eff}}$ values associated with each pixel may be found, for example, by applying a segmentation procedure to the scan image, and then calculating the average (or another relevant statistical quantity) effective atomic number over the region of the container. If there is no container, or more specifically the object of interest is not contained within a container, the mass thickness of each pixel, obtained from the above described calibration method, is equivalent to the object of interest density multiplied by the object of interest path length for that pixel. In that case, the density, which is unknown but constant across all pixels, acts as a scaling factor. Therefore, the mass thickness is a scaled version of the path lengths. If there is a container, then the procedure explained above with reference to FIGS. 17A and 17B in relation to the removal of a background object with a homogenous composition and non-uniform path length distribution may be used to evaluate the mass thickness of a material in the calibration method if the mass thickness and effective atomic number from the combination of both materials, as well as both of the materials' individual effective atomic numbers are known. This is true for the reference materials of the calibration method, but is also true for the container and object of interest materials:

$$\rho_o t_o(i, j) = \rho t_{ob}(i, j) \left\{ \frac{g[Z_{ob}(i, j)] - g[Z_b]}{g[Z_o] - g[Z_b]} \right\}$$

-continued $$\rho_b t_b(i, j) = \rho t_{ob}(i, j) \left\{ \frac{g[Z_{ob}(i, j)] - g[Z_o]}{g[Z_b] - g[Z_o]} \right\}$$

where (i,j) is the pixel coordinates in the image, pt is the mass thickness, g(Z) the effective atomic number model, the indices "o" stands for "object of interest", "b" for background or bottle (container), "ob" for object of interest+background. $\rho t_{ob}(p)$ and $g[Z_{ob}(i, j)]$ are obtained directly from the above described calibration method and $g[Z_b]$ was obtained during the last step.

However, since the $Z_{eff}$ and mass thickness are a combination of the underlying materials and because of the nature of the objects being scanned (object of interest within a container), there are no pixels representing only the object of interest. Also, there is no way of applying the layer removal procedure to the container without either having either the exact 3D model of the container or some pixels with only container information and knowledge of the path length of the x-rays through the container in those pixels. Neither of these pieces of information are available and $g[Z_o]$ remains unknown. Therefore, the mass thickness of the object of interest or container cannot be evaluated directly. However, values for the path lengths through the object of interest multiplied by a constant, called a scaling factor, may still be determined from the previous equations, by estimating value for $g[Z_0]$. The result is a value that represents the path lengths multiplied by a constant, called scaling factor. Although the scaling factor is unknown, it is the same for all pixels, which is sufficient for this step of the procedure. Also, as explained previously, in particular with respect to the aforementioned procedure for removal of a background object having homogenous composition and horizontally uniform path length distribution, the uncertainties for all formulations ((t1, t2) or (pt, Z)) of the input values are known. It is therefore possible to evaluate uncertainty, on the object of interest path lengths determined with the present method. This information may be used to affect the results in the subsequent steps.

Mass thickness is already equivalent to the path lengths multiplied by an unknown constant (the density). As it was explained previously, multiplying the path lengths by an arbitrary constant, still results in the path lengths multiplied by an unknown constant called the scaling factor. This step is about transforming a set of separate path lengths into a cohesive object of interest shape and eliminating the scaling factor to find the real path lengths.

For a given scaling factor, the initial data set is composed of path lengths for each pixel, for all images generated by each source, or in other words the length of the intersection for each X-ray and the object of interest. Each detector-source pair is represented as a known line through space on which the corresponding path length through the object of interest is located. Since the exact shape and location of the object of interest is unknown, the position of the path length line segment along its supporting line is also unknown. However, all source-detectors assemblies view the same object. Therefore, the contour of the object of interest in a given slice, created by joining the extremities of each path length with the extremities of its nearest neighbors, should be the same in both views. Moving a path length along its supporting line modifies the object of interest contour in two points, since its line must both "enter" and "exit" the object of interest. The goal of this step is to move the path lengths so that the contours formed from every view's path lengths are as similar as possible. Such movement may be according to pre-specified rules and constraints. Thereby, the contours may be superimposed in space and iteratively moved towards each other, since, if the contours found in two contemporaneous images generated by two different sources circumscribe the same space, then it means that the two contours are very similar. However, if the path lengths are too long, it may be difficult to obtain such a result.

This process is similar to non-rigid point set registration, but where the different sets of points are being registered on each other, so all sets of points act as both the "source" and "target" at the same time. Accordingly, the conventional registration metrics are generalized to take that into account. Therefore, it can be divided into two main steps.

First, the distance between the sets of data representing the contour in both images is measured in some way. This may be done either for each point in each set (with particular attention spent on the fact that the amount for each set is different) or for the set as a whole or both.

Second, the points of each set are displaced to reduce the distance measured in the previous step. The points in each set can be displaced individually, as a whole or both. However, contrary to regular registration procedures, the points can only be moved parallel on their supporting lines, which means the displacement cannot only be a combination of translation and rotation of the whole set of points. Therefore, the points must be at least displaced individually.

The above two steps may be repeated until the desired level of "match" is attained. This can be defined either by a threshold on the distance measured in step one or the displacement of step two. The procedure can also be stopped after a certain number of iterations has been reached.

This procedure can be repeated separately for each column in the image, also called a "slice". A slice is the corresponding columns in the image of each view acquired at the same time from the beginning of the scan of the object. Since the different sources irradiated parallel planes and the belt moves at constant speed, the length of the container in every image is the same. The subdivision of the container lengthwise corresponds to the pixel columns in the image, and is determined by the belt speed and integration time of the electronic acquisition system, which is the same for both views. Therefore, each column in one view corresponds to another column in the other view that sees the same section of the container, or the same "slice", up to the spatial resolution of the detection system.

However, it is possible that this first scaling factor may not be correct or optimal. The contour matching procedure is started at the largest possible scaling factor then repeated for increasingly smaller scaling factors. This repetition is stopped when the contours attain the best "level of match" compared to other scaling factors. By iteratively choosing a scaling factor that is closer to the correct one, the "level of match" should increase. When the "level of match" starts decreasing, this means that the scaling factor is moving further from the correct value, which makes it possible to evaluate the correct scaling factor. This procedure may be performed for several slices together or separately.

In a next step, the container is reconstructed which in turn includes the determination of the bounding box of the container and a bubble, if present.

A bounding box is a set of lines that limits the area where the path lengths must be contained and is defined by the edge pixels from all views. The container bounding box is made of lines intersecting each other. Since these lines are considered continuous in space, they do not initially limit the permitted space to a polygon, as they should. For the object of interest, this is avoided by defining the bounding points for each source-detector supporting line supporting each scaled path length, and the points defining the object of interest must be in between those bounding points. This procedure does not provide a suitable bounding box for the container, since the container points that will be created will not be necessarily be on the supporting lines. Therefore, the actual bounding polygon for the container must be defined. This is done by finding all the bounding lines intersections and eliminating all points that are too far from the previously mentioned bounding points. The bounding polygon is then simply the line joining together all the points left. Also, when three bounding lines intersect at the same point, they usually appear as three intersections. In that case, the middle intersection is eliminated from the polygon. This creates a very small segment instead of a 3-way intersection point. This very small segment will be useful in further steps.

In a next step, the presence of an empty part inside the container, also called a bubble, is detected when present, either by comparing the estimated thickness of the container under and above the container or by other means. The points composing the top surface of the object of interest are also determined.

The container path lengths are determined differently than the path lengths for the object of interest. First, a model or contour must be created for the container, which is done by "anisotropic scaling" of the object of interest, so it touches the container bounding box. There are as many contact points of the scaled object of interest contour as there are bounding box polygon sides. This can be done by applying five hypotheses that can be relatively safely assumed about the container, in addition to the previous rules and constraints that were used for the object of interest reconstruction. First, for any path length that does not extend into an empty part of the container, the object of interest inside touches the container at both entry and exit points of object of interest path lengths. Second, the container must touch each side of the container bounding box in at least one location. Third, although the container thickness will generally not be constant, it should be a smooth function in between points of contact with the bounding box. This can be achieved by interpolating the thickness between points of contact. Fourth, the point of contact on the bounding box is likely to be either the one closest to the object of interest, or the one that is encountered when travelling along the normal of the object of interest top surface. Fifth, if a bubble was detected and the part of the object of interest that was closest to the bounding box is part of the top surface of the object of interest, this side of the bounding box should not be considered, since the exact point where the container is in contact with the bounding box is difficult to determine based on the object of interest.

The first hypothesis allows for the creation of the inner contour of the container, which is simply equal to the contour of the object of interest. The four subsequent hypotheses allow the creation of the outer contour of the container. To create a contour, whether inner or outer, corresponding model points are linked in the same order as the object of interest contour points. Container path lengths are then obtained by intersecting the supporting lines with that shape using, for example, a ray casting algorithm. If the intersection would be outside the bounding box, the intersection with the bounding box is used instead for that path length. Finally, the container contour is created by joining the extremities of these path lengths, as for the object of interest contour.

If the container is too thin, the bounding box of the liquid (object of interest) may be the same as the bounding box of the container. In that case, the "anisotropic scaling" method is not optimal. The preferred alternative is to suppose instead that the container thickness is constant. This thickness may be a preset constant, may be inferred from the geometrical transverse distance between adjacent pixels, or may be estimated from the Zeff of the container or by other means.

If a bubble is present in the container, then the container model may be erroneous, and a different model would be preferred. One such model uses either reflection or rotational symmetry to create the container, depending on the previously determined number of corners. Indeed, containers with an even number of corners (and sides) are more likely to have vertical symmetry, whereas it is impossible for a container with an odd number of corners/sides to possess "vertical" symmetry if it has a side lying flat on the tray surface. Note here that vertical refers to the axis that is normal to the tray surface on which the container is lying.

Reflection symmetry can be useful if the top part of the container is poorly defined but the bottom part is well defined, and the container is suspected to be vertically symmetrical. In such circumstances, an additional procedure is used to modify the container model which differentiates points that are part of the object of interest/bubble interface and points that are part of the object of interest/container interface. The latter, as well as the container points, are reflected based on an axis that is parallel to the tray surface. The reflected container points must also be tangential to the bounding box. Finally, points left under the reflection axis are eliminated, and sections of contour missing are interpolated.

Another way to determine the thickness of the container all around the object of interest contour, is to first evaluate the thickness according to the previously detailed model. Then the periodicity of the container thickness and/or object of interest radial size is evaluated. If it is determined to have a clear period, then the thickness can be taken from one period and then repeated for the other periods.

This can be particularly useful if there are few contact points and the real container thickness shifts in a way that is nonlinear in between those points. In that case it is possible that the container contour under the object of interest is more accurately defined because of the proximity with the bounding box. This case can be detected if the normal container model leads to a container thickness over the object of interest that is much larger than the one underneath it.

In that case, the periodicity of the object of interest or container shape may be evaluated, either by performing a fast Fourier transform on the radial size of the object of interest or by other means. If the shape is found to be periodic or if a bubble has been detected, then as previously indicated, the period is evaluated and the container contours (both inner and outer) are taken over a period and repeatedly rotated around the most likely centroid of the container to form a complete contour. The most likely segment of contour to be estimated correctly is the one located directly under the container centroid, between the bounding box surface and the liquid.

Solution by pairs provides a second method of determining the thickness of the container around the object of interest. The solution by pairs corresponds to solving the two base equations (individually):

$$\rho t_{ob}(i,j,k) = \rho_o t_o(i,j,k) + \rho_b t_b(i,j,k)$$

$$g[Z_{ob}(i,j,k)]\rho t_{ob}(i,j,k) = g[Z_o]\rho_o t_o(i,j,k) + g[Z_b]\rho_b t_b(i,j,k)$$

for pairs of path lengths, transforming a situation of 2 equations-3 unknowns for a single path length, to 4 equations-3 unknowns.

All possible pairs of pixels i can be used, as long as its supporting line sees both the object of interest and the container, even if they belong to different slices j and views k. Pairs of resulting values that are outside the range of possible values can be eliminated outright, and are most likely caused by an incorrect path length. Each pair will give a different value for $\rho_o$, $\rho_b$ and $Z_o$, and so this method results in a distribution of values. The best value for each quantity is evaluated from descriptive statistics of the associated distribution. It can be also relatively safely assumed that the lower the spread of the distribution, the more optimal the solution is likely to be.

There is provided a third method for determining the thickness of the container wall whereby analytical functions may be fit on the data. This may be done in two different ways, for both of the base equations referred to in the above description for the solution by pairs. All fits are made using quantities for all pixels i, slices j and views k.

The first fitting option is a linear fit on the following equations:

$$\frac{\rho t_{ob}(i, j, k)}{t_b} = \rho_o \frac{t_o(i, j, k)}{t_b} + \rho_b$$

with the regressor $$\frac{t_o(i, j, k)}{t_b}$$

and the predictor $$\frac{\rho t_o(i, j, k)}{t_b} \frac{g[Z_{ob}(i, j, k)]\rho t_{ob}(i, j, k)}{t_b(i, j, k)} = g[Z_o]\rho_o \frac{t_o(i, j, k)}{t_b(i, j, k)} + g[Z_b]\rho_b$$

with the regressor $$\frac{t_o(i, j, k)}{t_b}$$

and the predictor $$\frac{g[Z_{ob}(i, j, k)]\rho t_{ob}(i, j, k)}{t_b(i, j, k)}$$

By fitting a linear regression, the slope of the first equation is $\rho_o$ and the slope of the second equation is $g[Z_o]\rho_o$. The intersect in the first equation gives $\rho_b$. Note that for both equations, o and b can be switched interchangeably to instead find the container density as the slope and object of interest density as the intersection. However, this has limited use since at this point the properties of the object of interest may be calculated without having to find the container density.

The second fitting option is to consider the base equations as bivariate linear functions:

$$\rho t_{ob}(i,j,k) = \rho_o t_o(i,j,k) + \rho_b t_b(i,j,k)$$

with the regressors $t_o(i,j,k)$ and $t_b(i,j,k)$, and the predictor $\rho t_{ob}(i,j,k)$ $$g[Z_{ob}(i,j,k)]\rho t_{ob}(i,j,k) = g[Z_o]\rho_o t_o(i,j,k) + g[Z_b]\rho_b t_b(i,j,k)$$

with the regressors $t_o(i,j,k)$ and $t_b(i,j,k)$,
and the predictor $g[Z_{ob}(i,j,k)]\rho t_{ob}(i,j,k)$ For the first equation, the slope in direction x at y=0 is $\rho_o$ and the slope in direction y at x=0 is $\rho_b$. For the second equation, the slope in direction x at y=0 is $g[Z_o]\rho_o$ and the slope in direction y at x=0 is $g[Z_b]\rho_b$.

Finally, $g[Z_o]$ can be obtained by dividing $g[Z_o]\rho_o$ by the previously obtained $\rho_o$, and $Z_o$ can be obtained with $g^{-1}\{g[Z_o]\}$.

It should be understood that the object of interest may not necessarily be contained within a container. Under such circumstances, the method may proceed as follows with a number of steps being similar or identical to those found within the method wherein the object of interest is contained within a container, however, wherein determination of the container characteristics and bounding box is not required.

Figure 26:
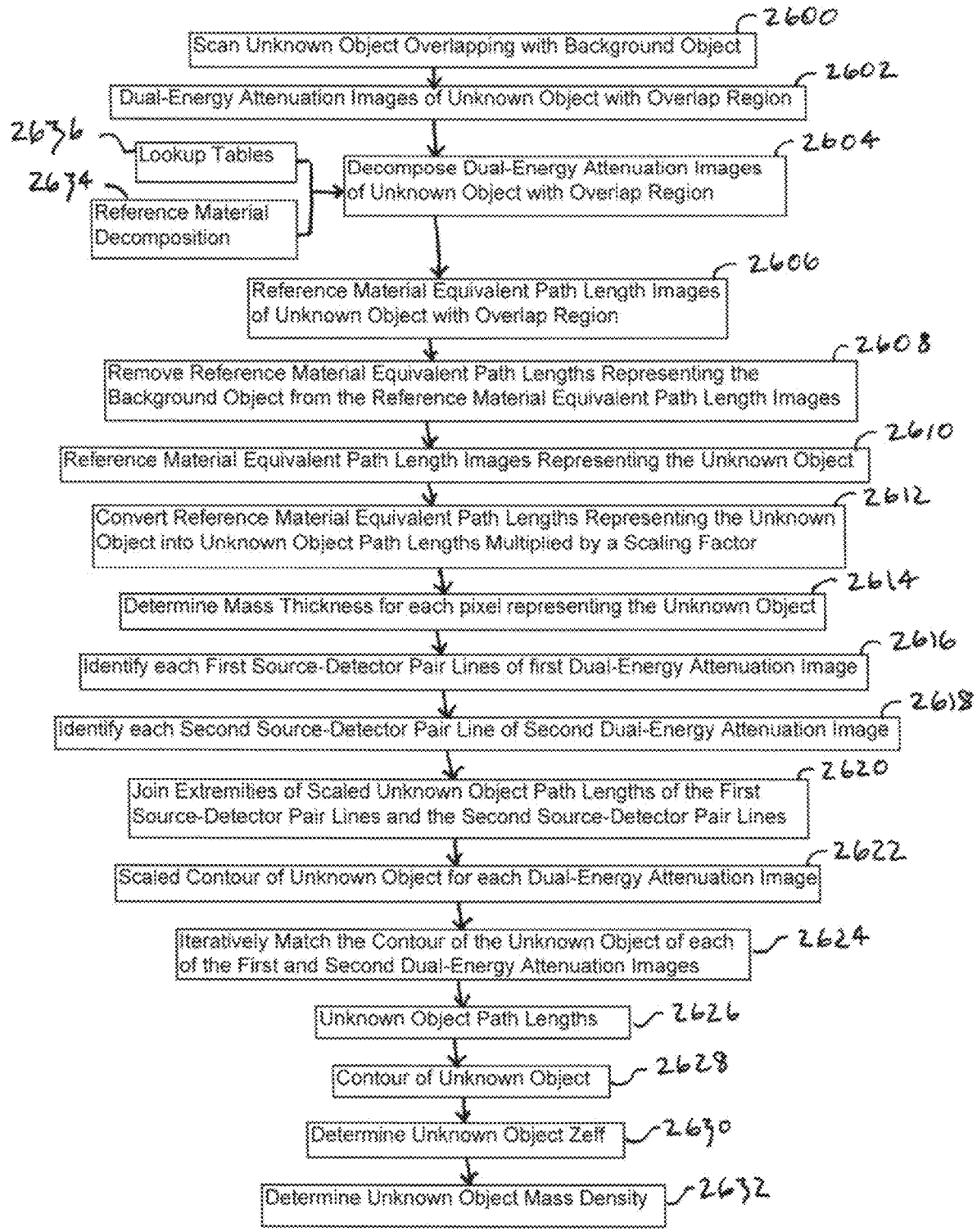
FIG. 26 is a flow chart representing one aspect of a method for reconstructing an unknown object; and, FIG. 27 is a flow chart representing one aspect of a method for determining a safe of threat condition for an unknown object.

With reference to FIG. 26, the method for assigning attributes to an object of interest in another aspect may be described as follows. However, it should be understood that certain steps in the method may be performed by different means, depending on the conditions relating to the object of interest that is scanned without departing from the scope of the invention described herein. Certain steps may also be performed in a different order than that presented in the following description.

In a first step 2600, the unknown object of interest is scanned. Typically, the object of interest at least partially overlaps with a background object within an x-ray scanning device, such as, for example, a security screening tray. The x-ray scanning device emits x-rays from at least two sources which pass through the unknown object and the background object to be detected by at least one array of detectors. The detectors provide at step 2602 a plurality of dual-energy attenuation images each having dual-energy x-ray attenuation information representing an overlap region wherein the background object and the unknown object of interest overlap.

Next, at step 2604, the dual-energy attenuation images are decomposed into reference material equivalent path length images, which are provided at step 2606. At step 2608, the reference material equivalent path lengths representing the background object are removed from the reference material equivalent path length images. This may be done, for example, using any of the methods described above with respect to background object removal. Thereby, there is provided at step 2610 reference material equivalent path lengths representing the unknown object.

At step 2612, the reference material equivalent path lengths representing the unknown object are converted to unknown object path lengths multiplied by a predetermined scaling factor.

At step 2614, the mass thickness for each pixel representing the unknown object is determined. The mass thickness is equivalent to the unknown object path lengths representing the unknown object of interest multiplied by the scaling factor. At step 2616, there is identified each first source-detector pair line defined by a first x-ray extending between a first one of the at least two sources and one detector of the array of detectors in a first one of the plurality of dual-energy attenuation images on which lies one scaled unknown object path length. At step 2618, there is identified each second source-detector pair line defined by a second x-ray extending between a second one of the at least two sources and one detector of the array of detectors in a second one of the plurality of dual-energy attenuation images on which lies one other scaled unknown object path length, the second one of the plurality of dual-energy attenuation images having been generated contemporaneously with the first one of the plurality of dual-energy attenuation images.

At step 2620, the extremities of each of the scaled unknown object path lengths are joined to provide a scaled contour of the unknown object at step 2622. The contour of the unknown object of each of the first and the second one of the plurality of dual-energy attenuation images are then iteratively matched at step 2624 to reduce the scaling factor of the scaled unknown object path lengths representing the unknown object and provide unknown object path lengths at step 2626 and thereby a contour of the unknown object at step 2628. Next, at step 2630, an effective atomic number of the unknown object is determined and at step 2632, a mass density of the unknown object is determined.

Decomposition of the dual-energy attenuation images of the unknown object at step 2604 into reference material equivalent path length images may be performed in any manner previously described, such as for example, imposing the dual-energy attenuation information of each pixel onto suitable inverse attenuation surfaces to obtain the first and second equivalent reference material path lengths as in step 2634 or by using suitable lookup tables as in step 2636. This is previously discussed with reference to FIGS. 3 and 11 and in particular step 306 shown in FIG. 11.

Since multiple values have been obtained for the object of interest properties, the values must be combined to provide a final best value according to a set of criteria based on various evaluable metrics. The disparity, uncertainties of the values as well as the uncertainty on the scaling factor determined in relation to the contour of the object of interest, and various metrics determined by these can all be considered in determining the final values, as well as their uncertainties. These uncertainties may be relied upon in the next step, the threat determination method.

A system of one or more computers can be configured to perform the particular operations or actions as described herein by virtue of having software, firmware, hardware, or a combination of them installed on the system that in operation causes or cause the system to perform the actions automatically and in real time or near real time. One or more computer programs can be configured to perform particular operations or actions described herein by virtue of including instructions that, when executed by data processing apparatus, cause the apparatus to perform the actions. Such actions may be performed automatically and in real time or near real time.

Threat Determination Method

The purpose of the threat determination method is to calculate a threat metric value and a safe metric value by comparing the $Z_{\mathit{eff}}$ and density ranges of the object of interest, determined by way of the methods defined previously, to threat and safe maps built by scanning actual explosives and safe objects. A decision is made based on these values and if a threat is detected, it is shown on screen for viewing by security screening personnel or an alert condition is raised.

The density and $Z_{\mathit{eff}}$ values of objects considered to be threats and safe are used to build the maps. These can be acquired either by looking in literature, making measurements, calculating properties from the chemical composition, using the calibration method presented above or using scans and the method for object reconstruction described above, or a combination of these methods. The density/effective atomic number joint distribution depends on the source of the value or the method used for its acquisition. Then for each point of the whole domain of possible object density and $Z_{\mathit{eff}}$ values (wherein the distribution is such that density is on one axis and $Z_{\mathit{eff}}$ is on the other axis), the probability density of each known object of the corresponding map is superimposed. So, for the pair (density, $Z_{\mathit{eff}}$), the probability for OBJECT 1 to have one specific (density, Zeff) is added to the map, the probability of OBJECT 2 to have one specific (density, Zeff) is added to the map, etc., until all objects for that category (safe or threat) have been added to the map. This is done for all possible (density, $Z_{\mathit{eff}}$) pairs of the density and $Z_{\mathit{eff}}$ domain. Each map is then normalized for the number of objects it contains. The map therefore returns, for a specific (density, Zeff) pair, both "threat" and "safe" values that are similar to a probability, that each represent how likely it is for that pair to be a threat and a safe object.

Note that this step can be performed by using a suitable density/$Z_{\mathit{eff}}$ mesh and by calculating the safe and threat metrics for each cell of the mesh, or analytically by considering the sum of probabilities densities for each object as continuous functions over the domain. An example of a probability density for an object could be a binormal distribution centered on the average density and $Z_{\mathit{eff}}$ of that object. The normalized sum of all the distributions of the objects of one category, "safe" of "threat" are respectively called the safe map and threat map.

When an unknown object is scanned, a similar distribution is determined for that object as a result of the object reconstruction method, described above. This is called the value distribution.

The threat and safe metrics are simply the sum of the value distribution (assumed once again as a normal distribution) multiplied by each corresponding map, over the whole map:

$$\text{Safe metric} = \sum_i \text{safe map}(\rho_i, Z_{\mathit{eff},i}) * \text{value distribution}(\rho_i, Z_{\mathit{eff},i})$$

$$\text{Threat metric} = \sum_i \text{threat map}(\rho_i, Z_{\mathit{eff},i}) * \text{value distribution}(\rho_i, Z_{\mathit{eff},i})$$

Here, the index i refers to each cell of the map, and $\rho_i, Z_{\mathit{eff},i}$ represent the mass density and $Z_{\mathit{eff}}$ for each of those cells.

For example, for the first cell, the safe metric value will be the "safe" value previously defined for the mass density and $Z_{\mathit{eff}}$ of that first cell, multiplied by the probability that the unknown object has that mass density and $Z_{\mathit{eff}}$. This is repeated for each cell, and the results are added together to provide the safe metric. This is done once again but with the threat map to provide the threat metric.

Or, if the maps are analytical, $$\text{Safe metric} = \int_{-\infty}^{\infty}\!\!\int \text{safe map}(\rho, Z_{\mathit{eff}}) * \text{value distribution}(\rho, Z_{\mathit{eff}}) d\rho dZ_{\mathit{eff}}$$

$$\text{Threat metric} = \int_{-\infty}^{\infty}\!\!\int \text{threat map}(\rho, Z_{\mathit{eff}}) * \text{value distribution}(\rho, Z_{\mathit{eff}}) d\rho dZ_{\mathit{eff}}$$

If the unknown object of interest has been determined to have properties that are similar to a region of the map with a higher concentration of possible safe/threat mapped objects, then it will appropriately have corresponding higher safe/threat metrics.

The threat metric is divided by or otherwise mathematically combined with the safe metric to give the threat ratio, and if the threat ratio is over the decision threshold, then the unknown object is a threat. The threshold is selected to maximize detection and minimize false positives, and its concept is thoroughly studied in decision theory. It can also be experimentally determined by scanning objects in different configurations, conditions, containers, and evaluating the resulting safe and threat metrics. The adjustment of the threshold then results in a number of safe and threat assessments, therefore resulting in a proportion of false positives and detection rates. It is then fixed to result in the optimal proportion for the decision objectives dictated by external authorities and is dependent on the overall solution.

If the unknown objects or objects of interest are determined to be threats, the pixels they occupy in the images are sent to the GUI part of the software for highlighting and user warning. An alert condition may also be raised.

Figure 27:
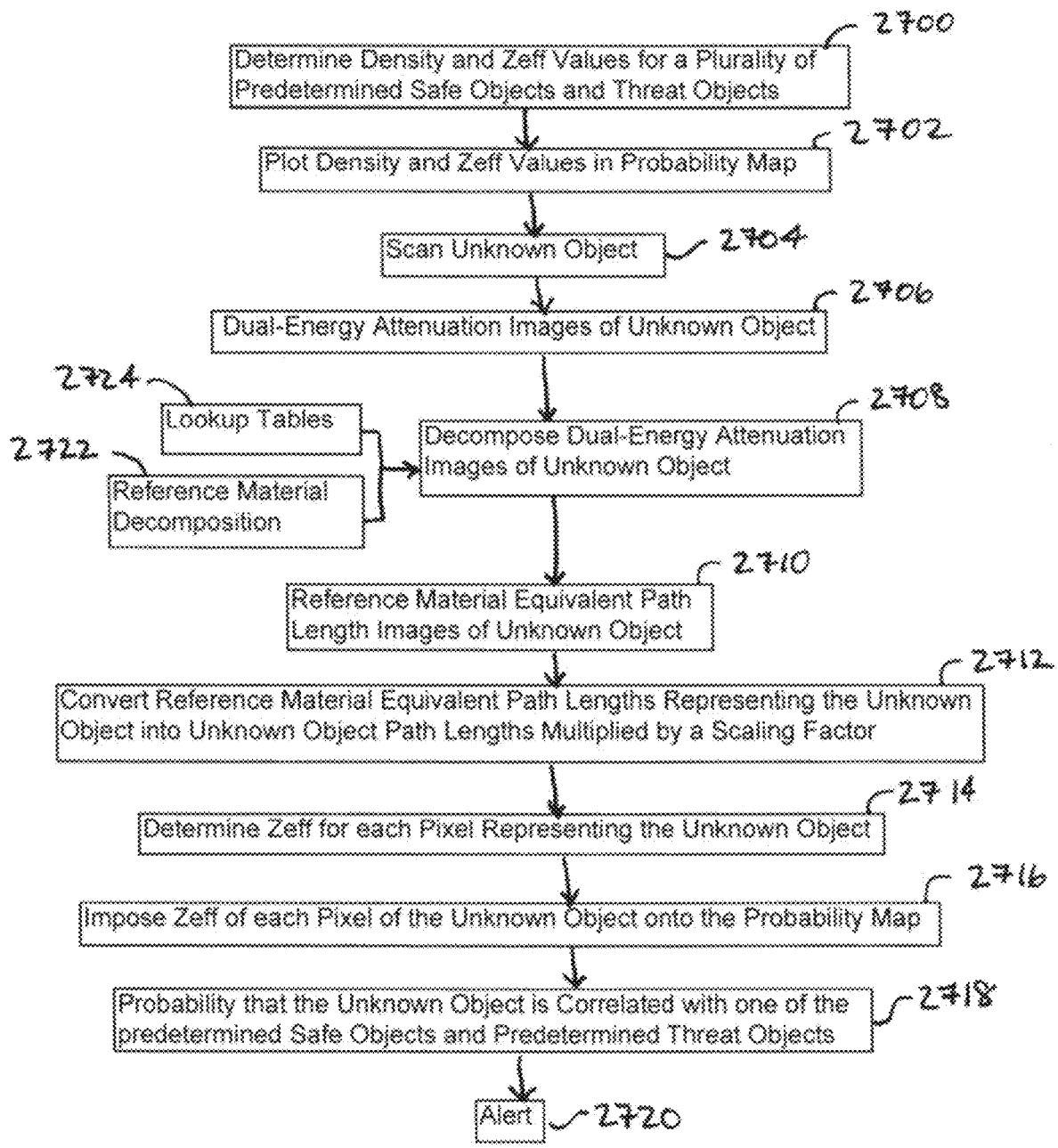

With reference to FIG. 27, there is provided a method for assigning one of a safe condition and a threat condition to an unknown object. The method begins with the step 2700 of determining a density value and an effective atomic number value for a plurality of predetermined safe objects and a plurality of predetermined threat objects. At step 2702, the density value and effective atomic number values of each of the predetermined safe objects and predetermined threat objects are plotted in a probability map to correlate corresponding pairs of density values and effective atomic number values with each of the predetermined safe objects and predetermined threat objects.

At step 2704 an unknown object is scanned to provide a plurality of dual-energy attenuation images at step 2706 each having dual-energy attenuation information representing the unknown object. At step 2708, each of the dual-energy attenuation images are decomposed into dual-reference material equivalent path length images representing the unknown object, provided at step 2710. The reference material equivalent path lengths representing the unknown object are converted at step 2712 into unknown object path lengths multiplied by a predetermined scaling factor.

At step 2714, the effective atomic number for each pixel representing the unknown object is determined. At step 2716, the effective atomic number of the unknown object is imposed on the probability map to determine a probability that the unknown object is correlated with one of a predetermined safe object or a predetermined threat object, provided at step 2718. As a further optional step, an alert may be raised at step 2720 based on this probability. Such an alert may, by non-exhaustive example, be an audible alert, a modification to the displayed image, or notification to the appropriate personnel, among other suitable alert conditions.

Decomposition of the dual-energy attenuation images of the unknown object at step 2710 into reference material equivalent path length images may be performed in any manner previously described, such as for example, imposing the dual-energy attenuation information of each pixel onto suitable inverse attenuation surfaces to obtain the first and second equivalent reference material path lengths as in step 2722 or by using suitable lookup tables as in step 2724. This is previously discussed with reference to FIGS. 3 and 11 and in particular step 306 shown in FIG. 11.

Moreover, in cases wherein removal of a background object or reconstruction of an object may be required, such removal of the background object and/or reconstruction may be performed accordingly to any suitable method previously described.

A system of one or more computers can be configured to perform the particular operations or actions as described herein by virtue of having software, firmware, hardware, or a combination of them installed on the system that in operation causes or cause the system to perform the actions automatically and in real time or near real time. One or more computer programs can be configured to perform particular operations or actions described herein by virtue of including instructions that, when executed by data processing apparatus, cause the apparatus to perform the actions. Such actions may be performed automatically and in real time or near real time.

While the invention has been described in terms of specific embodiments, it is apparent that other forms could be adopted by one skilled in the art. For example, the methods described herein could be performed in a manner which differs from the embodiments described herein. The steps of each method could be performed using similar steps or steps producing the same result but which are not necessarily equivalent to the steps described herein. Some steps may also be performed in different order to obtain the same result. Similarly, the apparatuses and systems described herein could differ in appearance and construction from the embodiments described herein, the functions of each component of the apparatus could be performed by components of different construction but capable of a similar though not necessarily equivalent function, and appropriate materials could be substituted for those noted. Accordingly, it should be understood that the invention is not limited to the specific embodiments described herein. It should also be understood that the phraseology and terminology employed above are for the purpose of disclosing the illustrated embodiments, and do not necessarily serve as limitations to the scope of the invention.

What is claimed is:

1. A method for assigning an attribute to x-ray attenuation comprising: acquiring first and second reference material equivalent path length information associated with a first range of dual-energy x-ray attenuation information; acquiring second and third reference material equivalent path length information associated with a second range of dual-energy x-ray attenuation information; and, joining the first dual-energy x-ray attenuation information range with the second dual-energy x-ray attenuation information range using coefficients representing dual-energy x-ray attenuation information of the second reference material to define a third dual-energy x-ray attenuation information range upon which may be imposed dual-energy x-ray attenuation values within the third dual-energy x-ray attenuation information range to determine corresponding first reference material equivalent path lengths and third reference material equivalent path lengths.

2. The method as in claim 1, wherein the step of acquiring first and second reference material equivalent path length information associated with a first range of dual-energy x-ray attenuation information further comprises the steps of:
scanning in an x-ray scanning device first and second reference materials each having known atomic composition, known dimensions and known orientation in the x-ray scanning device, the x-ray scanning device emitting x-rays which pass through the first reference material with first reference material path lengths and through the second reference material with second reference material path lengths, the x-rays being detected by an array of detectors to provide first dual-energy x-ray attenuation information for each of the first and second reference materials;

associating the first dual-energy x-ray attenuation information with each of the first reference material path lengths and the second reference material path lengths; and, expressing collectively each of the first reference material path lengths and the second reference material path lengths as a function of the associated first dual-energy x-ray attenuation information to define first dual-energy attenuation surfaces.

3. The method as in claim 1, wherein the step of acquiring first and second reference material equivalent path length information associated with a first range of dual-energy x-ray attenuation information further comprises the steps of:

retrieving from lookup tables saved first and second reference material equivalent path lengths associated with the dual-energy x-ray attenuation information corresponding with the first dual-energy attenuation information range.

4. The method as in claim 1, wherein the step of acquiring second and third reference material equivalent path length information associated with a first range of dual-energy x-ray attenuation information further comprises the steps of:

scanning in the x-ray scanning device the second reference material and a reference third material having known atomic composition, known dimensions and known orientation in the x-ray scanning device to provide second low-energy x-ray attenuation information and high-energy x-ray attenuation information for each of the second and third reference materials;

associating each of the second low-energy x-ray attenuation information and the second high-energy x-ray attenuation information with each of the second reference material path lengths and third reference material path lengths; and, expressing collectively each of the second reference material path lengths and the third reference material path lengths as a function of the associated low-energy x-ray attenuation information and high-energy x-ray attenuation information to define second high-energy attenuation surfaces and second low-energy attenuation surfaces.

5. The method as in claim 1, wherein the step of acquiring second and third reference material equivalent path length information associated with a second range of dual-energy x-ray attenuation information further comprises the steps of:

retrieving from lookup tables saved second and third reference material equivalent path lengths associated with the dual-energy x-ray attenuation information corresponding with the second dual-energy attenuation information range.

6. The method according to claim 2, wherein the step of expressing collectively each of the first reference material path lengths and the second reference material path lengths further comprises the step of:

selecting a model for expressing collectively each of the first reference material path lengths and the second reference material path lengths as a function of the associated first dual-energy x-ray attenuation information to define the dual-energy attenuation surfaces.

7. The method according to claim 2, wherein the step of expressing collectively each of the first reference material path lengths and the second reference material path lengths further comprises the step of:

determining numerically pointwise inverted first dual-energy attenuation surfaces using an optimization algorithm inverting the first dual-energy attenuation surfaces.

8. The method according to claim 4, wherein the step of expressing collectively each of the second reference material path lengths and the third reference material path lengths further comprises the step of:

selecting a model for expressing collectively each of the second reference material path lengths and the third reference material path lengths as a function of the associated second dual-energy x-ray attenuation information to define the second dual-energy attenuation surfaces.

9. The method according to claim 4, wherein the step of expressing collectively each of the second reference material path lengths and the third reference material path lengths further comprises the step of:

determining numerically pointwise inverted second dual-energy attenuation surfaces using an optimization algorithm inverting the second dual-energy attenuation surfaces.

10. The method according to claim 6, wherein the model is a second model, the first dual-energy attenuation surfaces are first dual-energy inverse attenuation surfaces, respectively, and prior to the associating step, the method further comprising the steps of:

associating each of the first dual-energy x-ray attenuation information with corresponding ones of each of the first material path lengths and the second material path lengths; and, selecting a first model for expressing collectively the first dual-energy x-ray attenuation information as a function of the first reference material path lengths and the second reference material path lengths to define first direct attenuation surfaces.

11. The method according to claim 6, wherein the step of selecting the model further includes the steps of:

selecting a set of coefficients to be applied to the model for fitting the first dual-energy x-ray attenuation information with the model; and, fitting the first dual-energy x-ray attenuation information with the model optimizing the coefficients.

12. The method according to claim 11, wherein the step of selecting the model further includes the steps of:

selecting the set of fitting constraints to be applied to the model for selecting the coefficients; and, selecting the set of coefficients by applying the set of fitting constraints to the model.

13. The method according to claim 10, wherein the step of selecting the first model further includes the steps of:

selecting a first set of coefficients to be applied to the first model for fitting the first dual-energy x-ray attenuation information with the first model; and, fitting the first dual-energy x-ray attenuation information with the first model optimizing the first coefficients; and, the step of selecting the second model further includes the steps of:

selecting a second set of coefficients to be applied to the second model for fitting the first dual-energy x-ray attenuation information with the second model; and, fitting the first dual-energy x-ray attenuation information with the second model optimizing the second set of coefficients.

14. The method according to claim 13, wherein the step of selecting the first model further includes the steps of:

selecting a first set of fitting constraints to be applied to the first model for selecting the first set of coefficients; and, selecting the set of first coefficients by applying the first set of fitting constraints to the first model; and, the step of selecting second the model further includes the steps of:

selecting a second set of fitting constraints to be applied to the second model for selecting the second set of coefficients; and, selecting the second set of coefficients by applying the second set of fitting constraints to the second model.

15. The method according to claim 6, wherein the model is a second model, the second dual-energy attenuation surfaces are second dual-energy inverse attenuation surfaces, respectively, and prior to the associating step, the method further comprising the steps of:

associating each of the second dual-energy x-ray attenuation information with corresponding ones of each of the second material path lengths and the third material path lengths; and, selecting a first model for expressing collectively the second dual-energy x-ray attenuation information as a function of the second reference material path lengths and the third reference material path lengths to define second direct attenuation surfaces.

16. The method according to claim 8, wherein the step of selecting the model further includes the steps of:

selecting a set of coefficients to be applied to the model for fitting the second dual-energy x-ray attenuation information with the model; and, fitting the second dual-energy x-ray attenuation information with the model optimizing the coefficients.

17. The method according to claim 16, wherein the step of selecting the model further includes the steps of:

selecting the set of fitting constraints to be applied to the model for selecting the coefficients; and, selecting the set of coefficients by applying the set of fitting constraints to the model.

18. The method according to claim 15, wherein the step of selecting the first model further includes the steps of:

selecting a first set of coefficients to be applied to the first model for fitting the second dual-energy x-ray attenuation information with the first model; and, fitting the second dual-energy x-ray attenuation information with the first model optimizing the first coefficients; and, the step of selecting the second model further includes the steps of:

selecting a second set of coefficients to be applied to the second model for fitting the second dual-energy x-ray attenuation information with the second model; and, fitting the second dual-energy x-ray attenuation information with the second model optimizing the second set of coefficients.

19. The method according to claim 18, wherein the step of selecting the first model further includes the steps of:

selecting a first set of fitting constraints to be applied to the first model for selecting the first set of coefficients; and, selecting the set of first coefficients by applying the first set of fitting constraints to the first model; and, the step of selecting second the model further includes the steps of:

selecting a second set of fitting constraints to be applied to the second model for selecting the second set of coefficients; and, selecting the second set of coefficients by applying the second set of fitting constraints to the second model.

20. The method according to claim 6, wherein the dual-energy x-ray attenuation information includes high-energy x-ray attenuation information and low-energy x-ray attenuation information and wherein the step of associating each of the first low-energy x-ray attenuation information and the first high-energy x-ray attenuation information with each of the first reference material path lengths and the second reference material path lengths further comprises:

defining a first space wherein the first low-energy x-ray attenuation information of the first reference material and the second reference material defines a first plane and first reference material path lengths and second reference material path lengths each define a first height over the first plane;

defining a second space wherein the first high-energy x-ray attenuation information of the first reference material and the second reference material defines a second plane and first reference material path lengths and second reference material path lengths each define a second height over second the plane; and, representing collectively the first reference material path lengths and the second reference material path lengths using the model to define the first high-energy direct attenuation surface and first low energy direct attenuation surface.

21. The method according to claim 10, wherein the dual-energy x-ray attenuation information includes high-energy x-ray attenuation information and low-energy x-ray attenuation information and wherein the associating step further comprises:

defining a space wherein the first reference material path lengths and the second reference material path lengths define a first plane and the first high-energy x-ray attenuation information and the first low-energy x-ray attenuation information each define a respective first and second height over the first plane and representing collectively the first high-energy x-ray attenuation information and the first low-energy x-ray attenuation information using the first model to define the first high-energy direct attenuation surface and first low energy direct attenuation surface; and, defining an inverse space wherein the first low-energy x-ray attenuation information and the first high-energy x-ray attenuation information define a second plane and first reference material path lengths and second reference material path lengths each define a respective third and fourth height over the second plane; and, representing collectively the first reference material path lengths and the second reference material path lengths using the second model to define first high-energy and first low-energy inverse attenuation surfaces.

22. The method according to claim 8, wherein the dual-energy x-ray attenuation information includes high-energy x-ray attenuation information and low-energy x-ray attenuation information and wherein the step of associating each of the second low-energy x-ray attenuation information and the second high-energy x-ray attenuation information with each of the second reference material path lengths and third reference material path lengths further comprises:

defining a first space wherein the second low-energy x-ray attenuation information of the second reference material and the third reference material defines a first plane and second reference material path lengths and third reference material path lengths each define a first height over the first plane;

defining a second space wherein the second high-energy x-ray attenuation information of the second reference material and the third reference material defines a second plane and second reference material path lengths and third reference material path lengths each define a second height over second the plane; and, representing collectively the second reference material path lengths and the third reference material path lengths using the model to define the second high-energy direct attenuation surface and second low energy direct attenuation surface.

23. The method according to claim 22, wherein the associating step further comprises:

defining a space wherein the second reference material path lengths and the third reference material path lengths define a first plane and the second high-energy x-ray attenuation information and the second low-energy x-ray attenuation information each define a respective first and second height over the first plane and representing collectively the second high-energy x-ray attenuation information and the second low-energy x-ray attenuation information using the first model to define the second high-energy direct attenuation surface and second low energy direct attenuation surface; and, defining an inverse space wherein the second low-energy x-ray attenuation information and the second high-energy x-ray attenuation information define a second plane and second reference material path lengths and third reference material path lengths each define a respective third and fourth height over the second plane; and, representing collectively the second reference material path lengths and the third reference material path lengths using the second model to define second high-energy and second low-energy inverse attenuation surfaces.

24. The method according to claim 1, wherein the step of joining the first the first dual-energy x-ray attenuation information range with the second dual-energy x-ray attenuation information range further comprises the steps of:

selecting a first model for expressing collectively each of the first reference material path lengths and the second reference material path lengths as a function of the associated first dual-energy x-ray attenuation information range;

selecting a first set of coefficients to be applied to the first model for fitting the first dual-energy x-ray attenuation information range with the first model;

selecting a second model for expressing collectively each of the second reference material path lengths and the third reference material path lengths as a function of the associated second dual-energy x-ray attenuation information range;

selecting a second set of coefficients to be applied to the second model for fitting the second dual-energy x-ray attenuation information range with the second model;

weighting to a zero value the coefficients for fitting the dual-energy x-ray attenuation information of the first reference material to the first model to obtain a subset of coefficients for fitting respective dual-energy x-ray attenuation information of only the second reference material to either of the first model and the second model; and, fitting the first set of coefficients with the second set of coefficients using the subset of coefficients to join the first model and the second model to provide the third dual-energy x-ray attenuation information range.

25. A method for assigning an attribute to x-ray attenuation comprising:

acquiring first and second reference material equivalent path length information associated with a first range of dual-energy x-ray attenuation information by a first model for expressing collectively each of the first reference material path lengths and the second reference material path lengths as a function of the associated first range of dual-energy x-ray attenuation information, the first range of dual-energy attenuation information being fitted with the first model by a first set of coefficients;

acquiring third reference material equivalent path length information associated with a second range of dual-energy x-ray attenuation information by a second model for expressing collectively each of the third reference material equivalent path lengths as a function of the associated second range of dual-energy attenuation information, the second range of dual-energy being fitted with the second model by a second set of coefficients, the third reference material having an effective atomic number greater than that of the second reference material;

combining the first set of coefficients and the second set of coefficients to provide a third set of coefficients for fitting the first and second range of dual-energy x-ray attenuation information with a third model for expressing collectively the first and third reference material path lengths as a function of the fitted first and second range of dual-energy x-ray attenuation information; and, for all points in the third model determine a volume fraction of one of the first and the third reference material which represents the second reference material path lengths to identify where in the third model path lengths representing the second reference material are represented.

26. The method as in claim 25, wherein the step of acquiring first and second reference material equivalent path length information associated with a first range of dual-energy x-ray attenuation information further comprises the steps of:

scanning in an x-ray scanning device first and second reference materials each having known atomic composition, known dimensions and known orientation in the x-ray scanning device, the x-ray scanning device emitting x-rays which pass through the first reference material with first reference material path lengths and through the second reference material with second reference material path lengths, the x-rays being detected by an array of detectors to provide first dual-energy x-ray attenuation information for each of the first and second reference materials;

associating each of the first dual-energy x-ray attenuation information with each of the first reference material path lengths and the second reference material path lengths; and, expressing collectively each of the first reference material path lengths and the second reference material path lengths as a function of the associated first dual-energy x-ray attenuation information to define first dual-energy attenuation surfaces.

27. The method as in claim 25, wherein the step of acquiring first and second reference material equivalent path length information associated with a first range of dual-energy x-ray attenuation information further comprises the steps of:
retrieving from lookup tables saved first and second reference material equivalent path lengths associated with the dual-energy x-ray attenuation information corresponding with the first dual-energy attenuation information range.

28. The method as in claim 25, wherein the step of acquiring third reference material equivalent path length information associated with a second range of dual-energy x-ray attenuation information further comprises the steps of:
scanning in the x-ray scanning device the third reference material having known atomic composition, known dimensions and known orientation in the x-ray scanning device to provide second dual-energy x-ray attenuation information for the third reference material;
associating each of the second dual-energy x-ray attenuation information with the third reference material path lengths; and,
expressing collectively the third reference material path lengths as a function of the associated dual-energy x-ray attenuation information to define second dual-energy attenuation surfaces.

29. The method as in claim 25, wherein the step of acquiring third reference material equivalent path length information associated with a second range of dual-energy x-ray attenuation information further comprises the steps of:
retrieving from lookup tables saved third reference material equivalent path lengths associated with the dual-energy x-ray attenuation information corresponding with the second dual-energy attenuation information range.

30. The method according to claim 25, wherein the step of fitting the first model by a first set of coefficients further includes the steps of:
fitting the first range of dual-energy x-ray attenuation information with the first model to optimize the first set of coefficients.

31. The method according to claim 25, wherein fitting the first range of dual-energy attenuation information with the first model by a first set of coefficients further includes the steps of:
selecting a set of fitting constraints to be applied to the first model for selecting the first set of coefficients; and,
selecting the first set of coefficients by applying the set of fitting constraints to the first model.

32. The method according to claim 25, wherein the step of fitting the second range of dual-energy attenuation information with the second model by a second set of coefficients further includes the steps of:
fitting the second range of dual-energy x-ray attenuation information with the second model to optimize the second set of coefficients.

33. The method according to claim 25, wherein fitting the second range of dual-energy attenuation information with the second model by a second set of coefficients further includes the steps of:
selecting a set of fitting constraints to be applied to the second model for selecting the second set of coefficients; and,
selecting the second set of coefficients by applying the set of fitting constraints to the second model.

34. The method according to claim 25, wherein the dual-energy x-ray attenuation information includes high-energy x-ray attenuation information and low-energy x-ray attenuation information and wherein associating the first range of dual-energy x-ray attenuation with each of the first reference material path lengths and the second reference material path lengths further comprises:
defining a first space wherein the first low-energy x-ray attenuation information of the first reference material and the second reference material defines a first plane and first reference material path lengths and second reference material path lengths each define a first height over the first plane;
defining a second space wherein the first high-energy x-ray attenuation information of the first reference material and the second reference material defines a second plane and first reference material path lengths and second reference material path lengths each define a second height over second the plane; and,
representing collectively the first reference material path lengths and the second reference material path lengths using the first model to define first dual-energy direct attenuation surfaces.

35. The method according to claim 25, wherein the dual-energy x-ray attenuation information includes high-energy x-ray attenuation information and low-energy x-ray attenuation information and wherein associating the second range of dual-energy x-ray attenuation information with the third reference material path lengths further comprises:
defining a first space wherein the second low-energy x-ray attenuation information of the third reference material defines a first plane and the third reference material path lengths define a first height over the first plane;
defining a second space wherein the second high-energy x-ray attenuation information of the third reference material defines a second plane and the third reference material path lengths define a second height over second the plane; and,
representing collectively the third reference material path lengths using the second model to define second dual-energy direct attenuation surfaces.

36. The method according to claim 25, wherein the dual-energy x-ray attenuation information includes high-energy x-ray attenuation information and low-energy x-ray attenuation information and further comprising the steps of:
defining a space wherein the first reference material path lengths and the third reference material path lengths define a first plane and the first and second high-energy x-ray attenuation information and the first and second low-energy x-ray attenuation information each define a respective first and second height over the first plane and the third model expresses collectively the first and third reference material path lengths as a function of the first and second low-energy x-ray attenuation and the first and second high-energy x-ray attenuation to define a third dual-energy direct attenuation surface; and,
defining an inverse space wherein the first and second low-energy x-ray attenuation information and the first and second high-energy x-ray attenuation information define a second plane and first reference material path lengths and third reference material path lengths each define a respective third and fourth height over the second plane; and,
representing collectively the first reference material path lengths and the third reference material path lengths using the third model to define dual-energy inverse attenuation surfaces.

37. A method for assigning an attribute to x-ray attenuation comprising:
acquiring first and second reference material equivalent path length information associated with a first range of dual-energy x-ray attenuation information by a model for expressing collectively each of the first reference material path lengths and the second reference material path lengths as a function of the associated first range of dual-energy x-ray attenuation information;

selecting an extrapolation range of dual-energy x-ray attenuation information over which first and second reference material path lengths are to be associated with dual-energy x-ray attenuation information of a first imposed material having a predetermined minimum effective atomic number less than an effective atomic number of the first reference material and a second imposed material having a predetermined maximum effective atomic number greater than an effective atomic number of the second reference material, wherein the first range is within the extrapolation range;

selecting a set of fitting constraints for associating each of the first reference material path lengths and the second reference material path lengths over the extrapolation range of dual-energy attenuation information to define extrapolated first and second reference material equivalent path lengths over the extrapolation range; and, applying the set of fitting constraints to the model.

38. The method as in claim 37, wherein the step of acquiring first and second reference material equivalent path length information associated with a first range of dual-energy x-ray attenuation information further comprises the steps of:

scanning in an x-ray scanning device first and second reference materials each having known atomic composition, known dimensions and known orientation in the x-ray scanning device, the x-ray scanning device emitting x-rays which pass through the first reference material with first reference material path lengths and through the second reference material with second reference material path lengths, the x-rays being detected by an array of detectors to provide first dual-energy x-ray attenuation information for each of the first and second reference materials;

associating the first dual-energy x-ray attenuation information with each of the first reference material path lengths and the second reference material path lengths; and, using the model to express collectively each of the first reference material path lengths and the second reference material path lengths as a function of the associated first dual-energy x-ray attenuation information to define first dual-energy attenuation surfaces.

39. The method as in claim 37, wherein the step of acquiring first and second reference material equivalent path length information associated with a first range of dual-energy x-ray attenuation information further comprises the steps of:

retrieving from lookup tables saved first and second reference material equivalent path lengths associated with the dual-energy x-ray attenuation information corresponding with the first range of dual-energy x-ray attenuation information.

40. The method according to claim 37, wherein the applying the set of fitting constraints to the model further includes the step of:

selecting a set of coefficients to be applied to the model for fitting the dual-energy x-ray attenuation information of the first range with the model; and, fitting, using the set of fitting constraints, the dual-energy x-ray attenuation information of the extrapolation range with the model.

41. The method according to claim 37, wherein the dual-energy x-ray attenuation information includes high-energy x-ray attenuation information and low-energy x-ray attenuation information and wherein associating each of the first and second reference material path lengths with the first range of dual-energy x-ray attenuation information further comprises:

defining a first space wherein the low-energy x-ray attenuation information of the first reference material and the second reference material defines a first plane and first reference material path lengths and second reference material path lengths each define a first height over the first plane;

defining a second space wherein the high-energy x-ray attenuation information of the first reference material and the second reference material defines a second plane and first reference material path lengths and second reference material path lengths each define a second height over second the plane; and, representing collectively the first reference material path lengths and the second reference material path lengths using the first model to define the dual-energy direct attenuation surfaces.

42. The method according to claim 37, wherein the dual-energy x-ray attenuation information includes high-energy x-ray attenuation information and low-energy x-ray attenuation information and wherein the step of selecting a second model further comprises:

defining a first space wherein the low-energy x-ray attenuation information of the first imposed material and the second imposed material defines a first plane and first imposed material path lengths and second imposed material path lengths each define a first height over the first plane;

defining a second space wherein the high-energy x-ray attenuation information of the first imposed material and the second imposed material defines a second plane and first imposed material path lengths and second imposed material path lengths each define a second height over second the plane; and, representing collectively the first imposed material path lengths and the second imposed material path lengths using the second model to define the extrapolated dual-energy direct attenuation surfaces.

* * * * *